US012739756B2

(12) United States Patent
Guo et al.

(10) Patent No.: US 12,739,756 B2
(45) Date of Patent: Sep. 15, 2026

(54) POWER-BOOSTING TECHNIQUES FOR MULTIPLE UPLINK SHARED CHANNEL COMMUNICATIONS

(71) Applicant: QUALCOMM Incorporated, San Diego, CA (US)

(72) Inventors: Shaozhen Guo, Beijing (CN); Mostafa Khoshnevisan, San Diego, CA (US); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 195 days.

(21) Appl. No.: 18/698,702

(22) PCT Filed: Dec. 28, 2021

(86) PCT No.: PCT/CN2021/141925

§ 371 (c)(1),
(2) Date: Apr. 4, 2024

(87) PCT Pub. No.: WO2023/122931

PCT Pub. Date: Jul. 6, 2023

(65) Prior Publication Data

US 2024/0422690 A1 Dec. 19, 2024

(51) Int. Cl.
*H04W 52/14* (2009.01)
*H04W 52/10* (2009.01)
*H04W 52/32* (2009.01)

(52) U.S. Cl.
CPC ......... *H04W 52/146* (2013.01); *H04W 52/10* (2013.01); *H04W 52/32* (2013.01)

(58) Field of Classification Search
CPC . H04W 52/146; H04W 52/10; H04W 52/325; H04W 52/281
See application file for complete search history.

(56) References Cited

U.S. PATENT DOCUMENTS 9,392,587 B2 * 7/2016 Yang .................... H04L 1/1822
9,603,099 B2 * 3/2017 Shin .................... H04W 52/365
(Continued)

FOREIGN PATENT DOCUMENTS

CN 108702712 A 10/2018
CN 111345076 A 6/2020
WO WO-2019030847 A1 2/2019

OTHER PUBLICATIONS

International Search Report and Written Opinion—PCT/CN2021/141925—ISA/EPO—Sep. 15, 2022.

*Primary Examiner* — Dominic E Rego
(74) *Attorney, Agent, or Firm* — Holland & Hart LLP/Qualcomm

(57) ABSTRACT

Methods, systems, and devices for wireless communications are described in which one or more UEs may communicate with one or more base stations or transmission reception points (TRPs) based on scheduling information provided to the one or more UEs that schedule multiple transport blocks (TBs) for transmission. The multiple TBs may be divided into separate TB groups and different open loop power control parameters may be applied to the separate TB groups. Different open loop power control parameters may be identified based on a parameter set indication field that is included in scheduling information that schedules the multiple TBs. The parameter set indication field may indicate different open loop power control parameter sets with normal or power boosted parameters for different groups of TBs. In cases where multiple TRPs are used for communications, transmissions to different TRPs may have different power parameters based on the TB group and TRP.

30 Claims, 26 Drawing Sheets

(56) References Cited

U.S. PATENT DOCUMENTS

| | | | | |
|---|---|---|---|---|
| 10,659,207 | B2 * | 5/2020 | Wang | H04L 5/0053 |
| 11,832,254 | B2 * | 11/2023 | Papasakellariou | H04W 72/1263 |
| 11,902,910 | B2 * | 2/2024 | Cozzo | H04W 52/08 |
| 2011/0081936 | A1 * | 4/2011 | Haim | H04W 52/06 455/522 |
| 2018/0249429 | A1 * | 8/2018 | Zhang | H04W 52/146 |
| 2019/0124598 | A1 * | 4/2019 | Fakoorian | H04W 52/146 |
| 2019/0159140 | A1 * | 5/2019 | Wang | H04W 52/325 |
| 2019/0191382 | A1 * | 6/2019 | Zhang | H04W 72/23 |
| 2021/0144743 | A1 * | 5/2021 | Rastegardoost | H04W 72/23 |
| 2021/0153133 | A1 * | 5/2021 | Chen | H04W 52/10 |
| 2021/0160784 | A1 | 5/2021 | Yang et al. | |
| 2021/0258886 | A1 * | 8/2021 | Sun | H04B 7/0628 |
| 2021/0314877 | A1 * | 10/2021 | Ryu | H04L 5/0048 |
| 2022/0159682 | A1 * | 5/2022 | Liu | H04L 1/08 |
| 2022/0338236 | A1 * | 10/2022 | Cirik | H04B 7/0408 |
| 2023/0179333 | A1 * | 6/2023 | Cirik | H04L 1/08 |
| 2024/0205923 | A1 * | 6/2024 | Fakoorian | H04W 72/232 |
| 2024/0244595 | A1 * | 7/2024 | Wang | H04L 5/0094 |

* cited by examiner

605

First Group of TBs

TB1
615-a

TB1
615-b

610

Second Group of TBs

TB2
620-a

TB2
620-b

625

P0 Based On First Open-Loop Power Control Parameter Set Indication

630

P0 Based On Second Open-Loop Power Control Parameter Set Indication

1st Parameter Set Value

2nd Parameter Set Value

1st Parameter Set Value

2nd Parameter Set Value

Default P0 Used For Open-Loop Power Control

Additional P0 Value Used For Open-Loop Power Control

Default P0 Used For Open-Loop Power Control

Additional P0 Value Used For Open-Loop Power Control

635

640

645

650

600

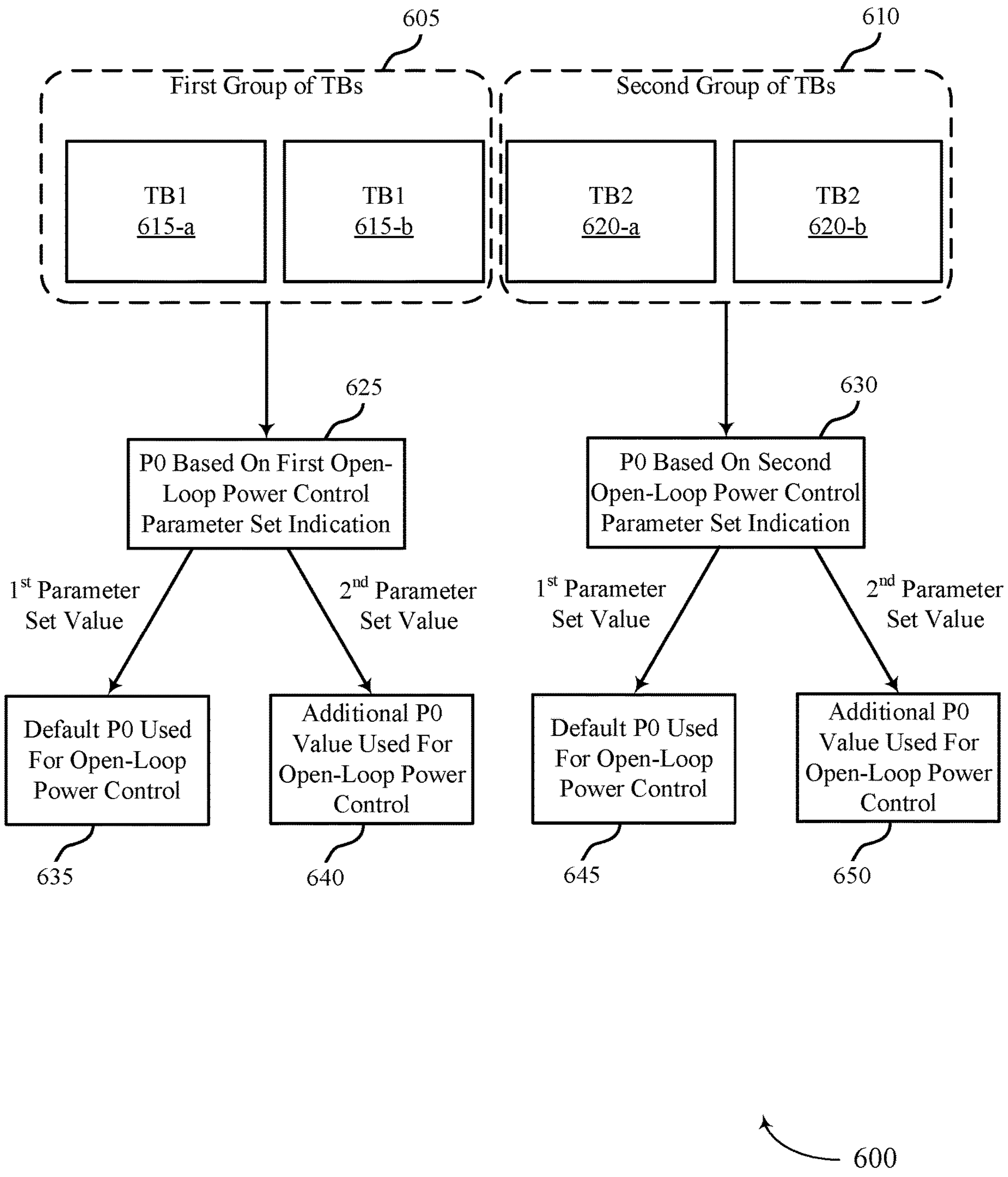

FIG. 6

POWER-BOOSTING TECHNIQUES FOR MULTIPLE UPLINK SHARED CHANNEL COMMUNICATIONS

CROSS REFERENCE

The present Application is a 371 national phase filing of International PCT Application No. PCT/CN2021/141925 by GUO et al., entitled "POWER-BOOSTING TECHNIQUES FOR MULTIPLE UPLINK SHARED CHANNEL COMMUNICATIONS," filed Dec. 28, 2021, which is assigned to the assignee hereof, and which is expressly incorporated by reference in its entirety herein.

FIELD OF TECHNOLOGY

The following relates to wireless communications, including power-boosting techniques for multiple uplink shared channel communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, lower priority communications may be scheduled for one UE, and subsequent to scheduling the lower priority communications, higher priority communications may be scheduled for another UE that use at least some of the previously scheduled resources for the lower priority communications. In such cases, it may be beneficial to adjust some transmission parameters for the higher priority communications to enhance the likelihood of successful reception.

SUMMARY

The described techniques relate to improved methods, systems, devices, and apparatuses that support power-boosting techniques for multiple uplink shared channel communications. In accordance with various aspects, described techniques provide for communications of multiple transport blocks (TBs), in which the multiple TBs are divided into separate TB groups and different open loop power control (OLPC) parameters may be applied to the separate TB groups. In some cases, different OLPC parameters may be identified based on an OLPC parameter set indication field that is included in scheduling information that schedules the multiple TBs. In some cases, the OLPC parameter set indication field may indicate different OLPC parameter sets with normal or power boosted parameters for different groups of TBs.

In some cases, the OLPC parameter set indication field may be configured to be applied to certain index values that are associated with each TB (e.g., an index value may be configured to each TB in the time domain resource allocation (TDRA) table the OLPC parameter set indication field is applied to the TBs associated with certain index values). Additionally or alternatively, TBs may be mapped to different TB groups based on an order in which they are provided in the DCI (e.g., first subset of TBs belong to the first group, and a second subset of TBs belong to the second group), or based on whether the TB is an initial transmission or a retransmission (e.g., based on a new data indicator (NDI) associated with the TB). In cases where multiple SRS resource sets are configured for communications with a UE, transmissions associated with different SRS resource set may have different OLPC parameters based on which TB group and which SRS resource set is associated with a TB.

A method for wireless communication at a UE is described. The method may include receiving, from a base station, first control information that schedules one or more physical uplink shared channel (PUSCH) repetitions for two or more TBs, determining, based on a power control indication provided in the first control information, a first OLPC parameter for a first group of the two or more TBs and a second OLPC parameter for a second group of the two or more TBs, transmitting the first group of TBs using a first uplink transmission power that is based on the first OLPC parameter, and transmitting the second group of TBs using a second uplink transmission power that is based on the second OLPC parameter.

An apparatus for wireless communication at a UE is described. The apparatus may include a processor, memory coupled with the processor, and instructions stored in the memory. The instructions may be executable by the processor to cause the apparatus to receive, from a base station, first control information that schedules one or more PUSCH repetitions for two or more TBs, determine, based on a power control indication provided in the first control information, a first OLPC parameter for a first group of the two or more TBs and a second OLPC parameter for a second group of the two or more TBs, transmit the first group of TBs using a first uplink transmission power that is based on the first OLPC parameter, and transmit the second group of TBs using a second uplink transmission power that is based on the second OLPC parameter.

Another apparatus for wireless communication at a UE is described. The apparatus may include means for receiving, from a base station, first control information that schedules one or more PUSCH repetitions for two or more TBs, means for determining, based on a power control indication provided in the first control information, a first OLPC parameter for a first group of the two or more TBs and a second OLPC parameter for a second group of the two or more TBs, means for transmitting the first group of TBs using a first uplink transmission power that is based on the first OLPC parameter, and means for transmitting the second group of TBs using a second uplink transmission power that is based on the second OLPC parameter.

A non-transitory computer-readable medium storing code for wireless communication at a UE is described. The code may include instructions executable by a processor to receive, from a base station, first control information that schedules one or more PUSCH repetitions for two or more TBs, determine, based on a power control indication provided in the first control information, a first OLPC parameter for a first group of the two or more TBs and a second OLPC parameter for a second group of the two or more TBs, transmit the first group of TBs using a first uplink transmission power that is based on the first OLPC parameter, and transmit the second group of TBs using a second uplink transmission power that is based on the second OLPC parameter.

Some examples of the method, apparatuses, and non-transitory computer-readable medium described herein may further include operations, features, means, or instructions for receiving, from the base station, configuration information that indicates a group index for each of the two or more TBs and determining, for each TB of the two or more TBs, whether the respective TB belongs to the first group of TBs or the second group of TBs based on the group index associated with the TB. Some examples of the method, apparatuses, and non-transitory computer-readable medium described herein may further include operations, features, means, or instructions for determining whether each TB of the two or more TBs belongs to the first group of TBs or the second group of TBs based on an order in which the two or more TBs are scheduled in the first control information. Some examples of the method, apparatuses, and non-transitory computer-readable medium described herein may further include operations, features, means, or instructions for determining that one or more TBs of the two or more TBs belong to the first group of TBs based on the one or more TBs being scheduled for a retransmission and determining that one or more other TBs of the two or more TBs belong to the second group of TBs based on the one or more other TBs being scheduled for an initial transmission. Some examples of the method, apparatuses, and non-transitory computer-readable medium described herein may further include operations, features, means, or instructions for determining whether one or more TBs of the two or more TBs belongs to the first group of TBs or the second group of TBs based on the first control information, where the first control information includes one of a first priority indication value or a second priority indication value for each of the two or more TBs.

In some examples of the method, apparatuses, and non-transitory computer-readable medium described herein, the first control information includes an OLPC parameter set indication field. Some examples of the method, apparatuses, and non-transitory computer-readable medium described herein may further include operations, features, means, or instructions for receiving, from the base station, configuration information that indicates whether an OLPC parameter set indication field is applied to the first group of TBs, or the second group of TBs, or both the first group of TBs and the second group of TBs. In some examples of the method, apparatuses, and non-transitory computer-readable medium described herein, the OLPC parameter set indication field indicates a first set of configured OLPC parameters or a second set of configured OLPC parameters are to be applied to one or both of the first group of TBs or the second group of TBs, and where the second set of configured OLPC parameters provides a higher uplink transmission power than the first set of configured OLPC parameters.

In some examples of the method, apparatuses, and non-transitory computer-readable medium described herein, two or more repetitions of each TB among the first group of TBs and the second group of TBs are transmitted in at least two sets of transmission occasions where a first set of transmission occasions is associated with a first sounding reference signal (SRS) resource set and a second set of transmission occasions are associated with a second SRS resource set, each of the at least two sets of transmission occasions having different transmission parameters, and where an OLPC parameter set indication field indicates a first set of configured OLPC parameters are to be applied to both the first set of transmission occasions and the second set of transmission occasions of the first group of TBs, or both the first set of transmission occasions and the second set of transmission occasions of the second group of TBs, or both the first set of transmission occasions and the second set of transmission occasions of both the first group of TBs and the second group of TBs based at least in part on the OLPC parameter set indication field having a first value.

In some examples of the method, apparatuses, and non-transitory computer-readable medium described herein, two or more repetitions of each TB among the first group of TBs and the second group of TBs are transmitted in at least two sets of transmission occasions, where a first set of transmission occasions is associated with a first SRS resource set and a second set of transmission occasions is associated with a second SRS resource set, each of the two sets of transmission occasions having different transmission parameters, and where an OLPC parameter set indication field indicates a second set of configured OLPC parameters are to be applied to the first set of transmission occasions of the first group of TBs, or the first set of transmission occasions of the second group of TBs, or the first set of transmission occasions of both the first group of TBs and the second group of TBs, and a third set of configured OLPC parameters are to be applied to the second set of transmission occasions of the first group of TBs, or the second set of transmission occasions of the second group of TBs, or the second set of transmission occasions of both the first group of TBs and the second group of TBs based on the OLPC parameter set indication field having a second value.

In some examples of the method, apparatuses, and non-transitory computer-readable medium described herein, the first control information includes a separate SRS resource set indication field for each of the first set of transmission occasions and the second set of transmission occasions, and where a first value of the SRS resource set indication field indicates that the first and/or second OLPC parameter for the first set of transmission occasions of the first group of TBs and/or the second group of TBs is selected from the second set of configured OLPC parameters, and a second value of the SRS resource set indication field indicates that the first and/or second OLPC parameter for the second set of transmission occasions of the first group of TBs and/or the second group of TBs is selected from the third set of configured OLPC parameters.

In some examples of the method, apparatuses, and non-transitory computer-readable medium described herein, two or more repetitions of each TB among the first group of TBs and the second group of TBs are transmitted in at least two sets of transmission occasions, where a first set of transmission occasions is associated with a first SRS resource set and a second set of transmission occasions is associated with a second SRS resource set, each of the at least two sets of transmission occasions having different transmission parameters, where a first value of an OLPC parameter set indication field indicates the first OLPC parameter in a second set of configured OLPC parameters is to be applied to the first set of transmission occasions of the first group of TBs, or the first set of transmission occasions of the second group of TBs, or the first set of transmission occasions of both the first group of TBs and the second group of TBs, and where the second OLPC parameter in the second set of configured OLPC parameters is to be applied to the second set of transmission occasions of the first group of TBs, or the second set of transmission occasions of the second group of TBs, or the second set of transmission occasions of both the first group of TBs and the second group of TBs based on the OLPC parameter set indication field having a second value. In some examples of the method, apparatuses, and non-transitory computer-readable medium described herein, a single SRS resource set indication field is applied to both the first set of transmission occasions and the second set of transmission occasions, and the single SRS resource set indication field is mapped to the first OLPC parameter for the first set of transmission occasions and the second OLPC parameter for the second set of transmission occasions.

In some examples of the method, apparatuses, and non-transitory computer-readable medium described herein, the first control information includes an explicit indication of whether the first group of TBs and the second group of TBs are to use different OLPC parameters. In some examples of the method, apparatuses, and non-transitory computer-readable medium described herein, the explicit indication is provided in a dedicated field of the first control information that indicates whether an OLPC parameter set indication field is applied to the first group of TBs, the second group of TBs, or to both the first group of TBs and the second group of TBs. In some examples of the method, apparatuses, and non-transitory computer-readable medium described herein, the explicit indication is provided in separate OLPC parameter set indication fields associated with each of the first group of TBs and the second group of TBs. In some examples of the method, apparatuses, and non-transitory computer-readable medium described herein, the separate OLPC parameter set indication fields may be configured at the UE via radio resource control signaling.

In some examples of the method, apparatuses, and non-transitory computer-readable medium described herein, the explicit indication may be provided in a single OLPC parameter set indication field, and where a first subset of bits of the single OLPC parameter set indication field are associated with the first group of TBs and a second subset of bits of the single OLPC parameter set indication field are associated with the second group of TBs. In some examples of the method, apparatuses, and non-transitory computer-readable medium described herein, two or more repetitions of each TB of the first group of TBs and the second group of TBs are transmitted in at least two sets of transmission occasions where a first set of transmission occasions is associated with a first SRS resource set, and a second set of transmission occasions is associated with a second SRS resource set, each of the at least two sets of transmission occasions having different transmission parameters and where the first control information further includes a SRS resource set indication field that identifies OLPC parameters for each of the at least two sets of transmission occasions.

A method for wireless communication at a base station is described. The method may include scheduling a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE, determining, based on the scheduling, a first OLPC parameter for the first group of TBs and a second OLPC parameter for the second group of TBs, and transmitting, to the first UE, a first control information that schedules the first PUSCH repetition and the second PUSCH repetition, and that indicates the first OLPC parameter for the first group of TBs and the second OLPC parameter for the second group of TBs.

An apparatus for wireless communication at a base station is described. The apparatus may include a processor, memory coupled with the processor, and instructions stored in the memory. The instructions may be executable by the processor to cause the apparatus to schedule a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE, determine, based on the scheduling, a first OLPC parameter for the first group of TBs and a second OLPC parameter for the second group of TBs, and transmit, to the first UE, a first control information that schedules the first PUSCH repetition and the second PUSCH repetition, and that indicates the first OLPC parameter for the first group of TBs and the second OLPC parameter for the second group of TBs.

Another apparatus for wireless communication at a base station is described. The apparatus may include means for scheduling a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE, means for determining, based on the scheduling, a first OLPC parameter for the first group of TBs and a second OLPC parameter for the second group of TBs, and means for transmitting, to the first UE, a first control information that schedules the first PUSCH repetition and the second PUSCH repetition, and that indicates the first OLPC parameter for the first group of TBs and the second OLPC parameter for the second group of TBs.

A non-transitory computer-readable medium storing code for wireless communication at a base station is described. The code may include instructions executable by a processor to schedule a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE, determine, based on the scheduling, a first OLPC parameter for the first group of TBs and a second OLPC parameter for the second group of TBs, and transmit, to the first UE, a first control information that schedules the first PUSCH repetition and the second PUSCH repetition, and that indicates the first OLPC parameter for the first group of TBs and the second OLPC parameter for the second group of TBs.

Some examples of the method, apparatuses, and non-transitory computer-readable medium described herein may further include operations, features, means, or instructions for transmitting, to the first UE, configuration information that indicates a group index for each of the first group of TBs and the second group of TBs and where the first OLPC parameter and the second OLPC parameter are determined based on the group index. In some examples of the method, apparatuses, and non-transitory computer-readable medium described herein, an order in which two or more TBs are scheduled in the first control information indicates whether a corresponding TB belongs to the first group of TBs or the second group of TBs. In some examples of the method, apparatuses, and non-transitory computer-readable medium described herein, a retransmission status of each scheduled TB may be used to determine whether the TB belongs to the first group of TBs or the second group of TBs. Some examples of the method, apparatuses, and non-transitory computer-readable medium described herein may further include operations, features, means, or instructions for configuring the first UE with a mapping between a first priority indication value and the first group of TBs, and a second priority indication value and the second group of TBs, and where the first control information indicates one of the first priority indication value or the second priority indication value for each scheduled TB. In some examples of the method, apparatuses, and non-transitory computer-readable medium described herein, the first control information includes an OLPC parameter set indication field.

In some examples of the method, apparatuses, and non-transitory computer-readable medium described herein, two or more repetitions of each TB among the first group of TBs and the second group of TBs are transmitted in at least two sets of transmission occasions where a first set of transmission occasions is associated with a first SRS resource set and a second set of transmission occasions is associated with a second sounding reference signal resource set, each of the at least two sets of transmission occasions having different transmission parameters, and where an OLPC parameter set indication field indicates a first set of configured OLPC parameters are to be applied to both the first set of transmission occasions and the second set of transmission occasions of the first group of TBs, or both the first set of transmission occasions and the second set of transmission occasions of the second group of TBs, or both the first set of transmission occasions and the second set of transmission occasions of both the first group of TBs and the second group of TBs based at least in part on the OLPC parameter set indication field having a first value. In some examples of the method, apparatuses, and non-transitory computer-readable medium described herein, the first control information includes an explicit indication of whether the first group of TBs and the second group of TBs are to use different OLPC parameters.

BRIEF DESCRIPTION OF THE DRAWINGS

FIG. 6 illustrates an example of a TB groups that have different open loop power control parameters that supports power-boosting techniques for multiple uplink shared channel communications in accordance with examples as disclosed herein.

DETAILED DESCRIPTION

Figure 1:
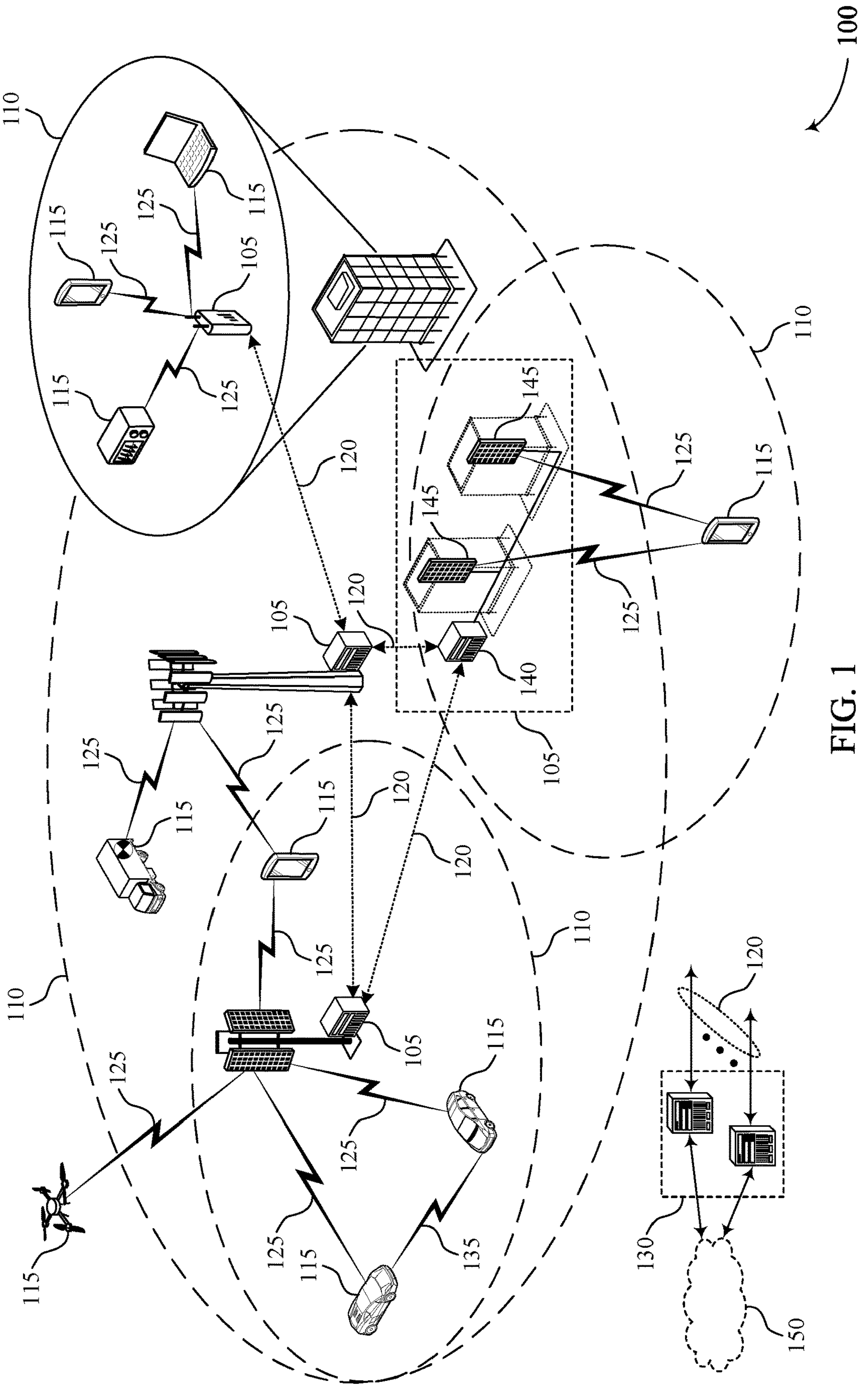
FIGS. 1 and 2 illustrate examples of wireless communications systems that support power-boosting techniques for multiple uplink shared channel communications in accordance with examples as disclosed herein.

In some wireless communications systems, a base station may schedule one or more lower priority communications for one user equipment (UE) and then determine that higher priority communications are present for a different UE. In some cases, the base station may schedule the higher priority communications for the different UE (e.g., which may be an example of a first UE) in resources that are already scheduled for the lower priority communications. In such cases, it may be beneficial to adjust some transmission parameters for the higher priority communications to enhance the likelihood of successful reception. For example, a first UE may have high priority data that is to be transmitted (e.g., ultra-reliable low latency communications (URLLC) data), which may be scheduled using wireless resources that were previously scheduled for lower priority data (e.g., enhanced mobile broadband (eMBB) data) transmissions of a second UE. In order to enhance the likelihood of successful reception of the first UE communications when both the first UE and the second UE are concurrently transmitting, the first UE may transmit at a higher power, which may be referred to as power boosting.

In some cases, the first UE may be scheduled for communications of multiple transport blocks (TBs), multiple repetitions for each TB, or both. However, if wireless resources of one or more of the TBs do not overlap with the scheduled resources of the lower priority communications, transmitting at the higher power can cause unnecessary power consumption, particularly in cases where repetitions of TBs are transmitted. For example, the second UE may not transmit in resources of one or more of the TBs scheduled for the first UE, or one or more of the first UE TBs may have a same priority as the communications of the second UE. In accordance with various aspects discussed herein, techniques are provided for different levels of uplink transmit powers in cases where multiple TBs are scheduled for transmission from a UE.

In some cases, power boosting may be indicated by a control information field (e.g., an open loop power control (OLPC) parameter set indication field provided in downlink control information (DCI) to a UE) that indicates an OLPC parameter set for an uplink transmission (e.g., a physical uplink shared channel (PUSCH) transmission), where power control parameters of different OLPC parameter sets provide a normal (or default) power, or a boosted (e.g., higher than normal) power. The multiple TBs may be divided into separate TB groups and different open loop power control parameters may be applied to the separate TB groups. In some cases, the OLPC parameter set indication field may indicate power boosting for the associated group of TBs by indicating different OLPC parameter sets with normal or power boosted parameters. In some cases, different OLPC parameters may be provided for uplink communications associated with multiple SRS resource sets, in which a separate reference signal resource indicator (e.g., a sounding reference signal resource indicator (SRI)) fields in DCI may indicate different SRIs that are mapped to different OLPC parameter sets. Providing different power control parameters for transmissions associated with different SRS resource sets may allow for reduced power for TB transmissions associated with a SRS resource set that may not see a strong interference from transmissions of the second UE.

In some cases, the OLPC parameter set indication field may be configured to be applied to certain index values that are associated with each TB (e.g., an index value may be configured to each TB in the time domain resource allocation (TDRA) table and the OLPC parameter set indication field is applied to the TBs associated with certain index values). Additionally or alternatively, TBs may be mapped to different TB groups based on an order in which they are scheduled in the DCI (e.g., first subset of TBs belong to the first group, and a second subset of TBs belong to the second group), or based on whether the TB is an initial transmission or a retransmission (e.g., based on a new data indicator (NDI) associated with each TB). In cases where multiple SRS resource sets are configured for communications with a UE, transmissions associated with different SRS resource sets may have different OLPC parameters based on which TB group and which SRS resource set is associated with a TB. In some cases, an additional DCI field may be added to DCI signaling, or additional bits may be added to an existing DCI field, to dynamically indicate which open loop power control parameters are to be applied for each group of TBs. Accordingly, techniques as discussed herein may enhance system performance through reduced interference from unneeded power boosting, and provide for UE power savings.

Aspects of the disclosure are initially described in the context of wireless communications systems. Additional aspects are described with reference to OLPC parameters associated with different groups of TBs for one or more SRS resource sets, and process flows. Aspects of the disclosure are further illustrated by and described with reference to apparatus diagrams, system diagrams, and flowcharts that relate to power-boosting techniques for multiple uplink shared channel communications.

FIG. 1 illustrates an example of a wireless communications system 100 that supports power-boosting techniques for multiple uplink shared channel communications in accordance with examples as disclosed herein. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term “cell” may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more UEs 115 may communicate with one or more base stations 105 or TRPs, based on scheduling information provided to the one or more UEs 115 that schedule multiple TBs for transmission. In accordance with techniques discussed herein, the multiple TBs may be divided into separate TB groups and different OLPC parameters may be applied to the separate TB groups. In some cases, different OLPC parameters may be identified based on an OLPC parameter set indication field that is included in scheduling information that schedules the multiple TBs. In some cases, the OLPC parameter set indication field may indicate different OLPC parameter sets with normal or power boosted parameters for different groups of TBs. In cases where multiple TRPs (e.g., when multiple SRS resource sets are configured) are used for communications with a UE 115, transmissions associated with different SRS resource sets may have different power parameters based on which TB group and which SRS resource set is associated with a TB.

Figure 2:
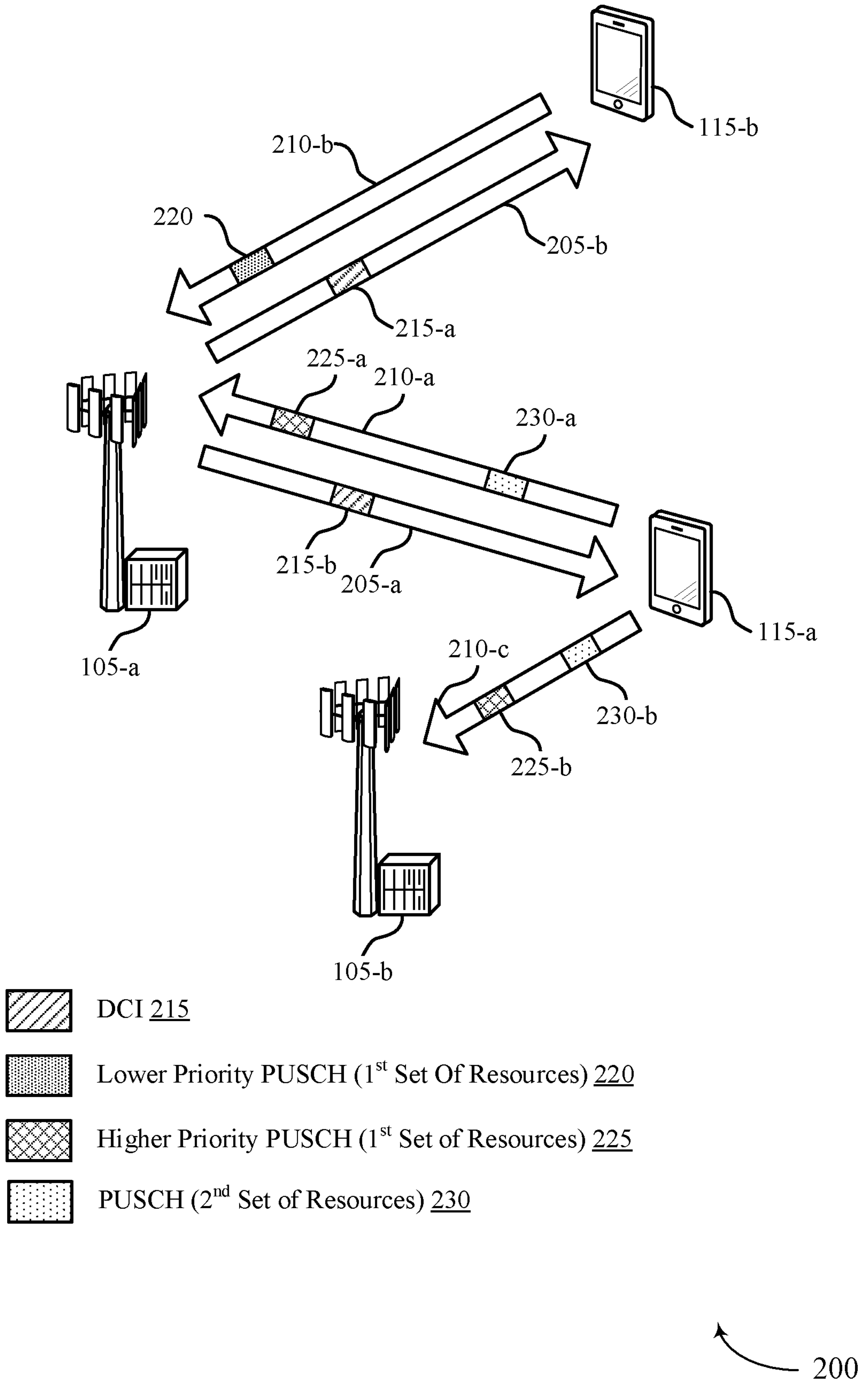

FIG. 2 illustrates an example of a wireless communications system 200 that supports power-boosting techniques for multiple uplink shared channel communications in accordance with examples as disclosed herein. The wireless communications system 200 may include a first base station 105-*a*, a second base station 105-*b*, a first UE 115-*a*, and a second UE 115-*b*, which may represent examples of a base stations 105 and UEs 115 as described with reference to FIG. 1.

In this example, the first UE 115-*a* may communicate with the first base station 105-*a* (which may be an example of a first TRP) via a first downlink carrier 205-*a* and a first uplink carrier 210-*a*, which may be different carriers operating using FDD, or a same carrier operating using TDD. The second UE 115-*b* may communicate with the first base station 105-*a* via a second downlink carrier 205-*b* and a second uplink carrier 210-*b*. In the example of FIG. 2, the first UE 115-*a*, for at least some communications, may operate in a multi-TRP configuration and also communicate with the second base station 105-*b* (which may be an example of a second TRP) via third uplink carrier 210-*c*.

In some cases, the first base station 105-*a* may provide scheduling information to each of the UEs 115 using DCI 215. For example, the first base station 105-*a* may schedule one or more lower priority PUSCH transmissions 220 for the second UE 115-*b* (e.g., for transmission of eMBB data) in first DCI 215-*a*. The first base station 105-*a* may also schedule, via second DCI 215-*b*, one or more higher priority PUSCH transmissions 225 for the first UE 115-*a* that may in some cases use resources that are overlapping with the lower priority PUSCH transmissions 220. For example, the first base station 105-*a* may determine that URLLC data is present for transmission from the first UE 115-*a*, and based on a high priority status of the URLLC data, may schedule the first UE 115-*a* to transmit associated one or more higher priority PUSCH transmissions 225 using resources that were previously allocated for the lower priority PUSCH transmissions 220 of the second UE 115-*b*. Further, the second DCI 215-*b* may schedule multiple TBs, that include TBs for the higher priority PUSCH transmissions 225 as well as PUSCH transmissions 230 which may include one or more higher priority TBs or lower priority TBs. In some cases, one or multiple PUSCH repetitions may be scheduled for one or all of the multiple TBs. Additionally, in this example, the higher priority PUSCH transmissions 225 and the PUSCH transmissions 230 may be associated with multiple SRS resource set (e.g., transmitted to multiple TRPs), with a first portion of higher priority PUSCH transmissions 225-*a* and a first portion of PUSCH transmissions 230-*a* transmitted to the first base station 105-*a* and a second portion of higher priority PUSCH transmissions 225-*b* and a second portion of PUSCH transmissions 230-*b* transmitted to the second base station 105-*b*. While multi-TRP communications are illustrated in the example, of FIG. 2, in other cases communications of the first UE 115-*a* may be with only a single TRP (e.g., with only the first base station 105-*a*) and various techniques as discussed herein may be applied for communications with the single TRP.

In some cases, the DCI 215 that schedules uplink communications may provide information for uplink power control, such as through one or more parameters that are used by the first UE 115-*a* to set an uplink transmit power. For example, PUSCH power control may be based on an established power control procedure that is specified by a communications standard used for communications between the UEs 115 and base stations 105, such as in Release 15 of the 3GPP specifications which provides that uplink PUSCH power ($P_{PUSCH}$) is determined according to:

$$P_{PUSCH,b,f,c}(i, j, q_d, l) = \min\left\{\begin{matrix} P_{CMAX,f,c}(i), \\ P_{O_{PUSCH},b,f,c}(j) + 10\log_{10}\left(2^{\mu} \cdot M^{PUSCH}_{RB,b,f,c}(i)\right) + \\ \alpha_{b,f,c}(j) \cdot PL_{b,f,c}(q_d) + \Delta_{TF,b,f,c}(i) + f_{b,f,c}(i, l) \end{matrix}\right\}[dBm],$$

where b is the uplink bandwidth part, f is the carrier frequency, c is the serving cell, i is the transmission occasion, j is a parameter set configuration index, $q_d$ is a reference signal index, and/is a PUSCH power control adjustment index; $P_{CMAX,f,c}$ is the configured maximum UE output power; $P_{0\_PUSCH}$ is an open loop power control parameter for controlling a received power level, M is a bandwidth of the PUSCH resource assignment, α is a pathloss (PL) compensation scaling factor which may be referred to herein as 'alpha,' PL is a PL value based on a measured reference signal, Δ is based on a modulation and coding scheme (MCS), and f is a closed loop power control component based on transmit power control (TPC) commands with a closed loop index l. In such cases, open loop power control parameters include values for $P_0$, and α that may be provided in a set of open loop power control parameters.

In some cases, the UEs 115 may be configured with multiple sets of open loop power control parameters, such as multiple sets of $P_0$ and alpha values for open loop power control (e.g., p0-AlphaSets) where each set has an identification (e.g., p0-PUSCH-AlphaSetId: 0, 1, . . . , 29). Additionally, the UEs 115 may be configured with a list of pathloss reference signals (PLRSs), where each member of the list has an identification (e.g., pusch-PathlossReferenceRS-Id: 0, 1, . . . , 3). Further, the UEs 115 may be configured with a list of SRI-PUSCH mapping, where each member of the list has an identification (e.g., sri-PUSCH-PowerControlId: 0, . . . , 15). In such cases, the SRI-PUSCH mapping identification (e.g., sri-PUSCH-PowerControlId) may be used as a codepoint of the SRI field in the DCI. If the value of the SRI field in the DCI 215 scheduling uplink communications is x, then the uplink power control parameters (e.g., PLRS, $P_0$, alpha, closed loop index) corresponding to sri-PUSCH-PowerControlId=x is used for PUSCH transmission. In some cases, the SRI field can be up to four bits providing up to 16 values of x that can be indicated, depending on UE 115 configuration.

In cases where higher priority PUSCH transmissions 225 are scheduled in overlapping resources with lower priority PUSCH transmissions 220, the first base station 105-*a* may modify one or more OLPC parameters (e.g., P0) to be able to control the open-loop power to provide power boosting and enhanced likelihood of successful receipt of the higher priority PUSCH transmissions 225. In some cases, the DCI 215 may be configured with a field to indicate an OLPC parameter set (e.g., DCI format 0-1 or 0-2 can be configured to provide an "OLPC parameter set indication" which may be present if RRC parameter p0-PUSCH-SetList-r16 is configured); otherwise such a field is zero bits. Further, in cases where a SRI field is present in the DCI 215, the field may be a single bit (e.g., RRC parameter p0-List-r16 contains one value), and if the bit is set to zero the SRI field value maps to a first power control parameter set (e.g., that provides default power or no power boosting) and if the bit is set to one the SRI field value maps to a second power control parameter set (e.g., that provides power boosting). For example, the SRI field may indicate a first value (e.g., 0) that maps to sri-PUSCH-PowerControlId, which may indicate a first power control parameter set with P0 (and other uplink power control parameters) that do not provide power boosting (e.g., a no power boost or default power); and the SRI field may indicate a second value (e.g., 1) that maps to p0-PUSCH-SetId-r16, which may indicate a second power control parameter set with P0 and other parameters that provide power boosting.

In other cases, if the SRI field is not present in the DCI, the OLPC parameter set field may be either one bit or two bits (e.g., depending on RRC parameter olpc-ParameterSet). If the field is 0 or 00, a first power control parameter set may be indicated that does not provide power boosting (e.g., P0 is determined from a first P0-PUSCH-AlphaSet in configured p0-AlphaSets). If the field is 1 or 01, a second power control parameter set may be indicated that does provide power boosting (e.g., P0 is determined from a first value in P0-PUSCH-Set-r16 with the lowest p0-PUSCH-SetID value, which provides increased power), corresponding to a first power boosting value of the second power control parameter set. If the field is 10, the second power control parameter set may be indicated that may provide a different level of power boosting than the first power boosting value (e.g., P0 is determined from a second value in P0-PUSCH-Set-r16 with the lowest p0-PUSCH-SetID value). An example RRC information element to provide such a configuration may be:

```
p0-PUSCH-SetList-r16                  SEQUENCE (SIZE
(1..maxNrofSRI-PUSCH-Mappings)) OF P0-PUSCH-Set-r16
P0-PUSCH-Set-r16 ::=                  SEQUENCE {
  p0-PUSCH-SetId-r16                    P0-PUSCH-SetID-r16,
  p0-List-r16                       SEQUENCE (SIZE
(1..maxNrofP0-PUSCH-Set-r16)) OF P0-PUSCH-r16
  }
olpc-ParameterSet                  SEQUENCE {
    olpc-ParameterSetForDCI-Format0-1-r16   INTEGER (1..2)
      olpc-ParameterSetForDCI-Format0-2-r16   INTEGER (1..2)
  }
```

In cases where multiple TRPs are used for communications, per-TRP open loop power control may be indicated in DCI 215. In some cases, two SRI fields may be present in DCI 215, and the two SRI fields and the OLPC parameter set field may be used to indicate the power control parameter set. For example, the OLPC parameter set field may be set to zero, which indicates that the power control parameter set (e.g., the value of P0) is determined from SRI-PUSCH-PowerControl with a sri-PUSCH-PowerControlId value mapped to the SRI field value corresponding to each TRP (which may be referred to as a default configuration when multi-TRPs are configured and two SRI fields are present). If value of the open loop power control parameter set field is one, the power control parameter set (e.g., the value of P0) is determined from a first value in P0-PUSCH-Set with a p0-PUSCH-SetId value mapped to the SRI field value corresponding to each TRP (e.g., each SRI field is mapped to a separate set of OLPC parameters). An example RRC information element to provide such a configuration may be:

```
p0-PUSCH-SetList-r16   SEQUENCE (SIZE
(1..maxNrofSRI-PUSCH-Mappings)) OF P0-PUSCH-Set-r16
p0-PUSCH-SecondSetList   SEQUENCE (SIZE
(1..maxNrofSRI-PUSCH-Mappings)) OF P0-PUSCH-Set-r16
P0-PUSCH-Set-r16 ::= SEQUENCE {
  p0-PUSCH-SetId-r16      P0-PUSCH-SetId-r16,
  p0-List-r16     SEQUENCE (SIZE (1..maxNrofP0-PUSCH-Set-r16)) OF
P0-PUSCH-r16
  }
```

As discussed herein, in cases where DCI 215 schedules multiple PUSCHs (e.g., two or more TBs) with or without repetitions for a UE 115, for a single TRP it may be beneficial to separately control power boosting for different TBs (e.g., due to a TB not colliding with traffic of another UE 115 or colliding TBs having a same priority). Further, for multiple TRP communications, it may be beneficial to separately control the power boosting for different TBs or different sets of TBs as well as different set of transmission occasions of a given TB or TB group. Various techniques as discussed in more detail with reference to FIGS. 3 through 9 provide for separate uplink power control parameters for multiple TBs that may be transmitted to one or more TRPs, which may enhance performance of the wireless communications system through a lower amount of potential interference from power boosted communications, and may enhance UE 115 performance through reduced power consumption.

Figure 3:
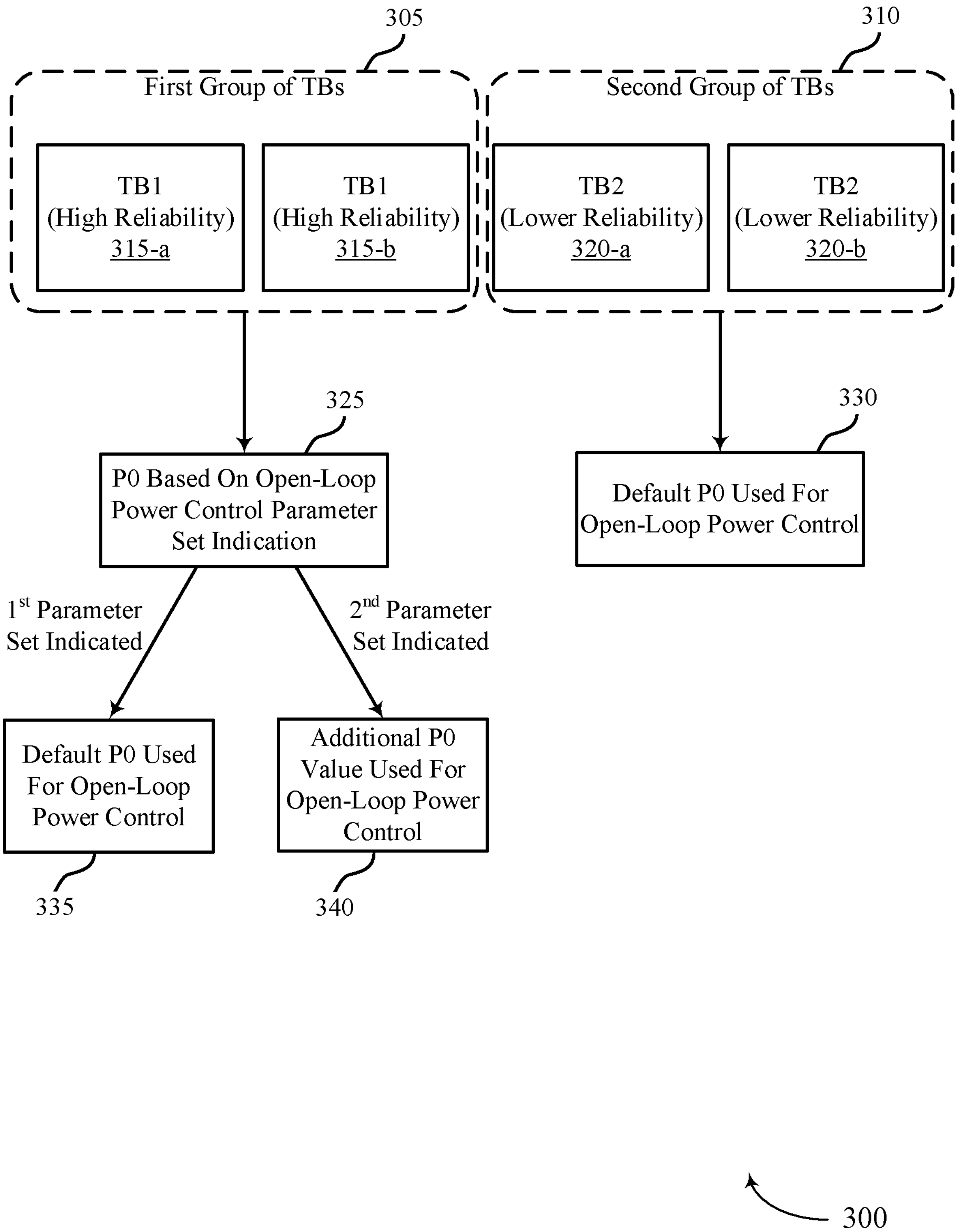
FIG. 3 illustrates an example of transport block (TB) groups that have different open loop power control parameters that support power-boosting techniques for multiple uplink shared channel communications in accordance with examples as disclosed herein.

FIG. 3 illustrates an example of TB groups that have different open loop power control parameters 300 that supports power-boosting techniques for multiple uplink shared channel communications in accordance with examples as disclosed herein. The TB groups that have different open loop power control parameters 300 may include a first group of TBs 305 and a second group of TBs 310, which may be used for communications between a UE and a base station. The UE and the base station may be examples of a UE 115 and a base station 105 as described with reference to FIGS. 1 and 2. In some examples, the base station may transmit control information to the UE that schedules both the first group of TBs 305 and the second group of TBs 310 (e.g., a single DCI that schedules multiple groups of TBs), and indicates uplink power control parameters that are to be used for each group of TBs.

In this example, the first group of TBs 305 may include a first TB 315 that may be a high reliability TB (e.g., the first TB 315 may be used to transmit URLLC data), and the UE may transmit multiple repetitions including a first instance of the first TB 315-*a* and a second instance of the first TB 315-*b*. Further, the second group of TBs 310 may include a second TB 320 that may be a lower reliability TB (e.g., the second TB 320 may be used to transmit eMBB data), and the UE may transmit multiple repetitions including a first instance of the second TB 320-*a* and a second instance of the second TB 320-*b*.

In some cases, when the control information (e.g., a single DCI) schedules multiple PUSCHs with different TBs, including first TB 315 and second TB 320, and optionally where each TB may be configured/indicated with one or multiple repetitions, the scheduled TBs may be divided into the first group of TBs 305 and the second group of TBs 310. In some cases, the UE may receive configuration information (e.g., RRC configuration information) that configures an OLPC parameter set indication that is applied to scheduled communications, and separate power control is provided for each of the first group of TBs 305 and the second group of TBs 310.

In some cases, the first group of TBs 305 and the second group of TBs 310 may be determined based on configuration, one or more attributes associated with each TB, or any combinations thereof. In some cases, the first group of TBs 305 and the second group of TBs 310 may be determined based on RRC configuration (e.g., each PUSCH TB is associated with a group index or priority index, such as an index in the TDRA table is configured for each TB). In other cases, the first group of TBs 305 and the second group of TBs 310 may be determined based on an order of the scheduled TBs. For example, if M TBs are scheduled, the first M 2 TBs belong to the first group of TBs 305 and the second M 2 TBs belong to the second group of TBs 310. In such examples, for more than two groups (e.g., k groups), if M TBs are scheduled, each group may be determined to have M k TBs, where the first M k TBs belong to the first group of TBs 305, the second M k TBs belong to the second group of TBs 310, and so on. In other cases, additionally or alternatively, the first group of TBs 305 and the second group of TBs 310 may be determined based on whether the TB is initial transmission or retransmission (e.g., based on whether a NDI associated with a HARQ process ID of the TB is toggled from a prior NDI value for the associated HARQ process ID). For example, TBs that are retransmission (e.g., based on the corresponding bit in the NDI field) may be in the first group of TBs 305 and have higher priority, and TBs that are initial transmission may be in the second group of TBs 310 and have lower priority. In further cases, an indication may be provided in the DCI that schedules the TBs. For example, a priority indication field may signal (e.g., through one or more bits that are added to an existing priority indication) a priority index for each TB. While various examples discussed herein describe two groups of TBs, additional groups of TBs may be used (e.g., three or more groups of TBs), and various techniques discussed herein also apply to cases where more than two groups of TBs are present.

In the example of FIG. 3, the first group of TBs 305 may be a higher priority group (e.g., based on the first TB 315 having a higher priority than a TB that is transmitted by another UE in overlapping resources of the first group of TBs 305), and OLPC parameters (e.g., $P_0$, alpha) may be based on the OLPC parameter set indication field, as indicated at 325. In this example, the OLPC parameter set indication field is applied to only the first group of TBs 305, but in other examples it may be applied only the second group of TBs 310, or both the first group of TBs 305 and the second group of TBs 310 (e.g., based on RRC configuration). In this example, two repetitions of each TB are associated with a single SRS resource set, and the OLPC parameter set indication field is applied only to the first group of TBs 305, and the second group of TBs 310 may use a default set of OLPC parameters, as indicated at 330. For example, the second group of TBs 310 may use an SRI indication for determination of $P_0$ and other power control parameters when SRI field is present, or always follows the first P0-PUSCH-AlphaSet in p0-AlphaSets when the SRI field is not preset. In this example, the first group of TBs 305, depending on a value of the OLPC parameter set indication field, may use the default set of OLPC parameters as indicated at 335 when a first parameter set is indicated by the OLPC parameter set indication field, or use different power control parameters as indicated at 340 (e.g., a different or additional $P_0$ value such as indicated in P0-PUSCH-Set-r16) when a second parameter set is indicated by the open loop power control parameter set indication field.

Thus, in this example, the first group of TBs 305 may be transmitted at a higher power (e.g., when the associated uplink resources collide with uplink resources of another UE that is transmitting lower priority communications), and the second group of TBs 310 may be transmitted at a lower power than the first group of TBs 305 (e.g., based on the other UE not transmitting in overlapping resources, or based on the second group of TBs 310 having a lower priority).

Figure 4:
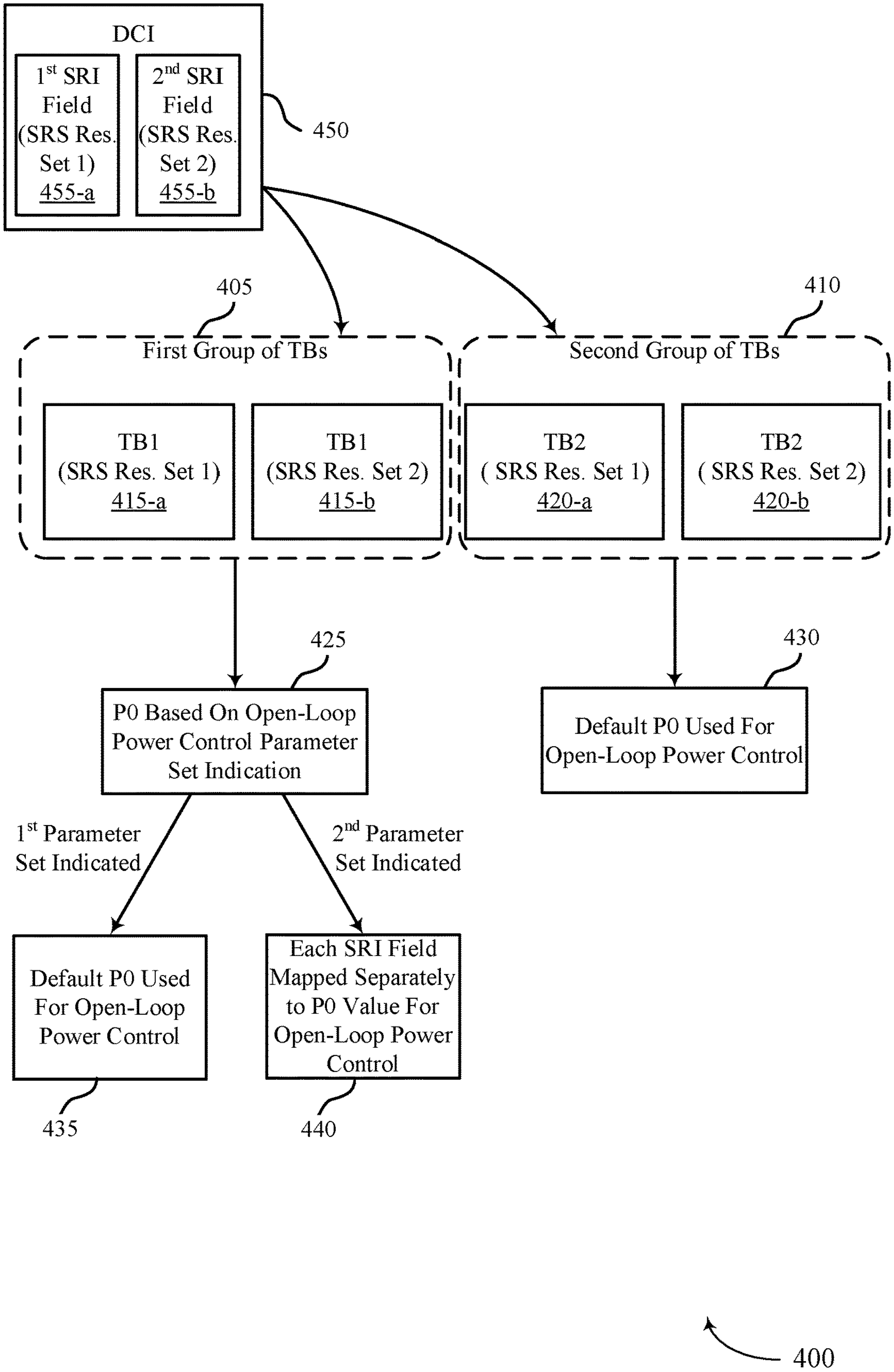
FIGS. 4 and 5 illustrate examples of TB groups associated with different SRS resource sets that have different open loop power control parameters that support power-boosting techniques for multiple uplink shared channel communications in accordance with examples as disclosed herein.

FIG. 4 illustrates an example of TB groups associated with different SRS resource sets that have different OLPC parameters 400 that supports power-boosting techniques for multiple uplink shared channel communications in accordance with examples as disclosed herein. The TB groups associated with different SRS resource sets that have different OLPC parameters 400 may include a first group of TBs 405 and a second group of TBs 410, which may be used for communications between a UE and multiple base stations or TRPs (e.g., a first TRP (TRP1) and a second TRP (TRP2). The UE and the base stations or TRPs may be examples of UEs 115 and base stations 105 or TRPs as described with reference to FIGS. 1 and 2. In some examples, the base station associated with TRP1 may transmit control information in a DCI 450 to the UE that schedules both the first group of TBs 405 and the second group of TBs 410 (e.g., a single DCI that schedules multiple groups of TBs and each group of TBs are associated with multiple SRS resource sets), and indicates uplink power control parameters that are to be used for each group of TBs and transmission occasions associated with each SRS resource set.

In this example, the first group of TBs 405 may include a first TB 415 where a first instance of the first TB 415-*a* is associated with a first SRS resource set and a second instance of the first TB 415-*b* associated with a second SRS resource set. Further, the second group of TBs 410 may include a second TB 420 where a first instance of the second TB 420-*a* is associated with a first SRS resource set and a second instance of the second TB 420-*b* is associated with a second SRS resource set. In some cases, interference of another UE transmitting using overlapping resources may be present in uplink transmissions associated with the first SRS resource set but not be present in uplink transmissions associated with the second SRS resource set (e.g., due to the transmission of other UE being associated with the first SRS resource set).

In some cases, when the control information of DCI 450 schedules multiple PUSCHs with different TBs associated with multiple SRS resource set, the scheduled TBs may be divided into at least the first group of TBs 405 and the second group of TBs 410 using similar techniques as discussed with reference to FIG. 3.

In the example of FIG. 4, the first group of TBs 405 may be a higher priority group and communications associated with first SRS resource set may experience interference from another UE, and OLPC parameters (e.g., $P_0$) may be based on the OLPC parameter set indication field, as indicated at 425. In this example, the OLPC parameter set indication field is applied to only the first group of TBs 405, but in other examples it may be applied only the second group of TBs 410, or both the first group of TBs 405 and the second group of TBs 410 (e.g., based on RRC configuration). In this example, the OLPC parameter set indication field is applied only to the first group of TBs 405, and the second group of TBs 410 may use a default set of OLPC parameters, as indicated at 430. For example, the second group of TBs 410 may use the default set of OLPC parameters as indicated at 430. For example, the default set of OLPC parameters may follow the SRI indication for determination of uplink power control parameters (e.g., $P_0$) when the SRI field is present, or follows the first P0-PUSCH-AlphaSet in p0-AlphaSets when SRI field is not present.

In this example, for the first group of TBs 405, when the OLPC parameter set indication field has a first value to indicate a first parameter set, as indicated at 435, the default set of open loop power control parameters may follow the SRI indication when separate SRI fields are present for the multiple SRS resource sets to determine uplink power control parameters. For example, the UE may determine the value of $P_0$ from SRI-PUSCH-PowerControl with a sri-PUSCH-PowerControlId value mapped to the SRI field value corresponding to each SRS resource set. In cases where the OLPC parameter set indication field has a second value to indicate a second parameter set, as indicated at 440, the UE may determine OLPC parameters (e.g., values of $P_0$) for each SRS resource set based on configured parameter sets that are mapped to each SRI field for each SRS resource set. In the example of FIG. 4, the DCI 450 may include a first SRI field 455-*a* for a first SRS resource set and a second SRI field 455-*b* for a second SRS resource set, which may be used to determine open loop power control parameters. For example, the UE may determine $P_0$ from a first value in P0-PUSCH-Set with a p0-PUSCH-SetId value mapped to the SRI field 455 value corresponding to each SRS resource set. In some cases, the RRC parameter p0-PUSCH-SetList-r16 can be the same, or two different lists can be configured corresponding to the sets of transmission occasions associated with different SRS resource sets. An example RRC information element to provide such a configuration may be:

```
p0-PUSCH-SetList-r16 SEQUENCE (SIZE
(1..maxNrofSRI-PUSCH-Mappings)) OF P0-PUSCH-Set-r16
p0-PUSCH-SecondSetList SEQUENCE (SIZE
(1..maxNrofSRI-PUSCH-Mappings)) OF P0-PUSCH-Set-r16
P0-PUSCH-Set-r16 ::= SEQUENCE {
  p0-PUSCH-SetId-r16   P0-PUSCH-SetId-r16,
  p0-List-r16                SEQUENCE (SIZE
(1..maxNrofP0-PUSCH-Set-r16)) OF P0-PUSCH-r16
    }
```

Accordingly, in this example, the first group of TBs 405 associated with one or both SRS resource sets may be transmitted at a higher power (e.g., when the associated uplink resources collide with uplink resources of another UE that is transmitting lower priority communications that interfere with one or both TRP communications), and the second group of TBs 410 may be transmitted at a lower power than the first group of TBs 405 (e.g., based on the other UE not transmitting in overlapping resources, or based on the second group of TBs 410 having a lower priority).

Figure 5:
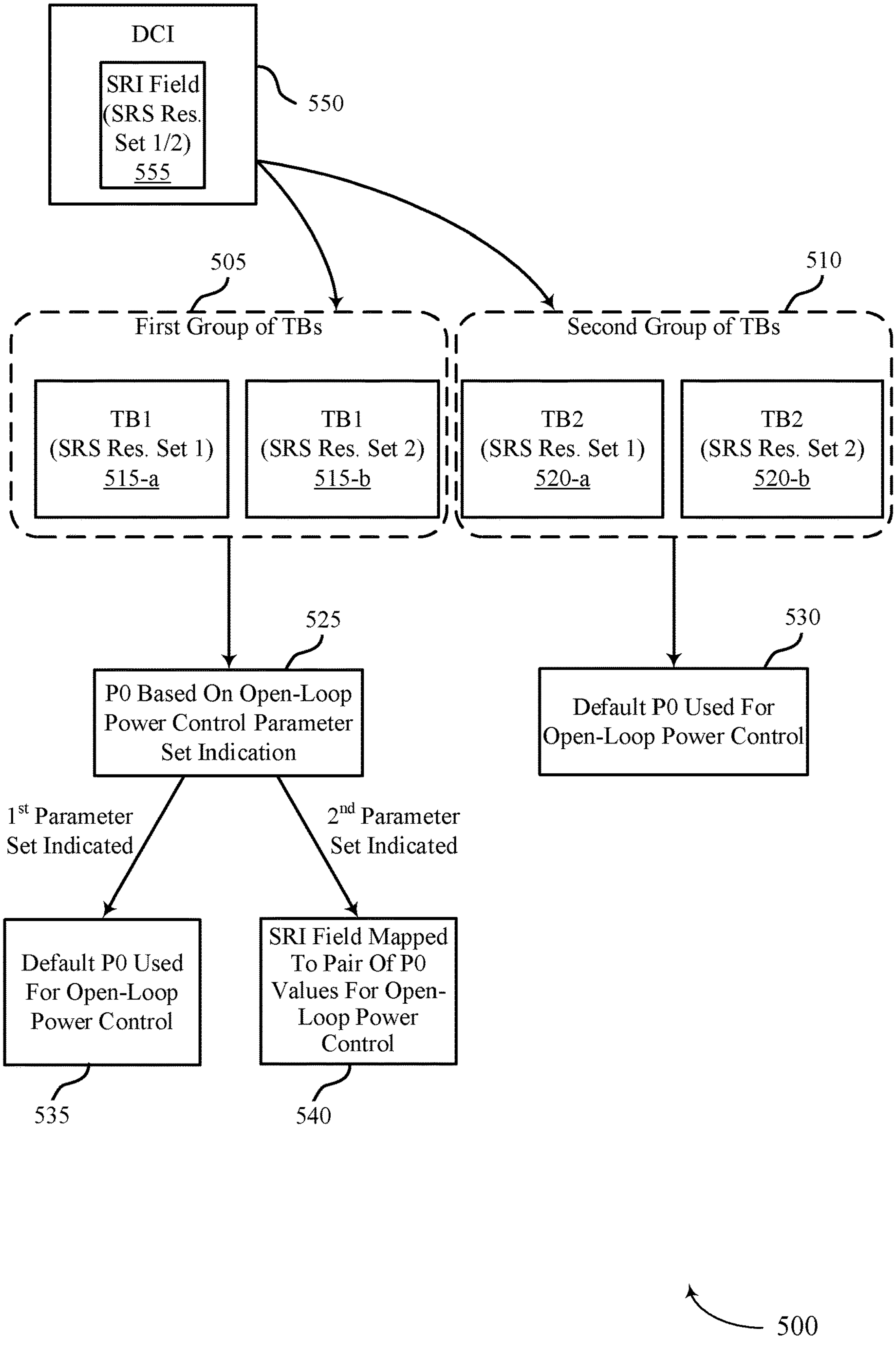

FIG. 5 illustrates an example of TB groups associated with different SRS resource sets that have different OLPC parameters 500 that support power-boosting techniques for multiple uplink shared channel communications in accordance with examples as disclosed herein. The TB groups associated with different SRS resource sets that have different OLPC parameters 500 may include a first group of TBs 505 and a second group of TBs 510, which may be used for communications between a UE and a multiple base stations or TRPs (e.g., TRP1 and TRP2). The UE and the base stations or TRPs may be examples of UEs 115 and base stations 105 or TRPs as described with reference to FIGS. 1 and 2. In some examples, the base station associated with TRP1 may transmit control information in a DCI 550 to the UE that schedules both the first group of TBs 505 and the second group of TBs 510 (e.g., a single DCI that schedules multiple groups of TBs and each group of TBs are associated with multiple SRS resource sets), and indicates uplink power control parameters that are to be used for each group of TBs and transmission occasions associated with each SRS resource set.

In this example, the first group of TBs 505 may include a first TB 515 where a first instance of the first TB 515-*a* is associated with a first SRS resource set and a second instance of the first TB 515-*b* is associated with a second SRS resource set. Further, the second group of TBs 510 may include a second TB 520 where a first instance of the second TB 520-*a* is associated with a first SRS resource set and a second instance of the second TB 520-*b* is associated with a second SRS resource set. In some cases, interference of another UE transmitting using overlapping resources may be present in uplink transmissions associated with the first SRS resource set but not be present in uplink transmissions associated with the second SRS resource set (e.g., due to the transmission of other UE being associated with first SRS resource set).

In the example of FIG. 5, the first group of TBs 505 may be a higher priority group and communications associated with a first SRS resource set may experience interference from another UE, and OLPC parameters (e.g., $P_0$) may be based on the OLPC parameter set indication field, as indicated at 525. In this example, the OLPC parameter set indication field is applied to only the first group of TBs 505, but in other examples it may be applied only the second group of TBs 510, or both the first group of TBs 505 and the second group of TBs 510 (e.g., based on RRC configuration). In this example, the OLPC parameter set indication field is applied only to the first group of TBs 505, and the second group of TBs 510 may use a default set of OLPC parameters, as indicated at 530. For example, the second group of TBs 510 may use the default set of OLPC parameters as indicated at 530. For example, the default set of OLPC parameters may follow the SRI indication for determination of uplink power control parameters (e.g., $P_0$) when the SRI field is present, or follows the first P0-PUSCH-AlphaSet in p0-AlphaSets when SRI field is not present.

In this example, a single SRI field 555 may be present in the DCI 550, and is applied to both sets of transmission occasions of all TBs. In this case, for the first group of TBs 505, when the OLPC parameter set indication field has a first value to indicate a first parameter set, as indicated at 535, the default set of OLPC parameters may follow the SRI indication for the multiple SRS resource sets to determine uplink power control parameters. For example, the UE may determine the value of $P_0$ from SRI-PUSCH-PowerControl with a sri-PUSCH-PowerControlId value mapped to the single SRI field value for both SRS resource sets.

In cases where the OLPC parameter set indication field has a second value to indicate a second parameter set, as indicated at 540, the UE may determine OLPC parameters (e.g., values of $P_0$) for each SRS resource set based on a SRI codepoint that may be mapped to a pair of OLPC parameters (e.g., a pair of additional $P_0$ values). In some examples, if SRI is present, the SRI field 555 is mapped to p0-PUSCH-SetId-r16 associated with the pair of additional $P_0$ values (e.g., corresponding to p0-List-r16 that is used for the first set of transmission occasions associated with the first SRS resource set and P0-second-List-r17 is used for the second set of transmission occasions associated with the second SRS resource set).

In other cases, if the SRI field 555 is not present and the OLPC parameter set indication field has the first value to indicate the first parameter set (e.g., the parameter set indication field is not set to 0 (in case of 1 bit) or 00 (in case of 2 bits)), the pair of $P_0$ values may be determined from additional $P_0$ values in P0-PUSCH-Set-r16 with the lowest p0-PUSCH-SetId-r16 (e.g., corresponding p0-List-r16 that is used for the first set of transmission occasions associated with the first SRS resource set and P0-second-List-r17 that is used for the second set of transmission occasions associated with the second SRS resource set). An example RRC information element to provide such a configuration may be:

```
P0-PUSCH-Set-r16 ::=            SEQUENCE
  p0-PUSCH-SetId-r16                P0-PUSCH-SetId-r16,
  p0-List-r16                   SEQUENCE (SIZE
(1..maxNrofP0-PUSCH-Set-r16)) OF P0-PUSCH-r16
    P0-second-List-r17                SEQUENCE (SIZE (1..maxNrofP0-
PUSCH-Set-r16)) OF P0-PUSCH-r16
    }
```

Accordingly, in this example, the first group of TBs 505 associated with one or both SRS resource sets may be transmitted at a higher power (e.g., when the associated uplink resources collide with uplink resources of another UE that is transmitting lower priority communications that interfere with one or both TRP communications), and the second group of TBs 510 may be transmitted at a lower power than the first group of TBs 505 (e.g., based on the other UE not transmitting in overlapping resources, or based on the second group of TBs 510 having a lower priority).

FIG. 6 illustrates an example of TB groups that have different OLPC parameters 600 that support power-boosting techniques for multiple uplink shared channel communications in accordance with examples as disclosed herein. Similarly as with FIGS. 3 through 5, the TB groups that have different OLPC parameters 600 may include a first group of TBs 605 and a second group of TBs 610, which may be used for communications between a UE and a base station. The UE and the base station may be examples of a UE 115 and a base station 105 as described with reference to FIGS. 1 and 2. In some examples, the base station may transmit control information to the UE that schedules both the first group of TBs 605 and the second group of TBs 610 (e.g., a single DCI that schedules multiple groups of TBs), and indicates uplink power control parameters that are to be used for each group of TBs.

In this example, the first group of TBs 605 may include a first TB 615, and the UE may transmit multiple repetitions including a first instance of the first TB 615-*a* and a second instance of the first TB 615-*b*. Further, the second group of TBs 610 may include a second TB 620, and the UE may transmit multiple repetitions including a first instance of the second TB 620-*a* and a second instance of the second TB 620-*b*. In some cases, the UE may receive configuration information (e.g., RRC configuration information) that configures an OLPC parameter set indication that is applied to scheduled communications, and separate power control is provided for each of the first group of TBs 605 and the second group of TBs 610.

In the example of FIG. 6, control information (e.g., the single DCI that schedules the first group of TBs 605 and the second group of TBs 610) may dynamically indicate whether different open loop power control parameters (e.g., additional $P_0$) should be applied for determining power for the first group of TBs 605 or the second group of TBs 610 separately (e.g., DCI separately indicates whether power boosting should be applied to each group of TBs). In some cases, a control information field (e.g., a DCI field) may be provided that is separate from other control information fields and indicates whether the OLPC parameter set indication field is applied to the first group of TBs 605, the second group of TBs 610, or both groups of TBs. In other cases, the control information may include a secondary OLPC parameter set indication field. In such cases, the first OLPC parameter set indication field corresponds to the first group of TBs 605, and the second OLPC parameter set indication field corresponds to the second group of TBs 610. The presence of the additional control information field may be separately configured at the UE (e.g., by RRC parameter). When the control information schedules only one group of TBs, the second field may be set to zero. In still other cases, a number of bits in the OLPC parameter set indication field may be increased. In such cases, the most significant bit(s) of the OLPC parameter set indication field may be applied to the first group of TBs 605 and the least significant bit(s) of the field may be applied to the second group of TBs 610.

In the example of FIG. 6, the first group of TBs 605 may have OLPC parameters (e.g., $P_0$) that are based on a first OLPC parameter set indicated by the first OLPC parameter set indication field, as indicated at 625. In this example, the second group of TBs 610 may have OLPC parameters (e.g., $P_0$) that are based on a second OLPC parameter set indicated by the second open loop power control parameter set indication field, as indicated at 630.

In this example, the first group of TBs 605, depending on a value of the first OLPC parameter set indication field, may use the default set of OLPC parameters as indicated at 635 when a first parameter set is indicated by the first OLPC parameter set indication field, or use different power control parameters as indicated at 640 (e.g., a different or additional $P_0$ value such as indicated in P0-PUSCH-Set-r16) when a second parameter set is indicated by the first OLPC parameter set indication field. Further, the second group of TBs 610, depending on a value of the second OLPC parameter set indication field, may use the default set of OLPC parameters as indicated at 645 when the first parameter set is indicated by the second OLPC parameter set indication field, or use different power control parameters as indicated at 650 (e.g., a different or additional $P_0$ value such as indicated in P0-PUSCH-Set-r16) when the second parameter set is indicated by the second OLPC parameter set indication field. An example RRC information element to provide such a configuration may be:

```
p0-PUSCH-SetList-r16        SEQUENCE (SIZE (1..maxNrofSRI-PUSCH-
Mappings)) OF P0-PUSCH-Set-r16
P0-PUSCH-Set-r16 ::=        SEQUENCE {
  p0-PUSCH-SetId-r16           P0-PUSCH-SetId-r16,
  p0-List-r16             SEQUENCE (SIZE
(1..maxNrofP0-PUSCH-Set-r16)) OF P0-PUSCH-r16
    }
olpc-ParameterSet          SEQUENCE {
    olpc-ParameterSetForDCI-Format0-1-r16 INTEGER (1..2)
       olpc-ParameterSetForDCI-Format0-2-r16 INTEGER (1..2)
    }
```

Thus, in this example, the first group of TBs 605, the second group of TBs, or both, may be transmitted at a higher power (e.g., when the associated uplink resources collide with uplink resources of another UE that is transmitting lower priority communications), or at a lower power (e.g., based on the other UE not transmitting in overlapping resources, or based on the associated group of TBs having a lower priority). Additionally, such techniques may be extended for use in multi-TRP communications, such as discussed with reference to the examples of FIGS. 7 and 8.

Figure 7:
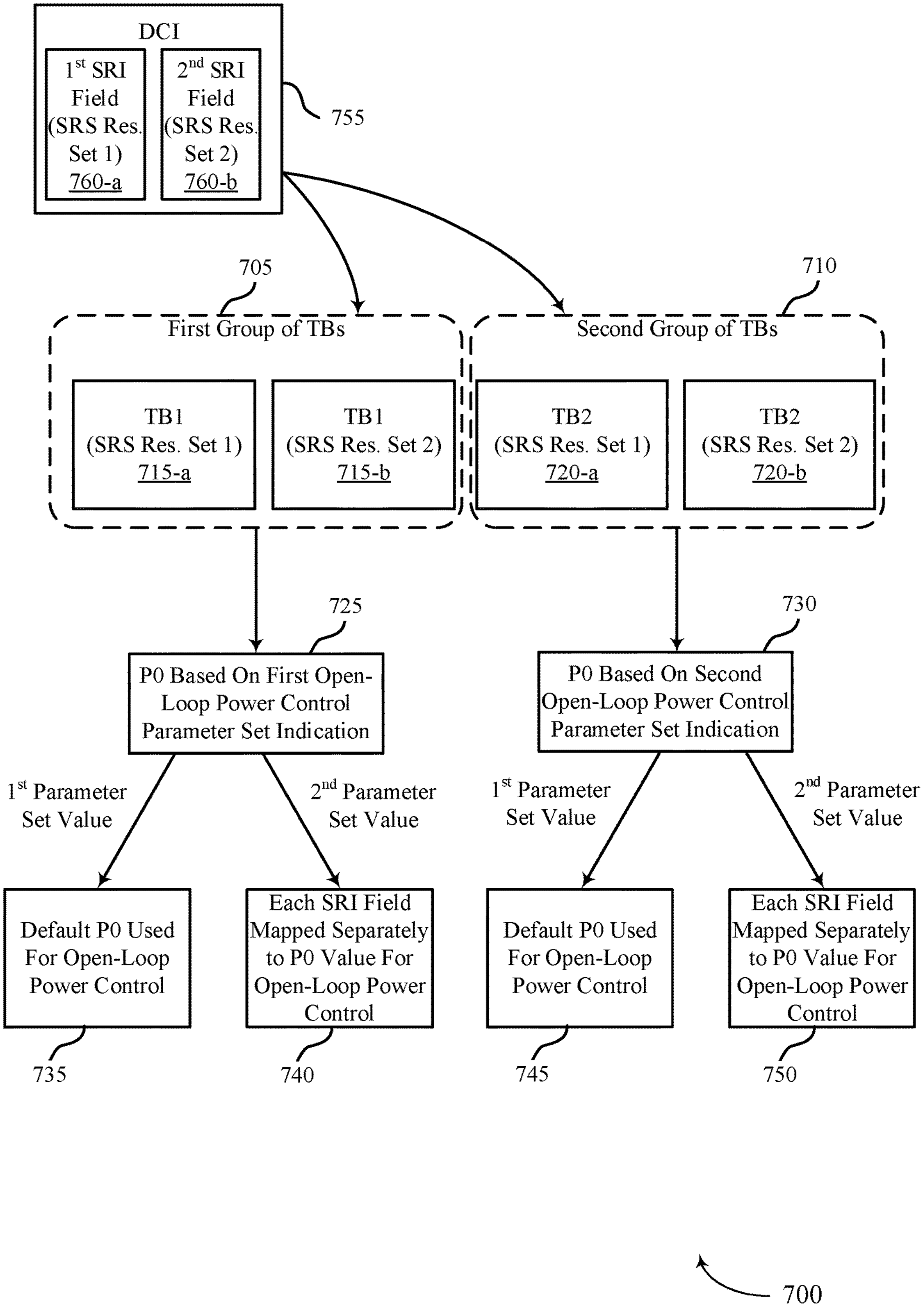
FIGS. 7 and 8 illustrate examples of TB groups for different TRPs that have different open loop power control parameters that support power-boosting techniques for multiple uplink shared channel communications in accordance with examples as disclosed herein.

FIG. 7 illustrates an example of TB groups associated with different SRS resource sets that have different OLPC parameters 700 that support power-boosting techniques for multiple uplink shared channel communications in accordance with examples as disclosed herein. The TB groups associated with different SRS resource sets that have different OLPC parameters 700 may include a first group of TBs 705 and a second group of TBs 710, which may be used for communications between a UE and a multiple base stations or TRPs (e.g., a first TRP (TRP1) and a second TRP (TRP2)). The UE and the base stations or TRPs may be examples of UEs 115 and base stations 105 or TRPs as described with reference to FIGS. 1 and 2. In some examples, the base station associated with TRP1 may transmit control information in a DCI 755 to the UE that schedules both the first group of TBs 705 and the second group of TBs 710 (e.g., a single DCI that schedules multiple groups of TBs and each group of TBs are associated with multiple SRS resource sets), and indicates uplink power control parameters that are to be used for each group of TBs and transmission occasions associated with each SRS resource set.

In this example, the first group of TBs 705 may include a first TB 715 where a first instance of the first TB 715-*a* is associated with a first SRS resource set and a second instance of the first TB 715-*b* is associated with a second SRS resource set. Further, the second group of TBs 710 may include a second TB 720 where a first instance of the second TB 720-*a* is associated with a first SRS resource set and a second instance of the second TB 720-*b* is associated with a second SRS resource set. In some cases, interference of another UE transmitting using overlapping resources may be present in uplink transmissions associated with first SRS resource set, second SRS resource set, or both (e.g., due to the transmission of other UE being associated with one or both of first SRS resource set and second SRS resource set).

In the example of FIG. 7, the first group of TBs 705 may use a first set of OLPC parameters (e.g., $P_0$, alpha for each TRP) based on a first OLPC parameter set indication, as indicated at 725 (e.g., based on the first OLPC parameter set indication field or the most significant bit(s) of the OLPC parameter set indication field). Further, the second group of TBs 710 may use a second set of OLPC parameters (e.g., $P_0$ for each SRS resource set) based on a second OLPC parameter set indication field, as indicated at 730 (e.g., based on the second OLPC parameter set indication field or the least significant bit(s) of the OLPC parameter set indication field).

In some cases, for each group of TBs, if SRI field is present and the corresponding OLPC parameter set indication field is not set to zero, and if separate SRI fields 760 (e.g., first SRI field 760-*a* for first SRS resource set and second SRI field 760 for second SRS resource set) are applied to each set of transmission occasions of the TBs, the UE may determine the OLPC parameters (e.g., values of $P_0$) from a first value in P0-PUSCH-Set-r16 with a p0-PUSCH-SetId-r16 value mapped to the value in the SRI field 760 corresponding to each SRS resource set. In such cases, the configuration of the parameter sets may use same parameter sets or different lists of parameter sets (e.g., the RRC parameter p0-PUSCH-SetList-r16 can be the same, or two different lists can be configured corresponding to the sets of transmission occasions associated with different SRS resource set).

In this example, for the first group of TBs 705, when the OLPC parameter set indication has a first value to indicate a first parameter set, as indicated at 735, the default set of OLPC parameters may follow the SRI indication when separate SRI fields are present for the multiple SRS resource sets to determine uplink power control parameters. For example, the UE may determine the value of $P_0$ from SRI-PUSCH-PowerControl with a sri-PUSCH-PowerControlId value mapped to the SRI field value corresponding to each SRS resource set. In cases where the OLPC parameter set indication field has a second value to indicate a second parameter set, as indicated at 740, the UE may determine OLPC parameters (e.g., values of $P_0$) for each SRS resource set based on configured parameter sets that are mapped to each SRI field for each SRS resource set. In the example of FIG. 7, the DCI 755 may include a first SRI field 760-*a* for a first SRS resource set and a second SRI field 760-*b* for a second SRS resource set, which may be used to determine OLPC parameters. For example, the UE may determine $P_0$ from a first value in P0-PUSCH-Set-r16 with a p0-PUSCH-SetId-r16 value mapped to the SRI field 760 value corresponding to each SRS resource set. In some cases, the RRC parameter p0-PUSCH-SetList-r16 can be the same, or two different lists can be configured corresponding to the sets of transmission occasions associated with different SRS resource sets.

Likewise, for the second group of TBs 710, when OLPC parameter set indication has the first value to indicate a first parameter set, as indicated at 745, the default set of OLPC parameters may follow the SRI indication when separate SRI fields are present for the multiple SRS resource sets to determine uplink power control parameters (e.g., the UE may determine the value of $P_0$ from SRI-PUSCH-Power-Control with a sri-PUSCH-PowerControlId value mapped to the SRI field value corresponding to each SRS resource set). In cases where the OLPC parameter set indication field has the second value to indicate the second parameter set, as indicated at 750, the UE may determine OLPC parameters (e.g., values of $P_0$) for each SRS resource set based on configured parameter sets that are mapped to each SRI field for each SRS resource set. In the example of FIG. 7, the DCI 755 may include a first SRI field 760-*a* for a first SRS resource set and a second SRI field 760-*b* for a second SRS resource set, which may be used to determine OLPC parameters. For example, the UE may determine $P_0$ from a first value in P0-PUSCH-Set-r16 with a p0-PUSCH-SetId-r16 value mapped to the SRI field 760 value corresponding to each SRS resource set. In some cases, the RRC parameter p0-PUSCH-SetList-r16 can be the same, or two different lists can be configured corresponding to the sets of transmission occasions associated with different SRS resource sets. An example RRC information element to provide such a configuration may be:

```
p0-PUSCH-SetList-r16 SEQUENCE (SIZE
(1..maxNrofSRI-PUSCH-Mappings)) OF P0-PUSCH-Set-r16
p0-PUSCH-SecondSetList SEQUENCE (SIZE (1..maxNrofSRI-PUSCH-
Mappings)) OF P0-PUSCH-Set-r16
P0-PUSCH-Set-r16 ::= SEQUENCE {
  p0-PUSCH-SetId-r16        P0-PUSCH-SetId-r16,
  p0-List-r16          SEQUENCE (SIZE
(1..maxNrofP0-PUSCH-Set-r16)) OF P0-PUSCH-r16
    }
```

Thus, in this example, the first group of TBs 705, the second group of TBs 710, or both, associated with one or both of a first SRS resource set or a second SRS resource set may be transmitted at a higher power (e.g., when the associated uplink resources collide with uplink resources of another UE that is transmitting lower priority communications that may cause interference to the transmission associated with a SRS resource set), or at a lower power (e.g., based on the other UE not transmitting in overlapping resources, based on the associated group of TBs having a lower priority, or based on the transmission associated with the SRS resource set being less likely to experience interference from the other UE).

Figure 8:
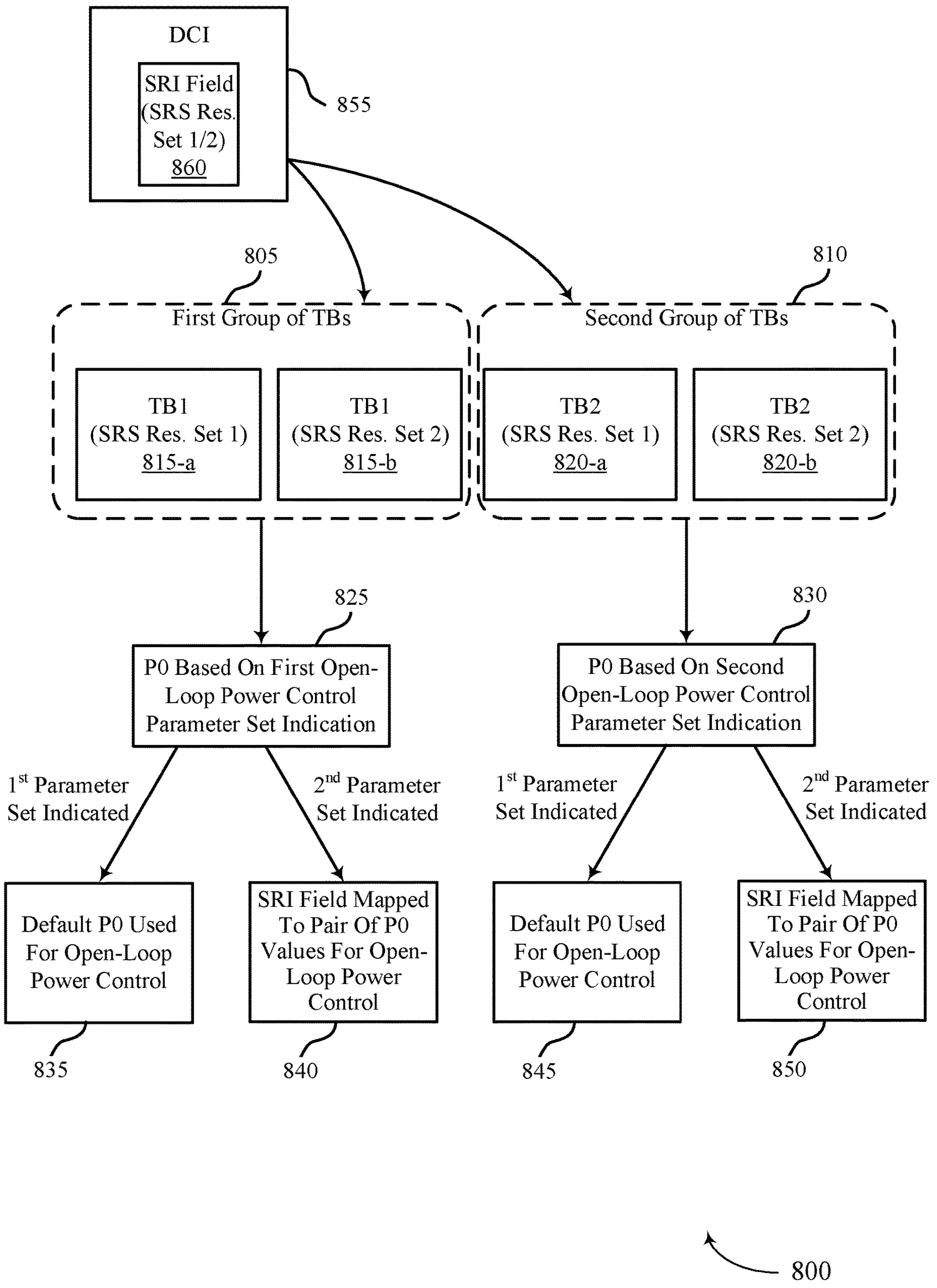

FIG. 8 illustrates an example of TB groups associated with different SRS resource sets that have different OLPC parameters 800 that support power-boosting techniques for multiple uplink shared channel communications in accordance with examples as disclosed herein. The TB groups associated with different SRS resource sets that have different OLPC parameters 800 may include a first group of TBs 805 and a second group of TBs 810, which may be used for communications between a UE and a multiple base stations or TRPs (e.g., a first TRP (TRP1) and a second TRP (TRP2)). The UE and the base stations or TRPs may be examples of UEs 115 and base stations 105 or TRPs as described with reference to FIGS. 1 and 2. In some examples, the base station associated with TRP1 may transmit control information in a DCI 855 to the UE that schedules both the first group of TBs 805 and the second group of TBs 810 (e.g., a single DCI that schedules multiple groups of TBs and each group of TBs are associated with multiple SRS resource sets), and indicates uplink power control parameters that are to be used for each group of TBs and transmission occasions associated with each SRS resource set.

In this example, the first group of TBs 805 may include a first TB 815 where a first instance of the first TB 815-*a* is associated with a first SRS resource set and a second instance of the first TB 815-*b* is associated with a second SRS resource set. Further, the second group of TBs 810 may include a second TB 820 where a first instance of the second TB 820-*a* is associated with a first SRS resource set and a second instance of the second TB 820-*b* is associated with a second SRS resource set. In some cases, interference of another UE transmitting using overlapping resources may be present in uplink transmissions associated with a first SRS resource set, a second SRS resource set, or both (e.g., due to the transmission of other UE being associated with one or both of the first SRS resource set and the second SRS resource set).

In the example of FIG. 8, the first group of TBs 805 may use a first set of OLPC parameters (e.g., $P_0$ for each SRS resource set) based on a first OLPC parameter set indication, as indicated at 825 (e.g., based on the first OLPC parameter set indication field or the most significant bit(s) of the OLPC parameter set indication field). Further, the second group of TBs 810 may use a second set of OLPC parameters (e.g., $P_0$ for each SRS resource set) based on a second OLPC parameter set indication field, as indicated at 830 (e.g., based on the second OLPC parameter set indication field or the least significant bit(s) of the OLPC parameter set indication field).

In this example, a single SRI field 860 is applied to both sets of transmission occasions of all TBs, and each SRI codepoint is mapped to a pair of additional OLPC values (e.g., a pair of $P_0$ values). In some cases, where the SRI field 860 is present, SRI field 860 may be mapped to p0-PUSCH-SetId-r16 associated with the pair of additional $P_0$ values corresponding to p0-List-r16 used for the first set of transmission occasions (e.g., associated with a first SRS resource set) and P0-second-List-r17 used for the second set of transmission occasions (e.g., associated with a second SRS resource set). If SRI is not present the pair OLPC parameters (e.g., the pair of $P_0$ values) may be determined from additional parameters (e.g., $P_0$ values) in P0-PUSCH-Set-r16 with the lowest p0-PUSCH-SetId-r16 (corresponding p0-List-r16 may be used for the first set of transmission occasions and P0-second-List-r17 may be used for the second set of transmission occasions).

Thus, in this example, for the first group of TBs 805, when the OLPC parameter set indication has a first value to indicate a first parameter set, as indicated at 835, the default set of OLPC parameters may follow the SRI indication when the single SRI field 860 is present for the multiple SRS resource sets to determine uplink power control parameters. In cases where the OLPC parameter set indication field has a second value to indicate a second parameter set, as indicated at 840, the UE may determine OLPC parameters (e.g., values of $P_0$) for each SRS resource set based on configured parameter sets that are mapped to a pair of OLPC values (e.g., a pair of $P_0$ values) associated with each SRS resource set. For example, SRI field 860 may be mapped to p0-PUSCH-SetId-r16 associated with the pair of additional $P_0$ values corresponding to p0-List-r16 used for the first set of transmission occasions (e.g., associated with a first SRS resource set) and P0-second-List-r17 used for the second set of transmission occasions (e.g., associated with a second SRS resource set).

Likewise, for the second group of TBs 810, when the OLPC parameter set indication has a first value to indicate a first parameter set, as indicated at 845, the default set of OLPC parameters may follow the SRI indication when the single SRI field 860 is present for the multiple SRS resource sets to determine uplink power control parameters. In cases where the OLPC parameter set indication field has a second value to indicate a second parameter set, as indicated at 850, the UE may determine OLPC parameters (e.g., values of $P_0$) for each TRP based on configured parameter sets that are mapped to the pair of OLPC values (e.g., a pair of $P_0$ values) associated with each SRS resource set. For example, SRI field 860 may be mapped to p0-PUSCH-SetId-r16 associated with the pair of additional $P_0$ values corresponding to p0-List-r16 used for the first set of transmission occasions (e.g., associated with a first SRS resource set) and P0-second-List-r17 used for the second set of transmission occasions (e.g., associated with a second SRS resource set). An example RRC information element to provide such a configuration may be:

```
P0-PUSCH-Set-r16 ::=              SEQUENCE {
  p0-PUSCH-SetId-r16                  P0-PUSCH-SetId-r16,
  p0-List-r16                     SEQUENCE (SIZE
(1..maxNrofP0-PUSCH-Set-r16)) OF P0-PUSCH-r16
      P0-second-List-r17                  SEQUENCE (SIZE
(1..maxNrofP0-PUSCH-Set-r16)) OF P0-PUSCH-r16
      }
```

Thus, in this example, the first group of TBs 805, the second group of TBs 810, or both, associated with one or both of the first SRS resource set or the second SRS resource set may be transmitted at a higher power (e.g., when the associated uplink resources collide with uplink resources of another UE that is transmitting lower priority communications that may cause interference to the transmission associated with a SRS resource set), or at a lower power (e.g., based on the other UE not transmitting in overlapping resources, based on the associated group of TBs having a lower priority, or based on the transmission associated with the SRS resource set being less likely to experience interference from the other UE).

Figure 9:
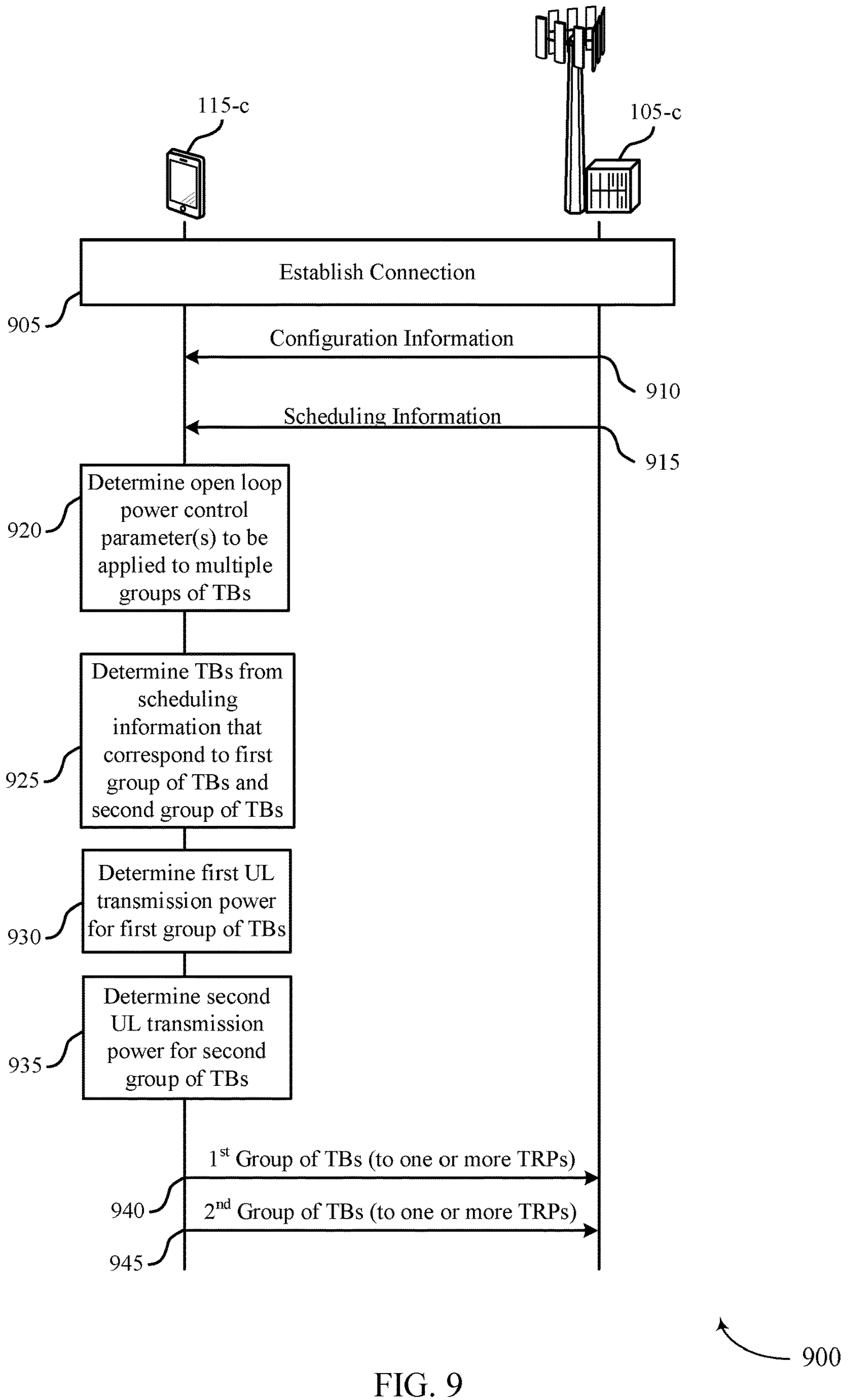
FIG. 9 illustrates an example of a process flow that supports power-boosting techniques for multiple uplink shared channel communications in accordance with examples as disclosed herein.

FIG. 9 illustrates an example of a process flow 900 that supports power-boosting techniques for multiple uplink shared channel communications in accordance with examples as disclosed herein. The process flow 900 may include various aspects of the present disclosure described with reference to FIGS. 1 through 8. For example, the process flow 900 may illustrate communications between a UE 115-*c* and a base station 105-*c*, which may be examples of corresponding devices as described with reference to FIGS. 1 through 8. In some examples, the base station 105-*c* may transmit a configuration for open loop power control and the UE 115-*c* and base station 105-*c* may communicate in accordance with the configured open loop power control for multiple groups of TBs that are scheduled with a control information (e.g., DCI) transmission. Alternative examples of the following may be implemented, where some steps are performed in a different order than described or are not performed at all. In some cases, a step may include additional features not mentioned below, or further steps may be added.

At 905, the base station 105-*c* and UE 115-*c* may establish a connection via one or multiple TRPs. In some cases, the connection establishment may be performed in accordance with connection establishment techniques for a wireless communication system (e.g., through a RRC connection establishment or reestablishment procedure).

At 910, the base station 105-*c* may transmit configuration information to the UE 115-*c*. The configuration information may include, for example, configuration for determining a group index for multiple TBs that may be scheduled in a single DCI, configuration for one or more fields that may be provided with scheduling information, configuration for open loop power control parameters (e.g., such as discussed with reference to FIGS. 2 through 7), or any combinations thereof. The configuration information may be provided in RRC signaling (e.g., as part of the connection establishment procedure or separately from the connection establishment procedure), for example.

At 915, the base station 105-*c* may transmit scheduling information to the UE 115-*c*. The scheduling information may be transmitted, for example, in DCI, and may indicate that multiple TBs are scheduled for uplink transmission from the UE 115-*c*. The scheduling information may also indicate information for determining OLPC parameters for the multiple TBs for one or more TRPs, such as discussed with reference to FIGS. 2 through 7.

At 920, the UE 115-*c* may determine OLPC parameters that are to be applied to two or more different groups of TBs. The determination of the OLPC parameters may be performed using various techniques as discussed herein, such as discussed with reference to FIGS. 2 through 7. At 925, the UE 115-*c* may determine TBs from the scheduling information that correspond to a first group of TBs and a second group of TBs (and optionally one or more additional groups of TBs based on the configuration and scheduling information). The determination of the group of TBs may be performed in accordance with techniques as discussed herein, such as discussed with reference to FIG. 2.

At 930, the UE 115-*c* may determine a first uplink transmit power for the first group of TBs based at least in part on the determined OLPC parameters. Likewise, at 935, the UE 115-*c* may determine a second uplink transmit power for the second group of TBs based at least in part on the determined OLPC parameters. The uplink transmit powers may be determined for one SRS resource set, or for multiple SRS resource sets in cases where uplink transmission associated with multiple SRS resource sets are used. At 940, the UE 115-*c* may transmit the first group of TBs to one or more TRPs using the determined first uplink transmit power(s); and at 945, the UE 115-*c* may transmit the second group of TBs to one or more TRPs using the determined second uplink transmit power(s).

Figure 10:
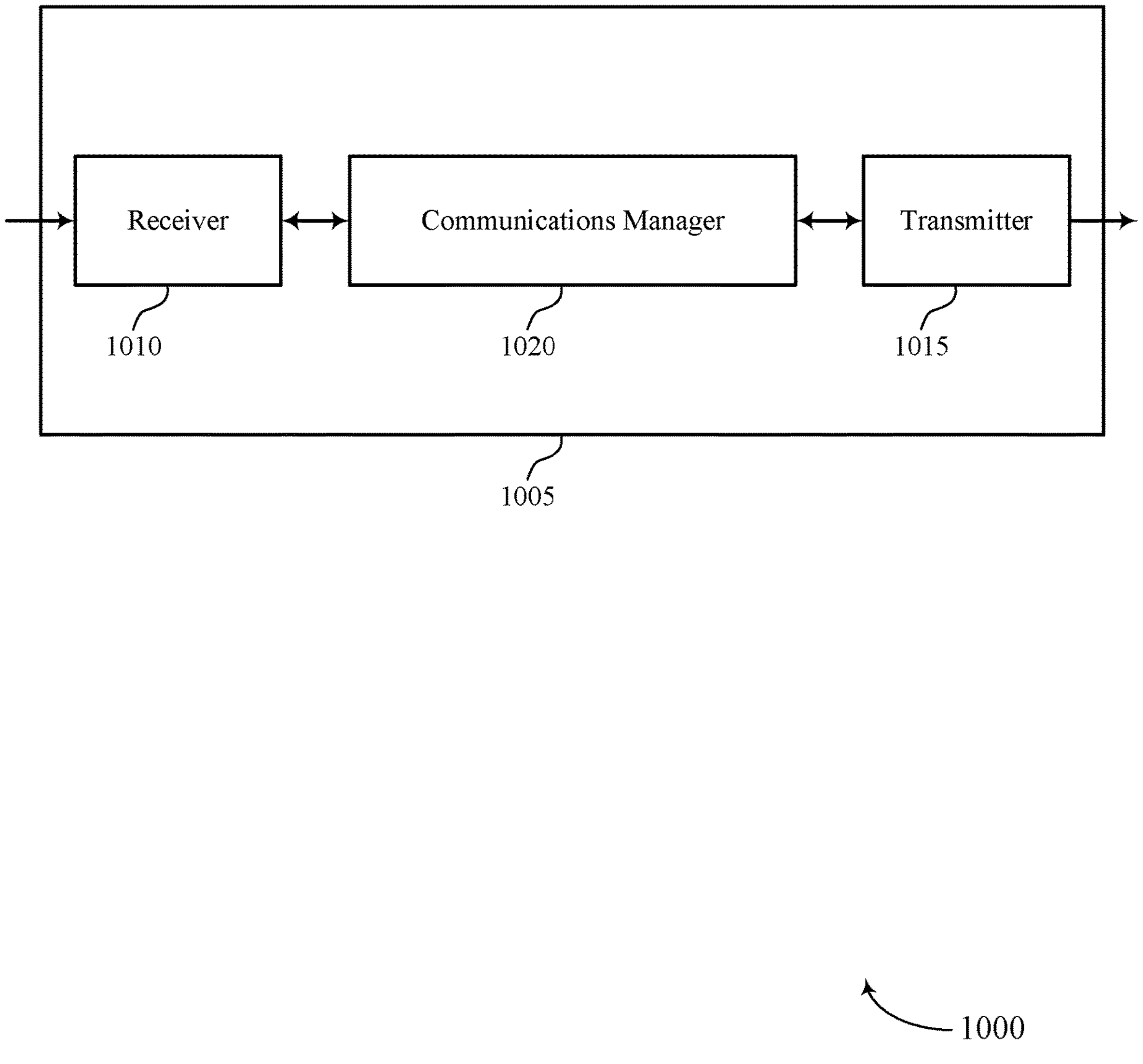
FIGS. 10 and 11 show block diagrams of devices that support power-boosting techniques for multiple uplink shared channel communications in accordance with examples as disclosed herein.

FIG. 10 shows a block diagram 1000 of a device 1005 that supports power-boosting techniques for multiple uplink shared channel communications in accordance with examples as disclosed herein. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power-boosting techniques for multiple uplink shared channel communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power-boosting techniques for multiple uplink shared channel communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of power-boosting techniques for multiple uplink shared channel communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving, from a base station, first control information that schedules one or more PUSCH repetitions for two or more TBs. The communications manager 1020 may be configured as or otherwise support a means for determining, based on a power control indication provided in the first control information, a first OLPC parameter for a first group of the two or more TBs and a second OLPC parameter for a second group of the two or more TBs. The communications manager 1020 may be configured as or otherwise support a means for transmitting the first group of TBs using a first uplink transmission power that is based on the first OLPC parameter. The communications manager 1020 may be configured as or otherwise support a means for transmitting the second group of TBs using a second uplink transmission power that is based on the second OLPC parameter. The first uplink transmission power may be different (e.g., higher or lower) than the second uplink transmission power.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for uplink power control that may be applied separately for different groups of TBs and provide for reduced power consumption, and more efficient utilization of communication resources (e.g., through reduced interference from unnecessarily high uplink transmit powers).

Figure 11:
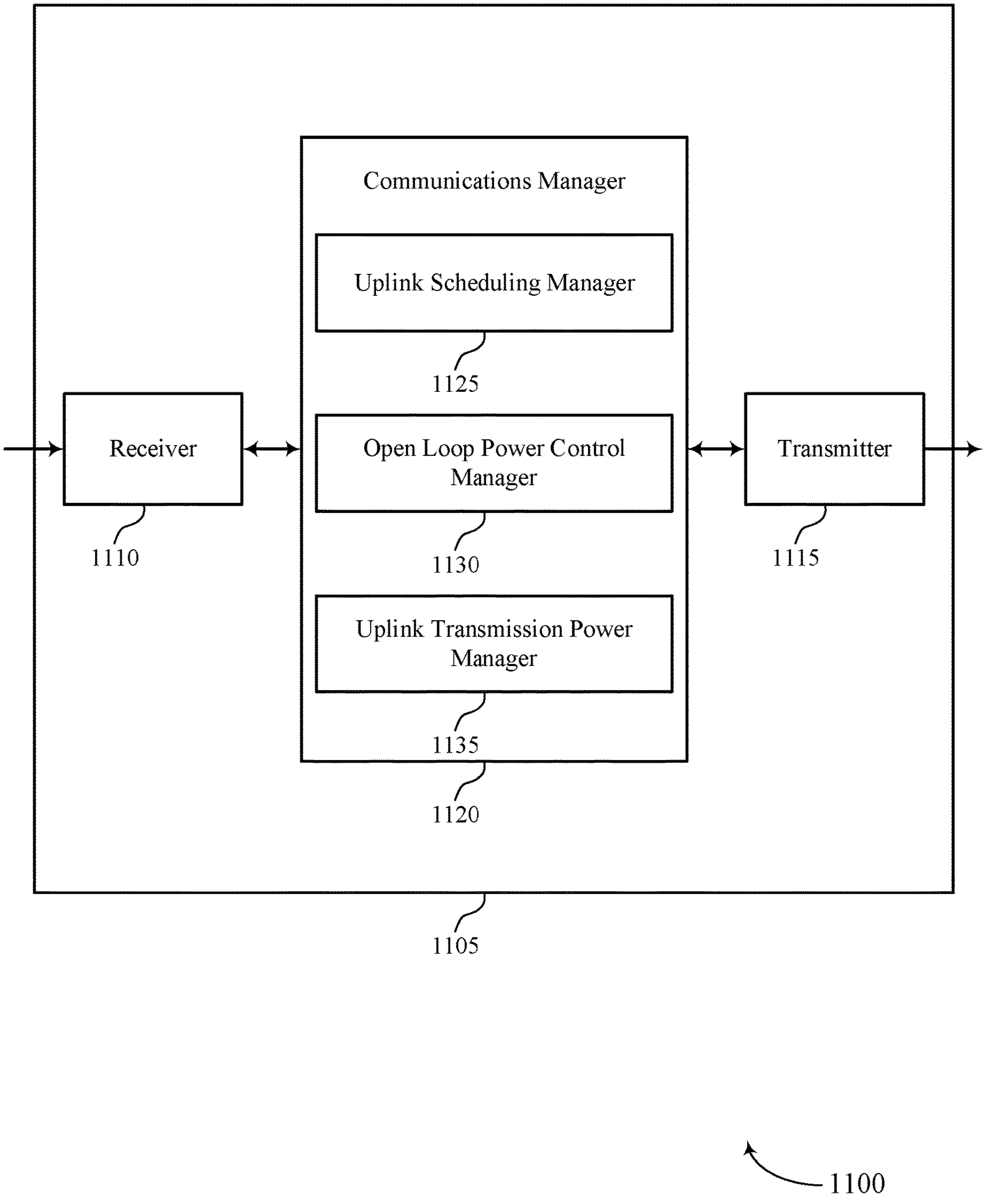

FIG. 11 shows a block diagram 1100 of a device 1105 that supports power-boosting techniques for multiple uplink shared channel communications in accordance with examples as disclosed herein. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power-boosting techniques for multiple uplink shared channel communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power-boosting techniques for multiple uplink shared channel communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of power-boosting techniques for multiple uplink shared channel communications as described herein. For example, the communications manager 1120 may include an uplink scheduling manager 1125, an open loop power control manager 1130, an uplink transmission power manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The uplink scheduling manager 1125 may be configured as or otherwise support a means for receiving, from a base station, first control information that schedules one or more PUSCH repetitions for two or more TBs. The open loop power control manager 1130 may be configured as or otherwise support a means for determining, based on a power control indication provided in the first control information, a first OLPC parameter for a first group of the two or more TBs and a second OLPC parameter for a second group of the two or more TBs. The uplink transmission power manager 1135 may be configured as or otherwise support a means for transmitting the first group of TBs using a first uplink transmission power that is based on the first OLPC parameter. The uplink transmission power manager 1135 may be configured as or otherwise support a means for transmitting the second group of TBs using a second uplink transmission power that is based on the second OLPC parameter.

Figure 12:
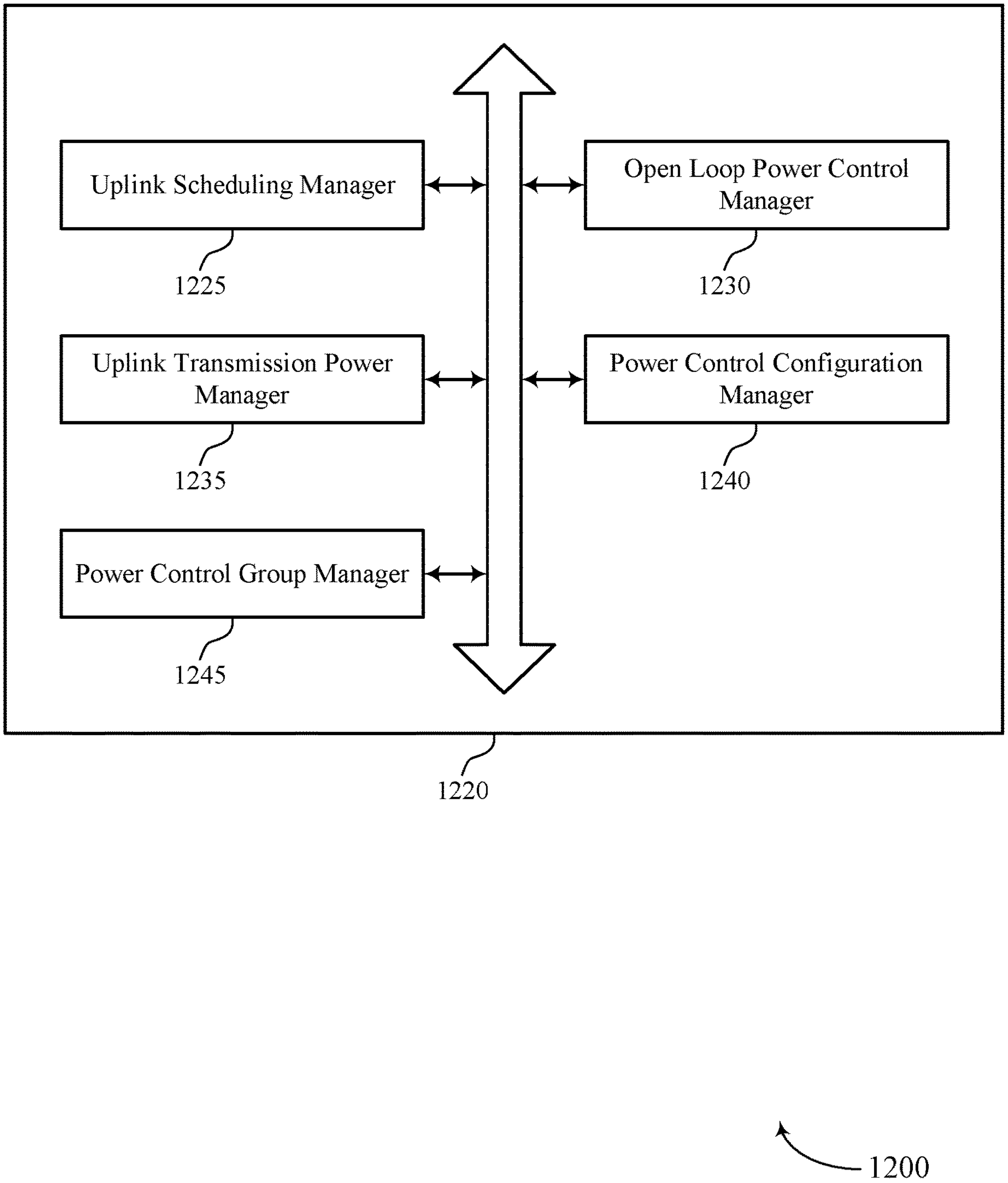
FIG. 12 shows a block diagram of a communications manager that supports power-boosting techniques for multiple uplink shared channel communications in accordance with examples as disclosed herein.

FIG. 12 shows a block diagram 1200 of a communications manager 1220 that supports power-boosting techniques for multiple uplink shared channel communications in accordance with examples as disclosed herein. The communications manager 1220 may be an example of aspects of a communications manager 1020, a communications manager 1120, or both, as described herein. The communications manager 1220, or various components thereof, may be an example of means for performing various aspects of power-boosting techniques for multiple uplink shared channel communications as described herein. For example, the communications manager 1220 may include an uplink scheduling manager 1225, an open loop power control manager 1230, an uplink transmission power manager 1235, a power control configuration manager 1240, a power control group manager 1245, or any combination thereof. Each of these components may communicate, directly or indirectly, with one another (e.g., via one or more buses).

The communications manager 1220 may support wireless communication at a UE in accordance with examples as disclosed herein. The uplink scheduling manager 1225 may be configured as or otherwise support a means for receiving, from a base station, first control information that schedules one or more PUSCH repetitions for two or more TBs. The open loop power control manager 1230 may be configured as or otherwise support a means for determining, based on a power control indication provided in the first control information, a first OLPC parameter for a first group of the two or more TBs and a second OLPC parameter for a second group of the two or more TBs. The uplink transmission power manager 1235 may be configured as or otherwise support a means for transmitting the first group of TBs using a first uplink transmission power that is based on the first OLPC parameter. In some examples, the uplink transmission power manager 1235 may be configured as or otherwise support a means for transmitting the second group of TBs using a second uplink transmission power that is based on the second OLPC parameter.

In some examples, the power control configuration manager 1240 may be configured as or otherwise support a means for receiving, from the base station, configuration information that indicates a group index for each of the two or more TBs. In some examples, the power control group manager 1245 may be configured as or otherwise support a means for determining, for each TB of the two or more TBs, whether the respective TB belongs to the first group of TBs or the second group of TBs based on the group index associated with the TB.

In some examples, the power control group manager 1245 may be configured as or otherwise support a means for determining whether each TB of the two or more TBs belongs to the first group of TBs or the second group of TBs based on an order in which the two or more TBs are scheduled in the first control information.

In some examples, the power control group manager 1245 may be configured as or otherwise support a means for determining that one or more TBs of the two or more TBs belong to the first group of TBs based on the one or more TBs being scheduled for a retransmission. In some examples, the power control group manager 1245 may be configured as or otherwise support a means for determining that one or more other TBs of the two or more TBs belong to the second group of TBs based on the one or more other TBs being scheduled for an initial transmission.

In some examples, the power control group manager 1245 may be configured as or otherwise support a means for determining whether one or more TBs of the two or more TBs belongs to the first group of TBs or the second group of TBs based on the first control information, where the first control information includes one of a first priority indication value or a second priority indication value for each of the two or more TBs. In some examples, the first control information includes an OLPC parameter set indication field.

In some examples, the power control configuration manager 1240 may be configured as or otherwise support a means for receiving, from the base station, configuration information that indicates whether an OLPC parameter set indication field is applied to the first group of TBs, or the second group of TBs, or both the first group of TBs and the second group of TBs. In some examples, the OLPC parameter set indication field indicates a first set of configured OLPC parameters or a second set of configured OLPC parameters are to be applied to one or both of the first group of TBs or the second group of TBs, and where the second set of configured OLPC parameters provides a higher uplink transmission power than the first set of configured open loop power control parameters.

In some examples, two or more repetitions of each TB among the first group of TBs and the second group of TBs are transmitted in at least two sets of transmission occasions where a first set of transmission occasions is associated with a first SRS resource set and a second set of transmission occasions is associated with a second SRS resource set, each of the at least two sets of transmission occasions having different transmission parameters, and where an OLPC parameter set indication field indicates a first set of configured open loop power control parameters are to be applied to both the first set of transmission occasions and the second set of transmission occasions of the first group of TBs, or both the first set of transmission occasions and the second set of transmission occasions of the second group of TBs, or both the first set of transmission occasions and the second set of transmission occasions of both the first group of TBs and the second group of TBs based at least in part on the OLPC parameter set indication field having a first value.

In some examples, two or more repetitions of each TB among the first group of TBs and the second group of TBs are transmitted in at least two sets of transmission occasions, where a first set of transmission occasions is associated with a first SRS resource set and a second set of transmission occasions is associated with a second SRS resource set, each of the two sets of transmission occasions having different transmission parameters, and where an OLPC parameter set indication field indicates a second set of configured OLPC parameters are to be applied to the first set of transmission occasions of the first group of TBs, or the first set of transmission occasions of the second group of TBs, or the first set of transmission occasions of both the first group of TBs and the second group of TBs, and a third set of configured OLPC parameters are to be applied to the second set of transmission occasions of the first group of TBs, or the second set of transmission occasions of the second group of TBs, or the second set of transmission occasions of both the first group of TBs and the second group of TBs based on the OLPC parameter set indication field having a second value.

In some examples, the first control information includes a separate SRS resource set indication field for each of the first set of transmission occasions and the second set of transmission occasions, and where a first value of the SRS resource set indication field indicates that the first and/or second OLPC parameter for the first set of transmission occasions of the first group of TBs and/or the second group of TBs is selected from the second set of configured OLPC parameters, and a second value of the SRS resource set indication field indicates that the first and/or second open loop power control parameter for the second set of transmission occasions of the first group of TBs and/or the second group of TBs is selected from the third set of configured OLPC parameters.

In some examples, the uplink scheduling manager 1225 may be configured as or otherwise support a means for two or more repetitions of each TB among the first group of TBs and the second group of TBs are transmitted in at least two sets of transmission occasions, where a first set of transmission occasions is associated with a first SRS resource set and a second set of transmission occasions is associated with a second SRS resource set, each of the at least two sets of transmission occasions having different transmission parameters. In some examples, the uplink transmission power manager 1235 may be configured as or otherwise support a means for where a first value of an OLPC parameter set indication field indicates the first OLPC parameter in a second set of configured open loop power control parameters is to be applied to the first set of transmission occasions of the first group of TBs, or the first set of transmission occasions of the second group of TBs, or the first set of transmission occasions of both the first group of TBs and the second group of TBs. In some examples, the uplink transmission power manager 1235 may be configured as or otherwise support a means for where the second OLPC parameter in the second set of configured OLPC parameters is to be applied to the second set of transmission occasions of the first group of TBs, or the second set of transmission occasions of the second group of TBs, or the second set of transmission occasions of both the first group of TBs and the second group of TBs based on the OLPC parameter set indication field having a second value.

In some examples, a single SRS resource set indication field is applied to both the first set of transmission occasions and the second set of transmission occasions, and the single SRS resource set indication field is mapped to the first OLPC parameter for the first set of transmission occasions and the second open loop power control parameter for the second set of transmission occasions. In some examples, the first control information includes an explicit indication of whether the first group of TBs and the second group of TBs are to use different OLPC parameters. In some examples, the explicit indication is provided in a dedicated field of the first control information that indicates whether an OLPC parameter set indication field is applied to the first group of TBs, the second group of TBs, or to both the first group of TBs and the second group of TBs.

In some examples, the explicit indication is provided in separate OLPC parameter set indication fields associated with each of the first group of TBs and the second group of TBs. In some examples, the separate OLPC parameter set indication fields are configured at the UE via radio resource control signaling. In some examples, the explicit indication is provided in a single OLPC parameter set indication field, and where a first subset of bits of the single OLPC parameter set indication field is associated with the first group of TBs and a second subset of bits of the single OLPC parameter set indication field is associated with the second group of TBs.

In some examples, two or more repetitions of each TB of the first group of TBs and the second group of TBs are transmitted in at least two sets of transmission occasions where a first set of transmission occasions is associated with a first SRS resource set, and a second set of transmission occasions is associated with a second SRS resource set, each of the at least two sets of transmission occasions having different transmission parameters. In some examples, where the first control information further includes a SRS resource set indication field that identifies OLPC parameters for each of the at least two sets of transmission occasions.

Figure 13:
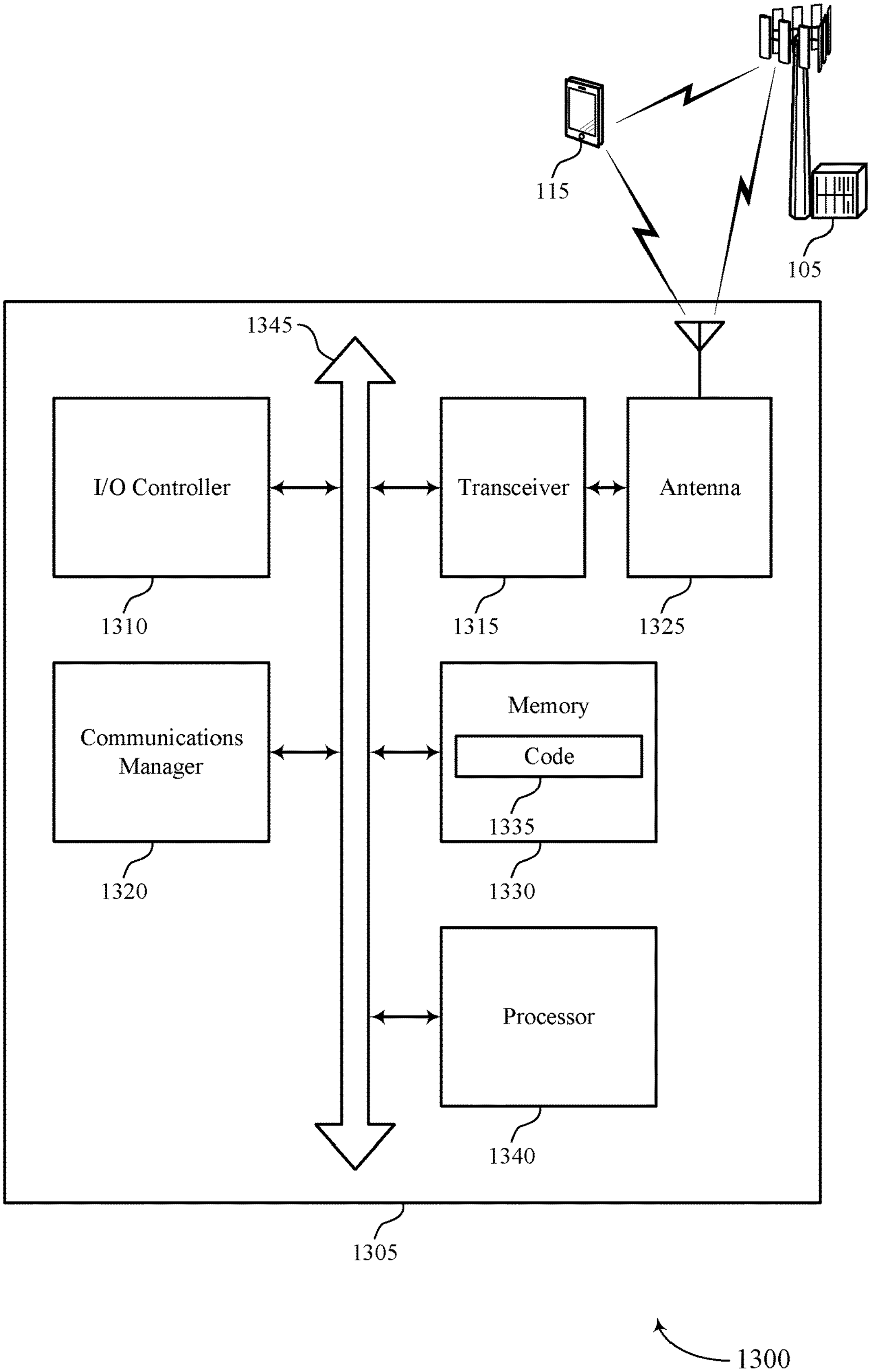
FIG. 13 shows a diagram of a system including a device that supports power-boosting techniques for multiple uplink shared channel communications in accordance with examples as disclosed herein.

FIG. 13 shows a diagram of a system 1300 including a device 1305 that supports power-boosting techniques for multiple uplink shared channel communications in accordance with examples as disclosed herein. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting power-boosting techniques for multiple uplink shared channel communications). For example, the device 1305 or a component of the device 1305 may include a processor 1340 and memory 1330 coupled with the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, from a base station, first control information that schedules one or more PUSCH repetitions for two or more TBs. The communications manager 1320 may be configured as or otherwise support a means for determining, based on a power control indication provided in the first control information, a first OLPC parameter for a first group of the two or more TBs and a second OLPC parameter for a second group of the two or more TBs. The communications manager 1320 may be configured as or otherwise support a means for transmitting the first group of TBs using a first uplink transmission power that is based on the first OLPC parameter. The communications manager 1320 may be configured as or otherwise support a means for transmitting the second group of TBs using a second uplink transmission power that is based on the second OLPC parameter.

By including or configuring the communications manager 1320 in accordance with examples as described herein, the device 1305 may support techniques for uplink power control that may be applied separately for different groups of TBs and provide for reduced power consumption, and more efficient utilization of communication resources (e.g., through reduced interference from unnecessarily high uplink transmit powers).

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of power-boosting techniques for multiple uplink shared channel communications as described herein, or the processor 1340 and the memory 1330 may be otherwise configured to perform or support such operations.

Figure 14:
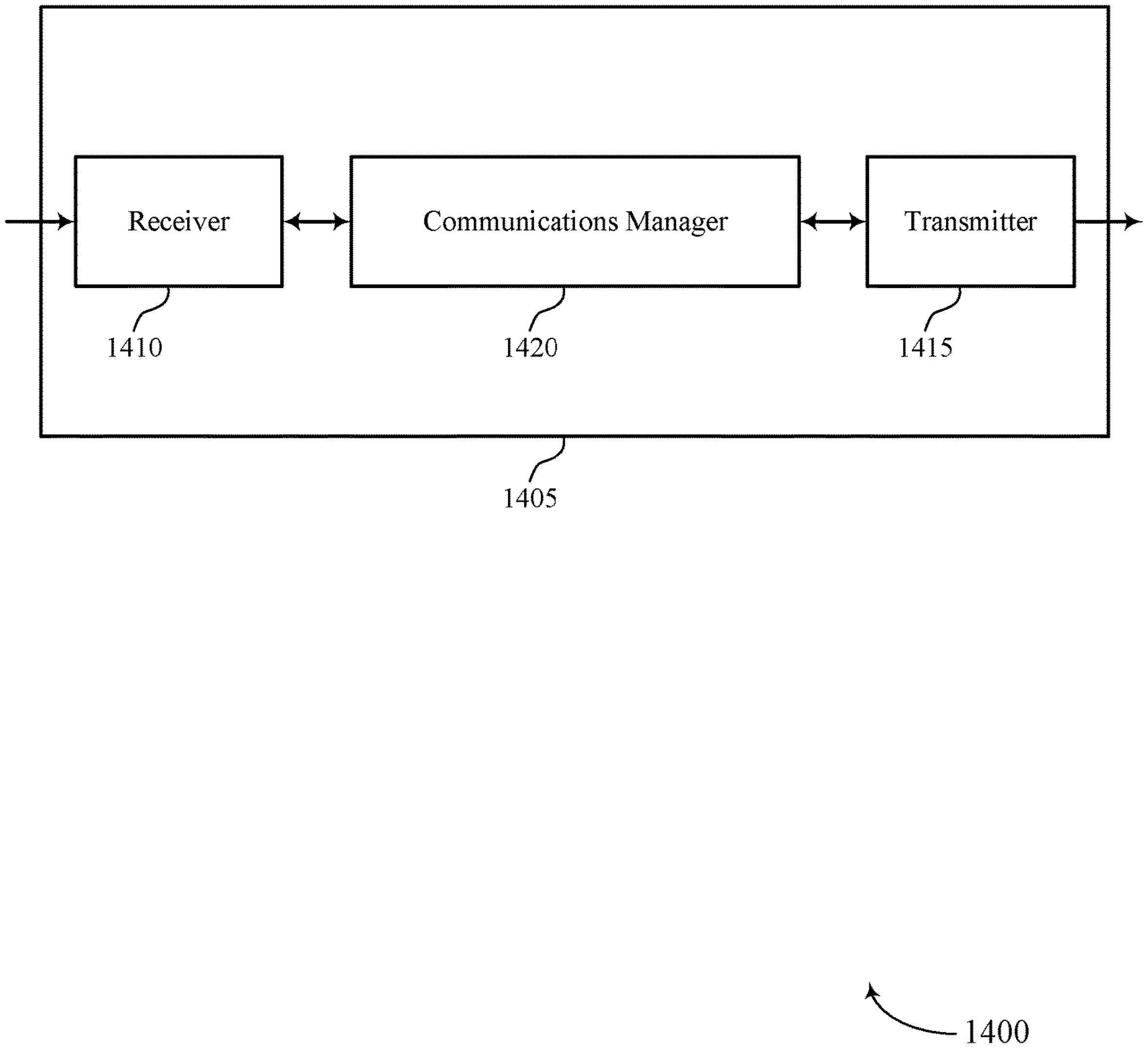
FIGS. 14 and 15 show block diagrams of devices that support power-boosting techniques for multiple uplink shared channel communications in accordance with examples as disclosed herein.

FIG. 14 shows a block diagram 1400 of a device 1405 that supports power-boosting techniques for multiple uplink shared channel communications in accordance with examples as disclosed herein. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to power-boosting techniques for multiple uplink shared channel communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to power-boosting techniques for multiple uplink shared channel communications). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of power-boosting techniques for multiple uplink shared channel communications as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the communications manager 1420 may be configured as or otherwise support a means for scheduling a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE. The communications manager 1420 may be configured as or otherwise support a means for determining, based on the scheduling, a first OLPC parameter for the first group of TBs and a second OLPC parameter for the second group of TBs. The communications manager 1420 may be configured as or otherwise support a means for transmitting, to the first UE, a first control information that schedules the first PUSCH repetition and the second PUSCH repetition, and that indicates the first OLPC parameter for the first group of TBs and the second OLPC parameter for the second group of TBs.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for uplink power control that may be applied separately for different groups of TBs and provide for reduced power consumption, and more efficient utilization of communication resources (e.g., through reduced interference from unnecessarily high uplink transmit powers).

Figure 15:
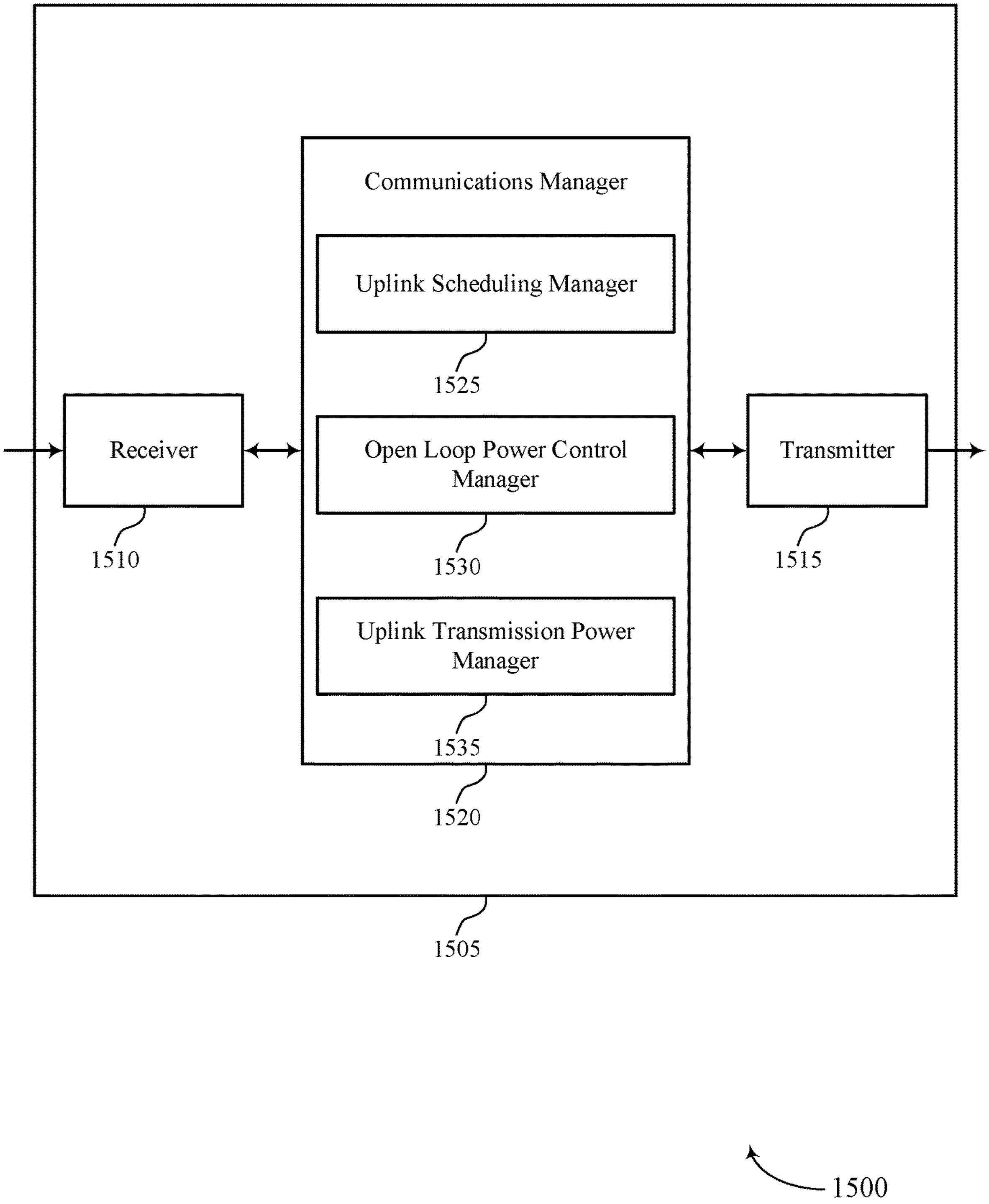

FIG. 15 shows a block diagram 1500 of a device 1505 that supports power-boosting techniques for multiple uplink shared channel communications in accordance with examples as disclosed herein. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to power-boosting techniques for multiple uplink shared channel communications). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to power-boosting techniques for multiple uplink shared channel communications). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of power-boosting techniques for multiple uplink shared channel communications as described herein. For example, the communications manager 1520 may include an uplink scheduling manager 1525, an open loop power control manager 1530, an uplink transmission power manager 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. The uplink scheduling manager 1525 may be configured as or otherwise support a means for scheduling a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE. The open loop power control manager 1530 may be configured as or otherwise support a means for determining, based on the scheduling, a first OLPC parameter for the first group of TBs and a second OLPC parameter for the second group of TBs. The uplink transmission power manager 1535 may be configured as or otherwise support a means for transmitting, to the first UE, a first control information that schedules the first PUSCH repetition and the second PUSCH repetition, and that indicates the first OLPC parameter for the first group of TBs and the second OLPC parameter for the second group of TBs.

Figure 16:
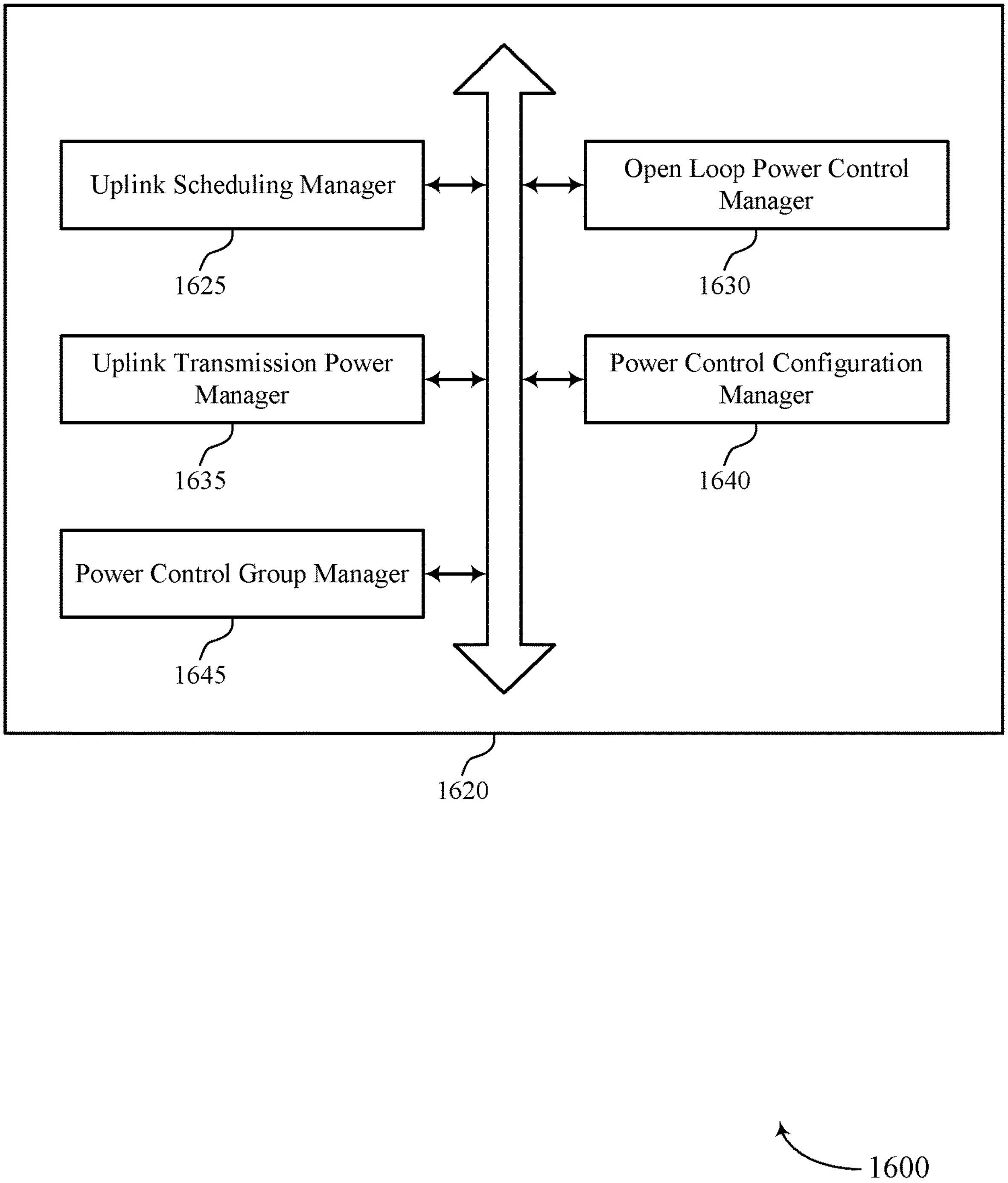
FIG. 16 shows a block diagram of a communications manager that supports power-boosting techniques for multiple uplink shared channel communications in accordance with examples as disclosed herein.

FIG. 16 shows a block diagram 1600 of a communications manager 1620 that supports power-boosting techniques for multiple uplink shared channel communications in accordance with examples as disclosed herein. The communications manager 1620 may be an example of aspects of a communications manager 1420, a communications manager 1520, or both, as described herein. The communications manager 1620, or various components thereof, may be an example of means for performing various aspects of power-boosting techniques for multiple uplink shared channel communications as described herein. For example, the communications manager 1620 may include an uplink scheduling manager 1625, an open loop power control manager 1630, an uplink transmission power manager 1635, a power control configuration manager 1640, a power control group manager 1645, or any combination thereof. Each of these components may communicate, directly or indirectly, with one another (e.g., via one or more buses).

The communications manager 1620 may support wireless communication at a base station in accordance with examples as disclosed herein. The uplink scheduling manager 1625 may be configured as or otherwise support a means for scheduling a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE. The open loop power control manager 1630 may be configured as or otherwise support a means for determining, based on the scheduling, a first OLPC parameter for the first group of TBs and a second OLPC parameter for the second group of TBs. The uplink transmission power manager 1635 may be configured as or otherwise support a means for transmitting, to the first UE, a first control information that schedules the first PUSCH repetition and the second PUSCH repetition, and that indicates the first OLPC parameter for the first group of TBs and the second OLPC parameter for the second group of TBs.

In some examples, the power control configuration manager 1640 may be configured as or otherwise support a means for transmitting, to the first UE, configuration information that indicates a group index for each of the first group of TBs and the second group of TBs. In some examples, the power control group manager 1645 may be configured as or otherwise support a means for where the first OLPC parameter and the second OLPC parameter are determined based on the group index. In some examples, an order in which two or more TBs are scheduled in the first control information indicates whether a corresponding TB belongs to the first group of TBs or the second group of TBs. In some examples, a retransmission status of each scheduled TB is used to determine whether the TB belongs to the first group of TBs or the second group of TBs.

In some examples, the power control group manager 1645 may be configured as or otherwise support a means for configuring the first UE with a mapping between a first priority indication value and the first group of TBs, and a second priority indication value and the second group of TBs, and where the first control information indicates one of the first priority indication value or the second priority indication value for each scheduled TB. In some examples, the first control information includes an OLPC parameter set indication field.

In some examples, two or more repetitions of each TB among the first group of TBs and the second group of TBs are transmitted in at least two sets of transmission occasions where a first set of transmission occasions is associated with a first SRS resource set and a second set of transmission occasions is associated with a second sounding reference signal resource set, each of the at least two sets of transmission occasions having different transmission parameters, and where an OLPC parameter set indication field indicates a first set of configured open loop power control parameters are to be applied to both the first set of transmission occasions and the second set of transmission occasions of the first group of TBs, or both the first set of transmission occasions and the second set of transmission occasions of the second group of TBs, or both the first set of transmission occasions and the second set of transmission occasions of both the first group of TBs and the second group of TBs based at least in part on the OLPC parameter set indication field having a first value. In some examples, the first control information includes an explicit indication of whether the first group of TBs and the second group of TBs are to use different OLPC parameters.

Figure 17:
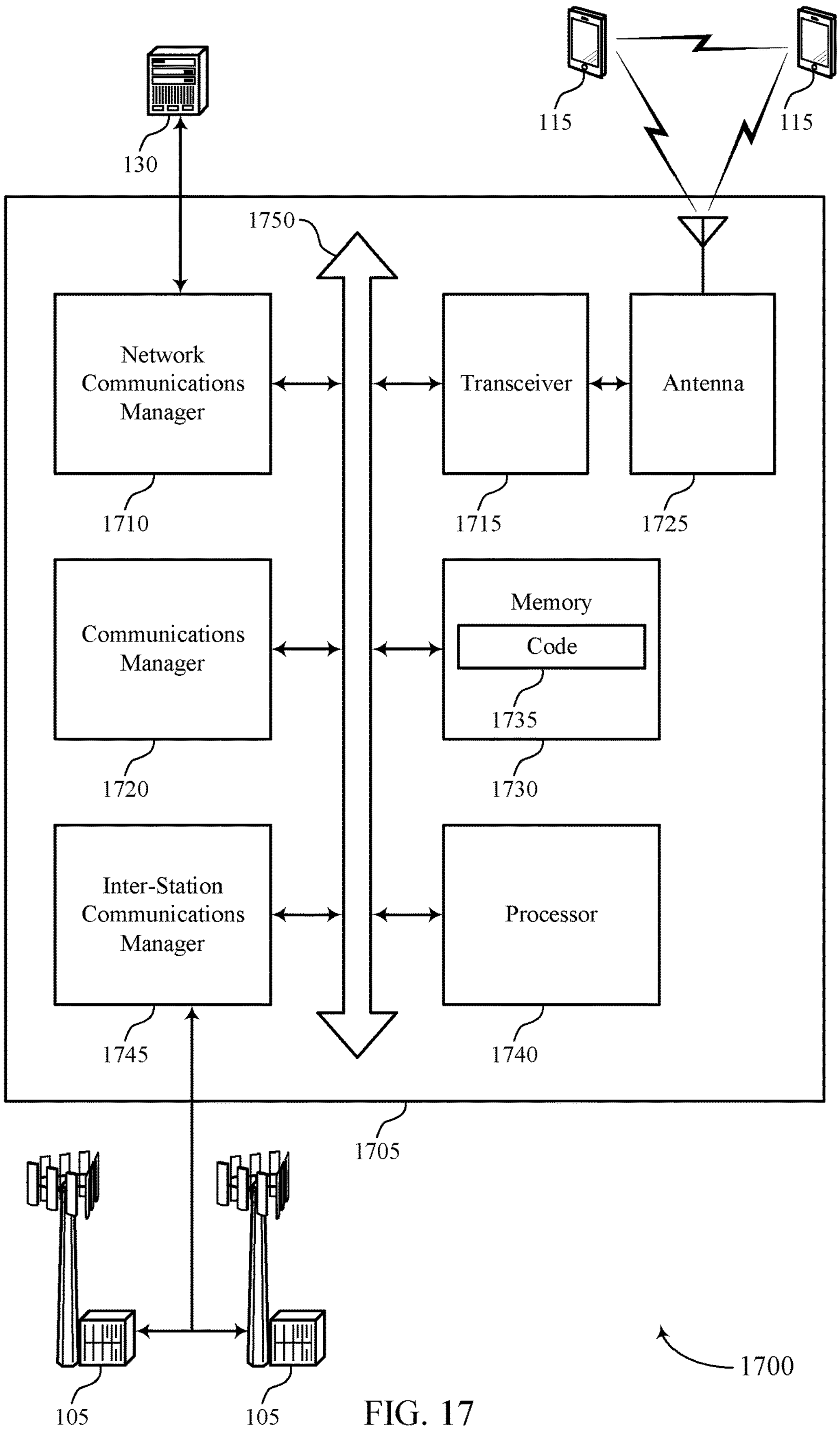
FIG. 17 shows a diagram of a system including a device that supports power-boosting techniques for multiple uplink shared channel communications in accordance with examples as disclosed herein.

FIG. 17 shows a diagram of a system 1700 including a device 1705 that supports power-boosting techniques for multiple uplink shared channel communications in accordance with examples as disclosed herein. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting power-boosting techniques for multiple uplink shared channel communications). For example, the device 1705 or a component of the device 1705 may include a processor 1740 and memory 1730 coupled with the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a base station in accordance with examples as disclosed herein. For example, the communications manager 1720 may be configured as or otherwise support a means for scheduling a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE. The communications manager 1720 may be configured as or otherwise support a means for determining, based on the scheduling, a first OLPC parameter for the first group of TBs and a second OLPC parameter for the second group of TBs. The communications manager 1720 may be configured as or otherwise support a means for transmitting, to the first UE, a first control information that schedules the first PUSCH repetition and the second PUSCH repetition, and that indicates the first OLPC parameter for the first group of TBs and the second OLPC parameter for the second group of TBs.

By including or configuring the communications manager 1720 in accordance with examples as described herein, the device 1705 may support techniques for uplink power control that may be applied separately for different groups of TBs and provide for reduced power consumption, and more efficient utilization of communication resources (e.g., through reduced interference from unnecessarily high uplink transmit powers).

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of power-boosting techniques for multiple uplink shared channel communications as described herein, or the processor 1740 and the memory 1730 may be otherwise configured to perform or support such operations.

Figure 18:
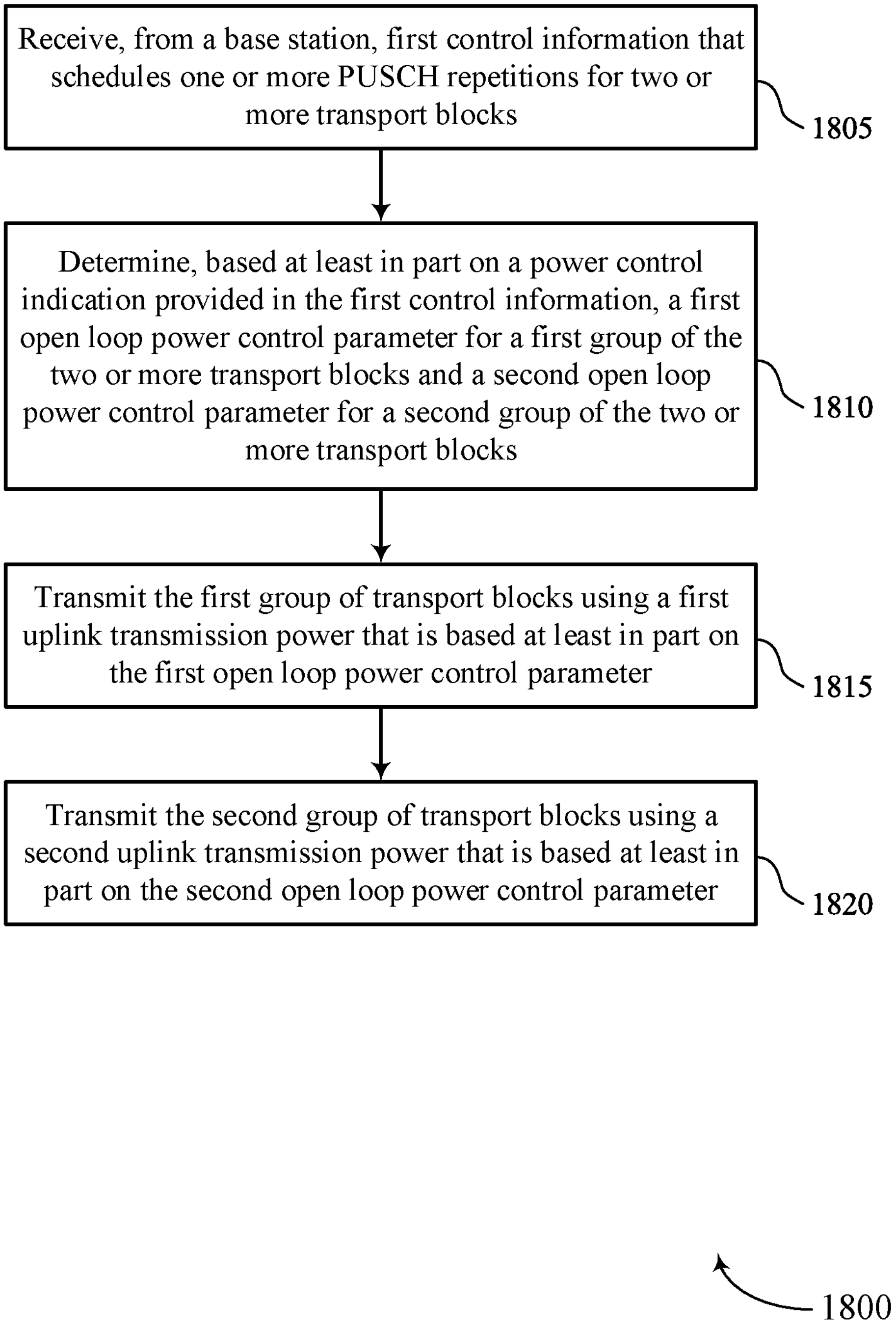
FIGS. 18 through 26 show flowcharts illustrating methods that support power-boosting techniques for multiple uplink shared channel communications in accordance with examples as disclosed herein.

FIG. 18 shows a flowchart illustrating a method 1800 that supports power-boosting techniques for multiple uplink shared channel communications in accordance with examples as disclosed herein. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, first control information that schedules one or more PUSCH repetitions for two or more TBs. The operations of 1805 may be performed in accordance with examples as disclosed herein. In some examples, aspects of the operations of 1805 may be performed by an uplink scheduling manager 1225 as described with reference to FIG. 12.

At 1810, the method may include determining, based on a power control indication provided in the first control information, a first OLPC parameter for a first group of the two or more TBs and a second OLPC parameter for a second group of the two or more TBs. The operations of 1810 may be performed in accordance with examples as disclosed herein. In some examples, aspects of the operations of 1810 may be performed by an OLPC manager 1230 as described with reference to FIG. 12.

At 1815, the method may include transmitting the first group of TBs using a first uplink transmission power that is based on the first OLPC parameter. The operations of 1815 may be performed in accordance with examples as disclosed herein. In some examples, aspects of the operations of 1815 may be performed by an uplink transmission power manager 1235 as described with reference to FIG. 12.

At 1820, the method may include transmitting the second group of TBs using a second uplink transmission power that is based on the second OLPC parameter. The operations of 1820 may be performed in accordance with examples as disclosed herein. In some examples, aspects of the operations of 1820 may be performed by an uplink transmission power manager 1235 as described with reference to FIG. 12.

Figure 19:
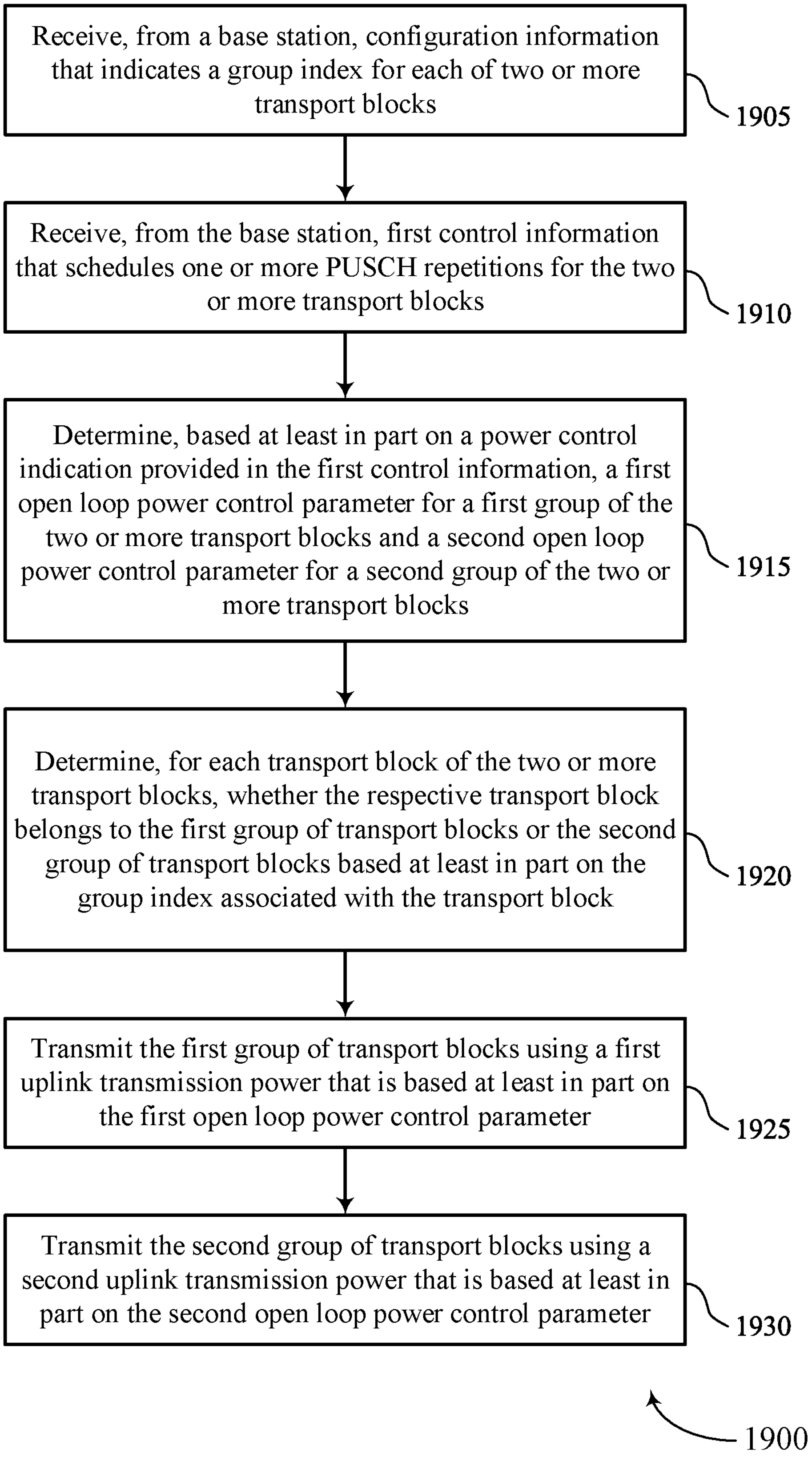

FIG. 19 shows a flowchart illustrating a method 1900 that supports power-boosting techniques for multiple uplink shared channel communications in accordance with examples as disclosed herein. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, configuration information that indicates a group index for each of two or more TBs. The operations of 1905 may be performed in accordance with examples as disclosed herein. In some examples, aspects of the operations of 1905 may be performed by a power control configuration manager 1240 as described with reference to FIG. 12.

At 1910, the method may include receiving, from the base station, first control information that schedules one or more PUSCH repetitions for the two or more TBs. The operations of 1910 may be performed in accordance with examples as disclosed herein. In some examples, aspects of the operations of 1910 may be performed by an uplink scheduling manager 1225 as described with reference to FIG. 12.

At 1915, the method may include determining, based on a power control indication provided in the first control information, a first OLPC parameter for a first group of the two or more TBs and a second OLPC parameter for a second group of the two or more TBs. The operations of 1915 may be performed in accordance with examples as disclosed herein. In some examples, aspects of the operations of 1915 may be performed by an open loop power control manager 1230 as described with reference to FIG. 12.

At 1920, the method may include determining, for each TB of the two or more TBs, whether the respective TB belongs to the first group of TBs or the second group of TBs based on the group index associated with the TB. The operations of 1920 may be performed in accordance with examples as disclosed herein. In some examples, aspects of the operations of 1920 may be performed by a power control group manager 1245 as described with reference to FIG. 12.

At 1925, the method may include transmitting the first group of TBs using a first uplink transmission power that is based on the first OLPC parameter. The operations of 1925 may be performed in accordance with examples as disclosed herein. In some examples, aspects of the operations of 1925 may be performed by an uplink transmission power manager 1235 as described with reference to FIG. 12.

At 1930, the method may include transmitting the second group of TBs using a second uplink transmission power that is based on the second OLPC parameter. The operations of 1930 may be performed in accordance with examples as disclosed herein. In some examples, aspects of the operations of 1930 may be performed by an uplink transmission power manager 1235 as described with reference to FIG. 12.

Figure 20:
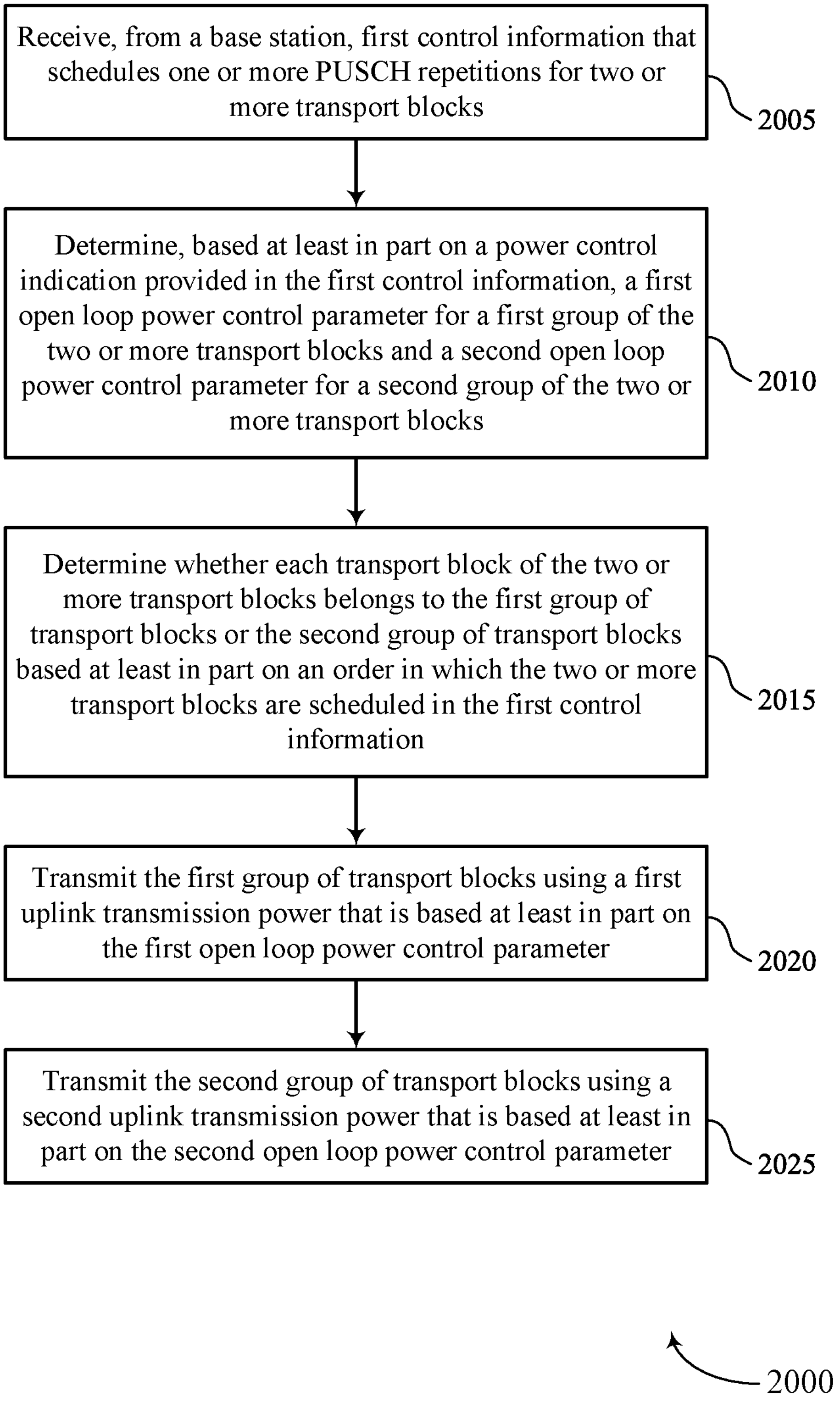

FIG. 20 shows a flowchart illustrating a method 2000 that supports power-boosting techniques for multiple uplink shared channel communications in accordance with examples as disclosed herein. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, first control information that schedules one or more PUSCH repetitions for two or more TBs. The operations of 2005 may be performed in accordance with examples as disclosed herein. In some examples, aspects of the operations of 2005 may be performed by an uplink scheduling manager 1225 as described with reference to FIG. 12.

At 2010, the method may include determining, based on a power control indication provided in the first control information, a first OLPC parameter for a first group of the two or more TBs and a second OLPC parameter for a second group of the two or more TBs. The operations of 2010 may be performed in accordance with examples as disclosed herein. In some examples, aspects of the operations of 2010 may be performed by an open loop power control manager 1230 as described with reference to FIG. 12.

At 2015, the method may include determining whether each TB of the two or more TBs belongs to the first group of TBs or the second group of TBs based on an order in which the two or more TBs are scheduled in the first control information. The operations of 2015 may be performed in accordance with examples as disclosed herein. In some examples, aspects of the operations of 2015 may be performed by a power control group manager 1245 as described with reference to FIG. 12.

At 2020, the method may include transmitting the first group of TBs using a first uplink transmission power that is based on the first OLPC parameter. The operations of 2020 may be performed in accordance with examples as disclosed herein. In some examples, aspects of the operations of 2020 may be performed by an uplink transmission power manager 1235 as described with reference to FIG. 12.

At 2025, the method may include transmitting the second group of TBs using a second uplink transmission power that is based on the second OLPC parameter. The operations of 2025 may be performed in accordance with examples as disclosed herein. In some examples, aspects of the operations of 2025 may be performed by an uplink transmission power manager 1235 as described with reference to FIG. 12.

Figure 21:
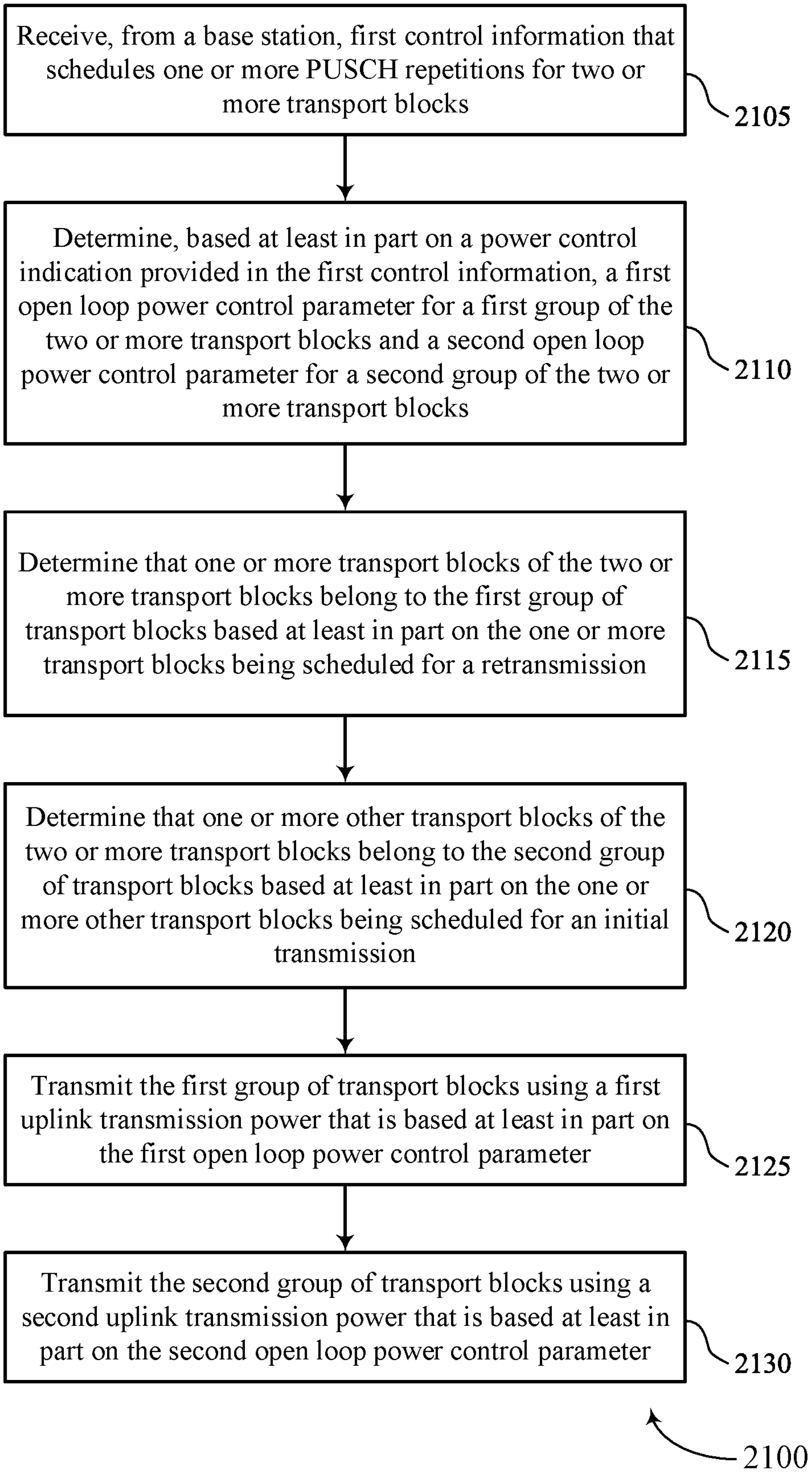

FIG. 21 shows a flowchart illustrating a method 2100 that supports power-boosting techniques for multiple uplink shared channel communications in accordance with examples as disclosed herein. The operations of the method 2100 may be implemented by a UE or its components as described herein. For example, the operations of the method 2100 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, first control information that schedules one or more PUSCH repetitions for two or more TBs. The operations of 2105 may be performed in accordance with examples as disclosed herein. In some examples, aspects of the operations of 2105 may be performed by an uplink scheduling manager 1225 as described with reference to FIG. 12.

At 2110, the method may include determining, based on a power control indication provided in the first control information, a first OLPC parameter for a first group of the two or more TBs and a second OLPC parameter for a second group of the two or more TBs. The operations of 2110 may be performed in accordance with examples as disclosed herein. In some examples, aspects of the operations of 2110 may be performed by an open loop power control manager 1230 as described with reference to FIG. 12.

At 2115, the method may include determining that one or more TBs of the two or more TBs belong to the first group of TBs based on the one or more TBs being scheduled for a retransmission. The operations of 2115 may be performed in accordance with examples as disclosed herein. In some examples, aspects of the operations of 2115 may be performed by a power control group manager 1245 as described with reference to FIG. 12.

At 2120, the method may include determining that one or more other TBs of the two or more TBs belong to the second group of TBs based on the one or more other TBs being scheduled for an initial transmission. The operations of 2120 may be performed in accordance with examples as disclosed herein. In some examples, aspects of the operations of 2120 may be performed by a power control group manager 1245 as described with reference to FIG. 12.

At 2125, the method may include transmitting the first group of TBs using a first uplink transmission power that is based on the first OLPC parameter. The operations of 2125 may be performed in accordance with examples as disclosed herein. In some examples, aspects of the operations of 2125 may be performed by an uplink transmission power manager 1235 as described with reference to FIG. 12.

At 2130, the method may include transmitting the second group of TBs using a second uplink transmission power that is based on the second OLPC parameter. The operations of 2130 may be performed in accordance with examples as disclosed herein. In some examples, aspects of the operations of 2130 may be performed by an uplink transmission power manager 1235 as described with reference to FIG. 12.

Figure 22:
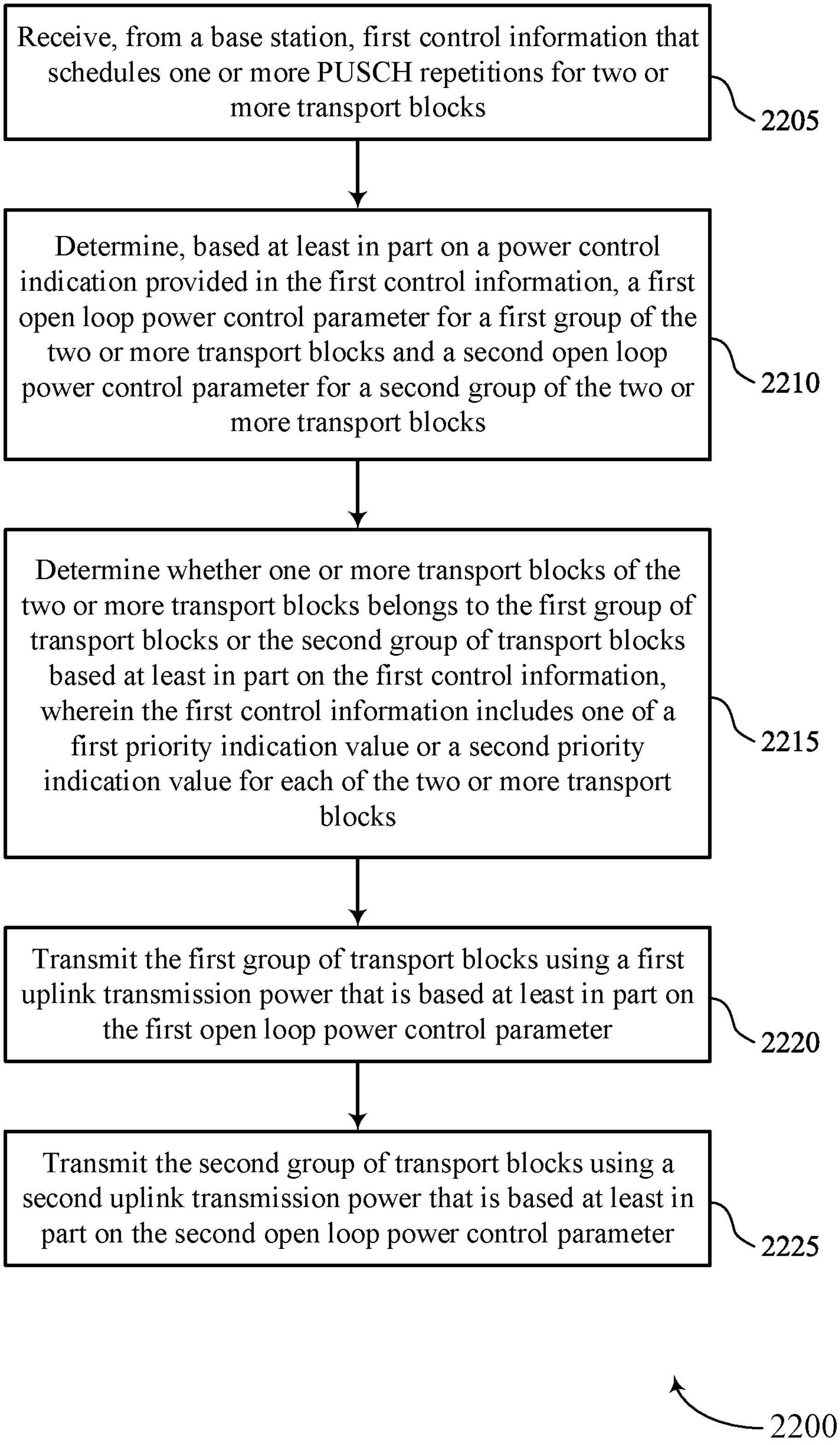

FIG. 22 shows a flowchart illustrating a method 2200 that supports power-boosting techniques for multiple uplink shared channel communications in accordance with examples as disclosed herein. The operations of the method 2200 may be implemented by a UE or its components as described herein. For example, the operations of the method 2200 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, first control information that schedules one or more PUSCH repetitions for two or more TBs. The operations of 2205 may be performed in accordance with examples as disclosed herein. In some examples, aspects of the operations of 2205 may be performed by an uplink scheduling manager 1225 as described with reference to FIG. 12.

At 2210, the method may include determining, based on a power control indication provided in the first control information, a first OLPC parameter for a first group of the two or more TBs and a second OLPC parameter for a second group of the two or more TBs. The operations of 2210 may be performed in accordance with examples as disclosed herein. In some examples, aspects of the operations of 2210 may be performed by an open loop power control manager 1230 as described with reference to FIG. 12.

At 2215, the method may include determining whether one or more TBs of the two or more TBs belongs to the first group of TBs or the second group of TBs based on the first control information, where the first control information includes one of a first priority indication value or a second priority indication value for each of the two or more TBs. The operations of 2215 may be performed in accordance with examples as disclosed herein. In some examples, aspects of the operations of 2215 may be performed by a power control group manager 1245 as described with reference to FIG. 12.

At 2220, the method may include transmitting the first group of TBs using a first uplink transmission power that is based on the first OLPC parameter. The operations of 2220 may be performed in accordance with examples as disclosed herein. In some examples, aspects of the operations of 2220 may be performed by an uplink transmission power manager 1235 as described with reference to FIG. 12.

At 2225, the method may include transmitting the second group of TBs using a second uplink transmission power that is based on the second OLPC parameter. The operations of 2225 may be performed in accordance with examples as disclosed herein. In some examples, aspects of the operations of 2225 may be performed by an uplink transmission power manager 1235 as described with reference to FIG. 12.

Figure 23:
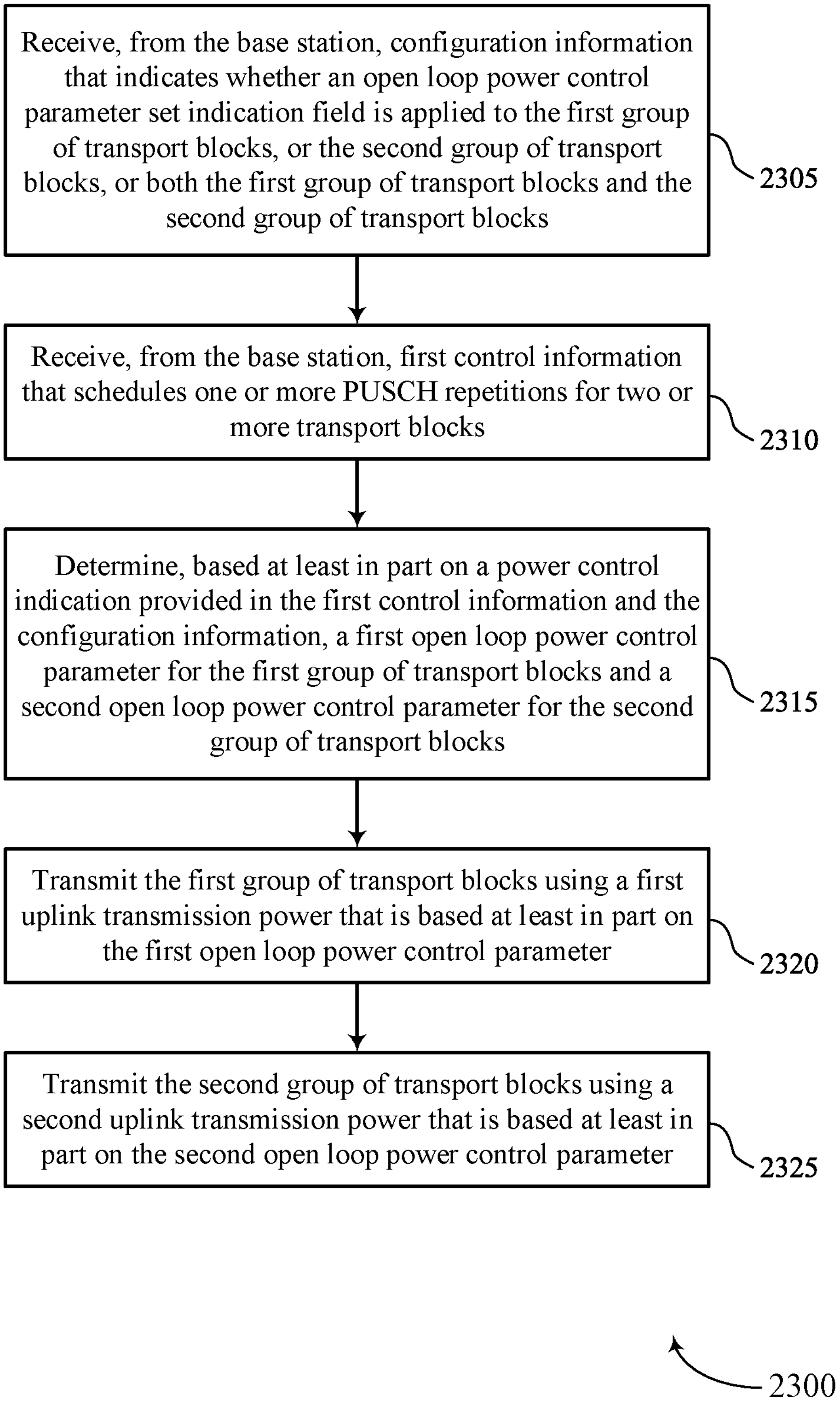

FIG. 23 shows a flowchart illustrating a method 2300 that supports power-boosting techniques for multiple uplink shared channel communications in accordance with examples as disclosed herein. The operations of the method 2300 may be implemented by a UE or its components as described herein. For example, the operations of the method 2300 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2305, the method may include receiving, from a base station, configuration information that indicates whether an OLPC parameter set indication field is applied to a first group of TBs, or a second group of TBs, or both the first group of TBs and the second group of TBs. The operations of 2305 may be performed in accordance with examples as disclosed herein. In some examples, aspects of the operations of 2305 may be performed by a power control configuration manager 1240 as described with reference to FIG. 12.

At 2310, the method may include receiving, from the base station, first control information that schedules one or more PUSCH repetitions for two or more TBs. The operations of 2310 may be performed in accordance with examples as disclosed herein. In some examples, aspects of the operations of 2310 may be performed by an uplink scheduling manager 1225 as described with reference to FIG. 12.

At 2315, the method may include determining, based on a power control indication provided in the first control information and the configuration information, a first OLPC parameter for the first group of TBs and a second OLPC parameter for the second group of TBs. The operations of 2315 may be performed in accordance with examples as disclosed herein. In some examples, aspects of the operations of 2315 may be performed by an open loop power control manager 1230 as described with reference to FIG. 12.

At 2320, the method may include transmitting the first group of TBs using a first uplink transmission power that is based on the first OLPC parameter. The operations of 2320 may be performed in accordance with examples as disclosed herein. In some examples, aspects of the operations of 2320 may be performed by an uplink transmission power manager 1235 as described with reference to FIG. 12.

At 2325, the method may include transmitting the second group of TBs using a second uplink transmission power that is based on the second OLPC parameter. The operations of 2325 may be performed in accordance with examples as disclosed herein. In some examples, aspects of the operations of 2325 may be performed by an uplink transmission power manager 1235 as described with reference to FIG. 12.

Figure 24:
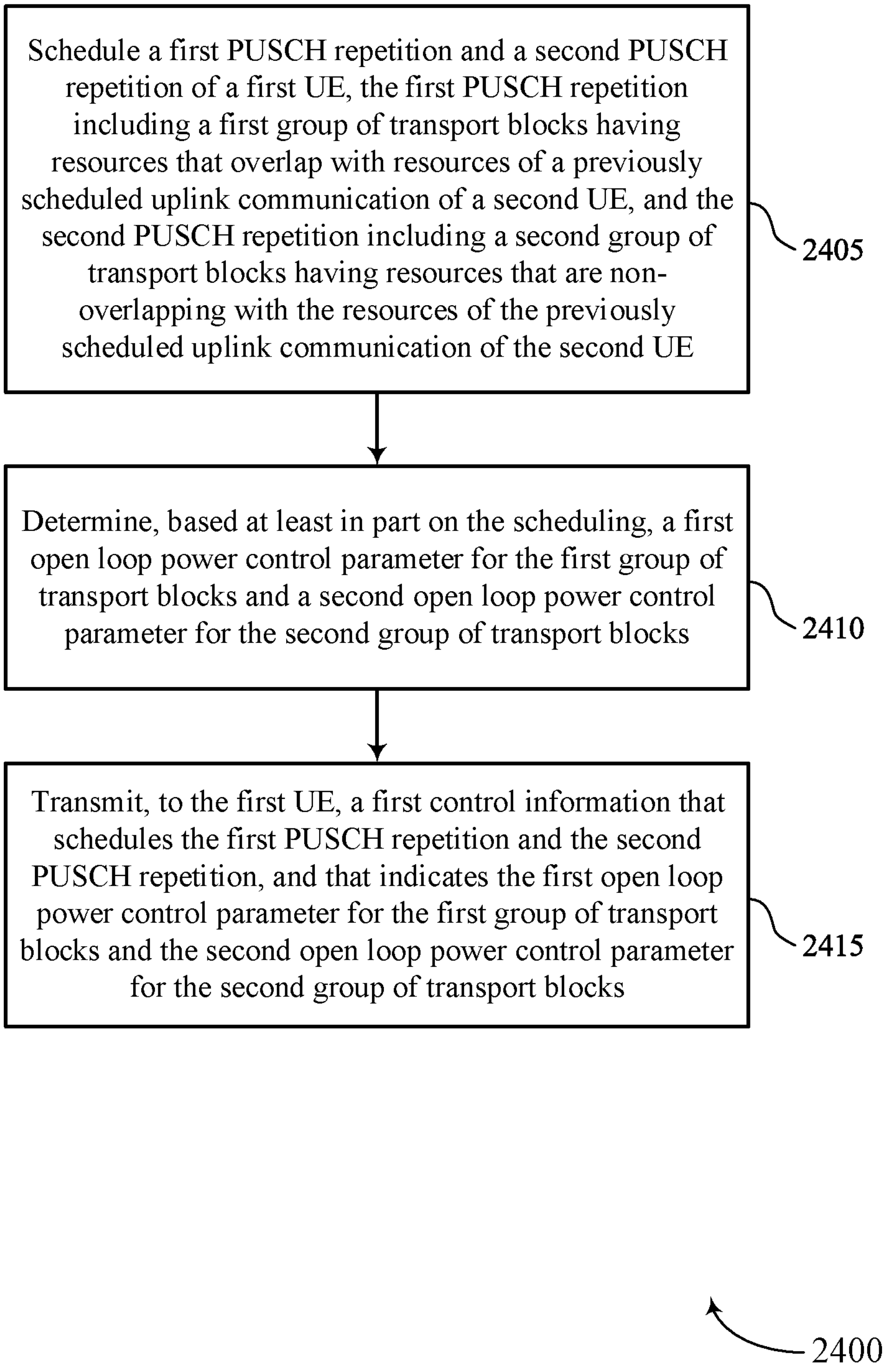

FIG. 24 shows a flowchart illustrating a method 2400 that supports power-boosting techniques for multiple uplink shared channel communications in accordance with examples as disclosed herein. The operations of the method 2400 may be implemented by a base station or its components as described herein. For example, the operations of the method 2400 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2405, the method may include scheduling a first PUSCH repetition and a second PUSCH repetition of a first UE, the first PUSCH repetition including a first group of TBs having resources that overlap with resources of a previously scheduled uplink communication of a second UE, and the second PUSCH repetition including a second group of TBs having resources that are non-overlapping with the resources of the previously scheduled uplink communication of the second UE. The operations of 2405 may be performed in accordance with examples as disclosed herein. In some examples, aspects of the operations of 2405 may be performed by an uplink scheduling manager 1625 as described with reference to FIG. 16.

At 2410, the method may include determining, based on the scheduling, a first OLPC parameter for the first group of TBs and a second OLPC parameter for the second group of TBs. The operations of 2410 may be performed in accordance with examples as disclosed herein. In some examples, aspects of the operations of 2410 may be performed by an open loop power control manager 1630 as described with reference to FIG. 16.

At 2415, the method may include transmitting, to the first UE, a first control information that schedules the first PUSCH repetition and the second PUSCH repetition, and that indicates the first OLPC parameter for the first group of TBs and the second OLPC parameter for the second group of TBs. The operations of 2415 may be performed in accordance with examples as disclosed herein. In some examples, aspects of the operations of 2415 may be performed by an uplink transmission power manager 1635 as described with reference to FIG. 16.

Figure 25:
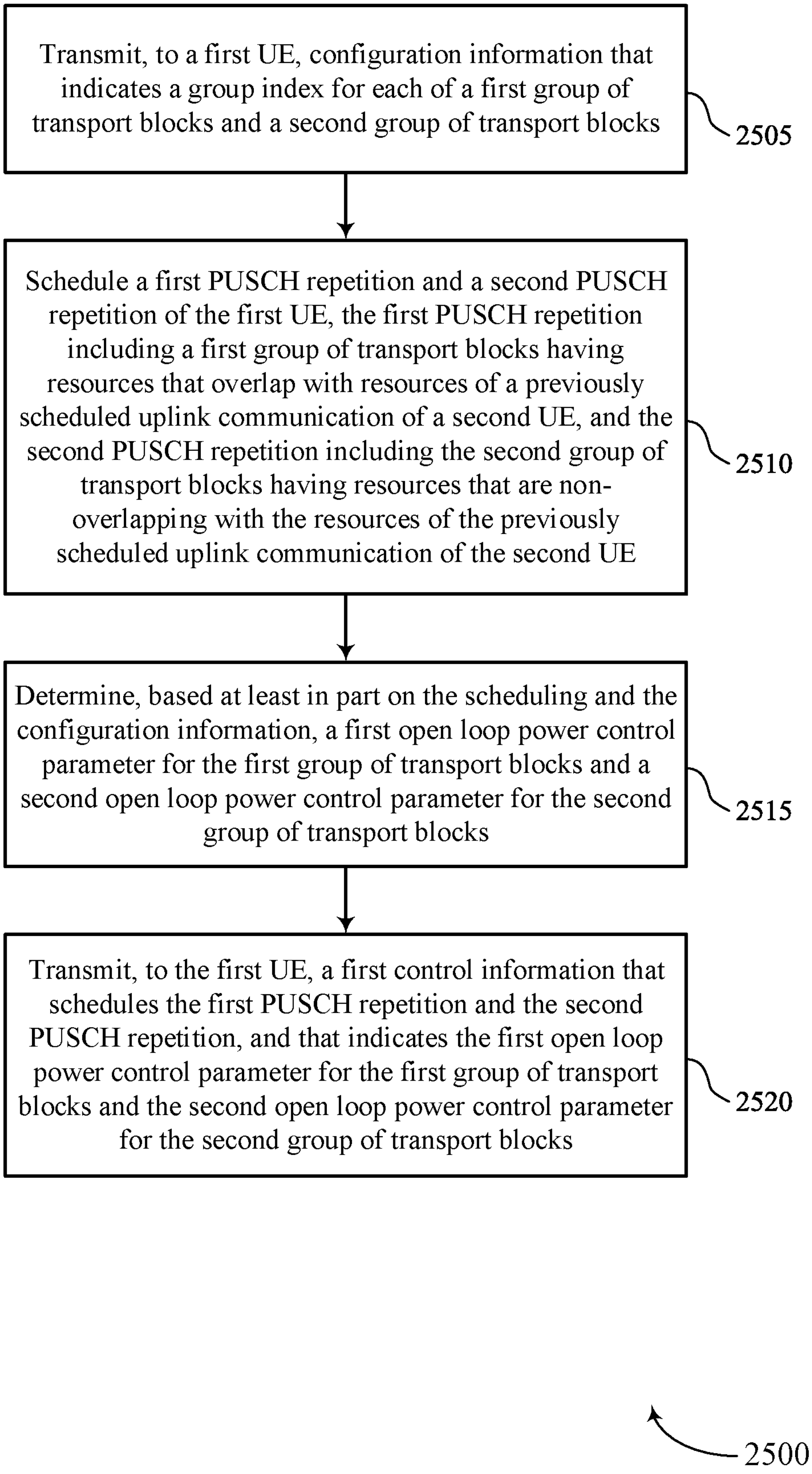

FIG. 25 shows a flowchart illustrating a method 2500 that supports power-boosting techniques for multiple uplink shared channel communications in accordance with examples as disclosed herein. The operations of the method 2500 may be implemented by a base station or its components as described herein. For example, the operations of the method 2500 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2505, the method may include transmitting, to a first UE, configuration information that indicates a group index for each of a first group of TBs and a second group of TBs. The operations of 2505 may be performed in accordance with examples as disclosed herein. In some examples, aspects of the operations of 2505 may be performed by a power control configuration manager 1640 as described with reference to FIG. 16.

At 2510, the method may include scheduling a first PUSCH repetition and a second PUSCH repetition of the first UE, the first PUSCH repetition including the first group of TBs having resources that overlap with resources of a previously scheduled uplink communication of a second UE, and the second PUSCH repetition including the second group of TBs having resources that are non-overlapping with the resources of the previously scheduled uplink communication of the second UE. The operations of 2510 may be performed in accordance with examples as disclosed herein. In some examples, aspects of the operations of 2510 may be performed by an uplink scheduling manager 1625 as described with reference to FIG. 16.

At 2515, the method may include determining, based on the scheduling and the configuration information, a first OLPC parameter for the first group of TBs and a second OLPC parameter for the second group of TBs. The operations of 2515 may be performed in accordance with examples as disclosed herein. In some examples, aspects of the operations of 2515 may be performed by an open loop power control manager 1630 as described with reference to FIG. 16.

At 2520, the method may include transmitting, to the first UE, a first control information that schedules the first PUSCH repetition and the second PUSCH repetition, and that indicates the first OLPC parameter for the first group of TBs and the second OLPC parameter for the second group of TBs, where the first OLPC parameter and the second OLPC parameter are determined based on the group index. The operations of 2520 may be performed in accordance with examples as disclosed herein. In some examples, aspects of the operations of 2520 may be performed by an uplink transmission power manager 1635 as described with reference to FIG. 16.

Figure 26:
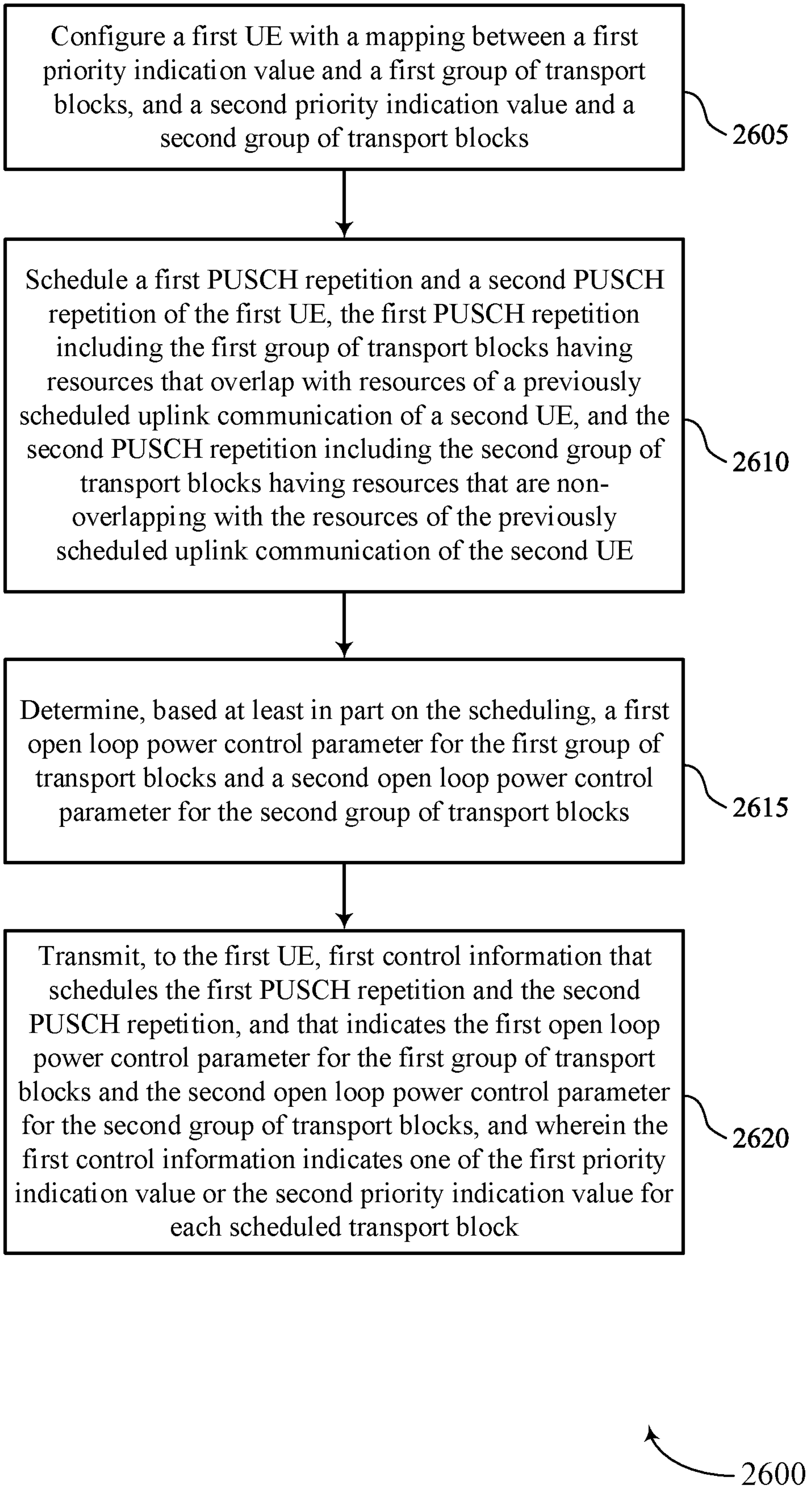

FIG. 26 shows a flowchart illustrating a method 2600 that supports power-boosting techniques for multiple uplink shared channel communications in accordance with examples as disclosed herein. The operations of the method 2600 may be implemented by a base station or its components as described herein. For example, the operations of the method 2600 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2605, the method may include configuring a first UE with a mapping between a first priority indication value and a first group of TBs, and a second priority indication value and a second group of TBs. The operations of 2605 may be performed in accordance with examples as disclosed herein. In some examples, aspects of the operations of 2605 may be performed by a power control group manager 1645 as described with reference to FIG. 16.

At 2610, the method may include scheduling a first PUSCH repetition and a second PUSCH repetition of the first UE, the first PUSCH repetition including the first group of TBs having resources that overlap with resources of a previously scheduled uplink communication of a second UE, and the second PUSCH repetition including the second group of TBs having resources that are non-overlapping with the resources of the previously scheduled uplink communication of the second UE. The operations of 2610 may be performed in accordance with examples as disclosed herein. In some examples, aspects of the operations of 2610 may be performed by an uplink scheduling manager 1625 as described with reference to FIG. 16.

At 2615, the method may include determining, based on the scheduling, a first OLPC parameter for the first group of TBs and a second OLPC parameter for the second group of TBs. The operations of 2615 may be performed in accordance with examples as disclosed herein. In some examples, aspects of the operations of 2615 may be performed by an open loop power control manager 1630 as described with reference to FIG. 16.

At 2620, the method may include transmitting, to the first UE, a first control information that schedules the first PUSCH repetition and the second PUSCH repetition, and that indicates the first OLPC parameter for the first group of TBs and the second OLPC parameter for the second group of TBs, and where the first control information indicates one of the first priority indication value or the second priority indication value for each scheduled TB. The operations of 2620 may be performed in accordance with examples as disclosed herein. In some examples, aspects of the operations of 2620 may be performed by an uplink transmission power manager 1635 as described with reference to FIG. 16.

The following provides an overview of aspects of the present disclosure:

Aspect 1: A method for wireless communication at a UE, comprising: receiving, from a base station, first control information that schedules one or more PUSCH repetitions for two or more transport blocks; determining, based at least in part on a power control indication provided in the first control information, a first open loop power control parameter for a first group of the two or more transport blocks and a second open loop power control parameter for a second group of the two or more transport blocks; transmitting the first group of transport blocks using a first uplink transmission power that is based at least in part on the first open loop power control parameter; and transmitting the second group of transport blocks using a second uplink transmission power that is based at least in part on the second open loop power control parameter.

Aspect 2: The method of aspect 1, further comprising: receiving, from the base station, configuration information that indicates a group index for each of the two or more transport blocks; and determining, for each transport block of the two or more transport blocks, whether the respective transport block belongs to the first group of transport blocks or the second group of transport blocks based at least in part on the group index associated with the transport block.

Aspect 3: The method of aspect 1, further comprising: determining whether each transport block of the two or more transport blocks belongs to the first group of transport blocks or the second group of transport blocks based at least in part on an order in which the two or more transport blocks are scheduled in the first control information.

Aspect 4: The method of aspect 1, further comprising: determining that one or more transport blocks of the two or more transport blocks belong to the first group of transport blocks based at least in part on the one or more transport blocks being scheduled for a retransmission; and determining that one or more other transport blocks of the two or more transport blocks belong to the second group of transport blocks based at least in part on the one or more other transport blocks being scheduled for an initial transmission.

Aspect 5: The method of aspect 1, further comprising: determining whether one or more transport blocks of the two or more transport blocks belongs to the first group of transport blocks or the second group of transport blocks based at least in part on the first control information, wherein the first control information includes one of a first priority indication value or a second priority indication value for each of the two or more transport blocks.

Aspect 6: The method of any of aspects 1 through 5, wherein the first control information includes an open loop power control parameter set indication field.

Aspect 7: The method of any of aspects 1 through 6, further comprising: receiving, from the base station, configuration information that indicates whether an open loop power control parameter set indication field is applied to the first group of transport blocks, or the second group of transport blocks, or both the first group of transport blocks and the second group of transport blocks.

Aspect 8: The method of aspect 7, wherein the open loop power control parameter set indication field indicates a first set of configured open loop power control parameters or a second set of configured open loop power control parameters are to be applied to one or both of the first group of transport blocks or the second group of transport blocks, and wherein the second set of configured open loop power control parameters provides a higher uplink transmission power than the first set of configured open loop power control parameters.

Aspect 9: The method of any of aspects 1 through 8, wherein two or more repetitions of each transport block among the first group of transport blocks and the second group of transport blocks are transmitted in at least two sets of transmission occasions wherein a first set of transmission occasions is associated with a first SRS resource set and a second set of transmission occasions is associated with a second SRS resource set, each of the at least two sets of transmission occasions having different transmission parameters, and wherein an open loop power control parameter set indication field indicates a first set of configured open loop power control parameters are to be applied to both the first set of transmission occasions and the second set of transmission occasions of the first group of transport blocks, or both the first set of transmission occasions and the second set of transmission occasions of the second group of transport blocks, or both the first set of transmission occasions and the second set of transmission occasions of both the first group of transport blocks and the second group of transport blocks based at least in part on the open loop power control parameter set indication field having a first value.

Aspect 10: The method of any of aspects 1 through 8, wherein two or more repetitions of each transport block among the first group of transport blocks and the second group of transport blocks are transmitted in at least two sets of transmission occasions, wherein a first set of transmission occasions is associated with a first SRS resource set and a second set of transmission occasions is associated with a second SRS resource set, each of the two sets of transmission occasions having different transmission parameters, and wherein an open loop power control parameter set indication field indicates a second set of configured open loop power control parameters are to be applied to the first set of transmission occasions of the first group of transport blocks, or the first set of transmission occasions of the second group of transport blocks, or the first set of transmission occasions of both the first group of transport blocks and the second group of transport blocks, and a third set of configured open loop power control parameters are to be applied to the second set of transmission occasions of the first group of transport blocks, or the second set of transmission occasions of the second group of transport blocks, or the second set of transmission occasions of both the first group of transport blocks and the second group of transport blocks based at least in part on the open loop power control parameter set indication field having a second value.

Aspect 11: The method of aspect 10, wherein the first control information includes a separate SRS resource set indication field for each of the first set of transmission occasions and the second set of transmission occasions, and wherein a first value of the SRS resource set indication field indicates that the first and/or second open loop power control parameter for the first set of transmission occasions of the first group of transport blocks and/or the second group of transport blocks is selected from the second set of configured open loop power control parameters, and a second value of the SRS resource set indication field indicates that the first and/or second open loop power control parameter for the second set of transmission occasions of the first group of transport blocks and/or the second group of transport blocks is selected from the third set of configured open loop power control parameters.

Aspect 12: The method of any of aspects 1 through 8, further comprising: two or more repetitions of each transport block among the first group of transport blocks and the second group of transport blocks are transmitted in at least two sets of transmission occasions, wherein a first set of transmission occasions is associated with a first SRS resource set and a second set of transmission occasions is associated with a second SRS resource set, each of the at least two sets of transmission occasions having different transmission parameters, wherein a first value of an open loop power control parameter set indication field indicates the first open loop power control parameter in a second set of configured open loop power control parameters is to be applied to the first set of transmission occasions of the first group of transport blocks, or the first set of transmission occasions of the second group of transport blocks, or the first set of transmission occasions of both the first group of transport blocks and the second group of transport blocks, and wherein the second open loop power control parameter in the second set of configured open loop power control parameters is to be applied to the second set of transmission occasions of the first group of transport blocks, or the second set of transmission occasions of the second group of transport blocks, or the second set of transmission occasions of both the first group of transport blocks and the second group of transport blocks based at least in part on the open loop power control parameter set indication field having a second value.

Aspect 13: The method of aspect 12, wherein a single SRS resource set indication field is applied to both the first set of transmission occasions and the second set of transmission occasions, and the single SRS resource set indication field is mapped to the first open loop power control parameter for the first set of transmission occasions and the second open loop power control parameter for the second set of transmission occasions.

Aspect 14: The method of any of aspects 1 through 13, wherein the first control information includes an explicit indication of whether the first group of transport blocks and the second group of transport blocks are to use different open loop power control parameters.

Aspect 15: The method of aspect 14, wherein the explicit indication is provided in a dedicated field of the first control information that indicates whether an open loop power control parameter set indication field is applied to the first group of transport blocks, the second group of transport blocks, or to both the first group of transport blocks and the second group of transport blocks.

Aspect 16: The method of any of aspects 14 through 15, wherein the explicit indication is provided in separate open loop power control parameter set indication fields associated with each of the first group of transport blocks and the second group of transport blocks.

Aspect 17: The method of aspect 16, wherein the separate open loop power control parameter set indication fields are configured at the UE via radio resource control signaling.

Aspect 18: The method of aspect 14, wherein the explicit indication is provided in a single open loop power control parameter set indication field, and wherein a first subset of bits of the single open loop power control parameter set indication field is associated with the first group of transport blocks and a second subset of bits of the single open loop power control parameter set indication field is associated with the second group of transport blocks.

Aspect 19: The method of any of aspects 14 through 18, wherein two or more repetitions of each transport block of the first group of transport blocks and the second group of transport blocks are transmitted in at least two sets of transmission occasions wherein a first set of transmission occasions is associated with a first SRS resource set, and a second set of transmission occasions is associated with a second SRS resource set, each of the at least two sets of transmission occasions having different transmission parameters, and wherein the first control information further includes a SRS resource set indication field that identifies open loop power control parameters for each of the at least two sets of transmission occasions.

Aspect 20: A method for wireless communication at a base station, comprising: scheduling a first PUSCH repetition and a second PUSCH repetition of a first UE, the first PUSCH repetition including a first group of transport blocks having resources that overlap with resources of a previously scheduled uplink communication of a second UE, and the second PUSCH repetition including a second group of transport blocks having resources that are non-overlapping with the resources of the previously scheduled uplink communication of the second UE; determining, based at least in part on the scheduling, a first open loop power control parameter for the first group of transport blocks and a second open loop power control parameter for the second group of transport blocks; and transmitting, to the first UE, a first control information that schedules the first PUSCH repetition and the second PUSCH repetition, and that indicates the first open loop power control parameter for the first group of transport blocks and the second open loop power control parameter for the second group of transport blocks.

Aspect 21: The method of aspect 20, further comprising: transmitting, to the first UE, configuration information that indicates a group index for each of the first group of transport blocks and the second group of transport blocks, wherein the first open loop power control parameter and the second open loop power control parameter are determined based at least in part on the group index.

Aspect 22: The method of any of aspects 20 through 21, wherein an order in which two or more transport blocks are scheduled in the first control information indicates whether a corresponding transport block belongs to the first group of transport blocks or the second group of transport blocks.

Aspect 23: The method of any of aspects 20 through 22, wherein a retransmission status of each scheduled transport block is used to determine whether the transport block belongs to the first group of transport blocks or the second group of transport blocks.

Aspect 24: The method of any of aspects 20 through 23, further comprising: configuring the first UE with a mapping between a first priority indication value and the first group of transport blocks, and a second priority indication value and the second group of transport blocks, and wherein the first control information indicates one of the first priority indication value or the second priority indication value for each scheduled transport block.

Aspect 25: The method of any of aspects 20 through 24, wherein the first control information includes an open loop power control parameter set indication field.

Aspect 26: The method of any of aspects 20 through 25, wherein two or more repetitions of each transport block among the first group of transport blocks and the second group of transport blocks are transmitted in at least two sets of transmission occasions wherein a first set of transmission occasions is associated with a first SRS resource set and a second set of transmission occasions is associated with a second sounding reference signal resource set, each of the at least two sets of transmission occasions having different transmission parameters, and wherein an open loop power control parameter set indication field indicates a first set of configured open loop power control parameters are to be applied to both the first set of transmission occasions and the second set of transmission occasions of the first group of transport blocks, or both the first set of transmission occasions and the second set of transmission occasions of the second group of transport blocks, or both the first set of transmission occasions and the second set of transmission occasions of both the first group of transport blocks and the second group of transport blocks based at least in part on the open loop power control parameter set indication field having a first value.

Aspect 27: The method of any of aspects 20 through 26, wherein the first control information includes an explicit indication of whether the first group of transport blocks and the second group of transport blocks are to use different open loop power control parameters.

Aspect 28: An apparatus for wireless communication at a UE, comprising a processor; memory coupled with the processor; and instructions stored in the memory and executable by the processor to cause the apparatus to perform a method of any of aspects 1 through 19.

Aspect 29: An apparatus for wireless communication at a UE, comprising at least one means for performing a method of any of aspects 1 through 19.

Aspect 30: A non-transitory computer-readable medium storing code for wireless communication at a UE, the code comprising instructions executable by a processor to perform a method of any of aspects 1 through 19.

Aspect 31: An apparatus for wireless communication at a base station, comprising a processor; memory coupled with the processor; and instructions stored in the memory and executable by the processor to cause the apparatus to perform a method of any of aspects 20 through 27.

Aspect 32: An apparatus for wireless communication at a base station, comprising at least one means for performing a method of any of aspects 20 through 27.

Aspect 33: A non-transitory computer-readable medium storing code for wireless communication at a base station, the code comprising instructions executable by a processor to perform a method of any of aspects 20 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, first control information that schedules one or more physical uplink shared channel (PUSCH) repetitions for two or more transport blocks;

determining, based at least in part on a power control indication provided in the first control information, a first open loop power control parameter for a first group of the two or more transport blocks and a second open loop power control parameter for a second group of the two or more transport blocks;

transmitting the first group of transport blocks using a first uplink transmission power that is based at least in part on the first open loop power control parameter; and transmitting the second group of transport blocks using a second uplink transmission power that is based at least in part on the second open loop power control parameter.

2. The method of claim 1, further comprising:

receiving, from the base station, configuration information that indicates a group index for each of the two or more transport blocks; and determining, for each transport block of the two or more transport blocks, whether the respective transport block belongs to the first group of transport blocks or the second group of transport blocks based at least in part on the group index associated with the transport block.

3. The method of claim 1, further comprising:

determining whether each transport block of the two or more transport blocks belongs to the first group of transport blocks or the second group of transport blocks based at least in part on an order in which the two or more transport blocks are scheduled in the first control information.

4. The method of claim 1, further comprising:

determining that one or more transport blocks of the two or more transport blocks belong to the first group of transport blocks based at least in part on the one or more transport blocks being scheduled for a retransmission; and determining that one or more other transport blocks of the two or more transport blocks belong to the second group of transport blocks based at least in part on the one or more other transport blocks being scheduled for an initial transmission.

5. The method of claim 1, further comprising:

determining whether one or more transport blocks of the two or more transport blocks belongs to the first group of transport blocks or the second group of transport blocks based at least in part on the first control information, wherein the first control information includes one of a first priority indication value or a second priority indication value for each of the two or more transport blocks.

6. The method of claim 1, wherein the first control information includes an open loop power control parameter set indication field.

7. The method of claim 1, further comprising:

receiving, from the base station, configuration information that indicates whether an open loop power control parameter set indication field is applied to the first group of transport blocks, or the second group of transport blocks, or both the first group of transport blocks and the second group of transport blocks.

8. The method of claim 7, wherein the open loop power control parameter set indication field indicates a first set of configured open loop power control parameters or a second set of configured open loop power control parameters are to be applied to one or both of the first group of transport blocks or the second group of transport blocks, and wherein the second set of configured open loop power control parameters provides a higher uplink transmission power than the first set of configured open loop power control parameters.

9. The method of claim 1, wherein two or more repetitions of each transport block among the first group of transport blocks and the second group of transport blocks are transmitted in at least two sets of transmission occasions wherein a first set of transmission occasions is associated with a first sounding reference signal (SRS) resource set and a second set of transmission occasions is associated with a second SRS resource set, each of the at least two sets of transmission occasions having different transmission parameters, and wherein an open loop power control parameter set indication field indicates a first set of configured open loop power control parameters are to be applied to both the first set of transmission occasions and the second set of transmission occasions of the first group of transport blocks, or both the first set of transmission occasions and the second set of transmission occasions of the second group of transport blocks, or both the first set of transmission occasions and the second set of transmission occasions of both the first group of transport blocks and the second group of transport blocks based at least in part on the open loop power control parameter set indication field having a first value.

10. The method of claim 1, wherein two or more repetitions of each transport block among the first group of transport blocks and the second group of transport blocks are transmitted in at least two sets of transmission occasions, wherein a first set of transmission occasions is associated with a first sounding reference signal (SRS) resource set and a second set of transmission occasions is associated with a second SRS resource set, each of the two sets of transmission occasions having different transmission parameters, and wherein an open loop power control parameter set indication field indicates a second set of configured open loop power control parameters are to be applied to the first set of transmission occasions of the first group of transport blocks, or the first set of transmission occasions of the second group of transport blocks, or the first set of transmission occasions of both the first group of transport blocks and the second group of transport blocks, and a third set of configured open loop power control parameters are to be applied to the second set of transmission occasions of the first group of transport blocks, or the second set of transmission occasions of the second group of transport blocks, or the second set of transmission occasions of both the first group of transport blocks and the second group of transport blocks based at least in part on the open loop power control parameter set indication field having a second value.

11. The method of claim 10, wherein the first control information includes a separate SRS resource set indication field for each of the first set of transmission occasions and the second set of transmission occasions, and wherein a first value of the SRS resource set indication field indicates that the first and/or second open loop power control parameter for the first set of transmission occasions of the first group of transport blocks and/or the second group of transport blocks is selected from the second set of configured open loop power control parameters, and a second value of the SRS resource set indication field indicates that the first and/or second open loop power control parameter for the second set of transmission occasions of the first group of transport blocks and/or the second group of transport blocks is selected from the third set of configured open loop power control parameters.

12. The method of claim 1, further comprising:

two or more repetitions of each transport block among the first group of transport blocks and the second group of transport blocks are transmitted in at least two sets of transmission occasions, wherein a first set of transmission occasions is associated with a first sounding reference signal (SRS) resource set and a second set of transmission occasions is associated with a second SRS resource set, each of the at least two sets of transmission occasions having different transmission parameters, wherein a first value of an open loop power control parameter set indication field indicates the first open loop power control parameter in a second set of configured open loop power control parameters is to be applied to the first set of transmission occasions of the first group of transport blocks, or the first set of transmission occasions of the second group of transport blocks, or the first set of transmission occasions of both the first group of transport blocks and the second group of transport blocks, and wherein the second open loop power control parameter in the second set of configured open loop power control parameters is to be applied to the second set of transmission occasions of the first group of transport blocks, or the second set of transmission occasions of the second group of transport blocks, or the second set of transmission occasions of both the first group of transport blocks and the second group of transport blocks based at least in part on the open loop power control parameter set indication field having a second value.

13. The method of claim 12, wherein a single SRS resource set indication field is applied to both the first set of transmission occasions and the second set of transmission occasions, and the single SRS resource set indication field is mapped to the first open loop power control parameter for the first set of transmission occasions and the second open loop power control parameter for the second set of transmission occasions.

14. The method of claim 1, wherein the first control information includes an explicit indication of whether the first group of transport blocks and the second group of transport blocks are to use different open loop power control parameters.

15. The method of claim 14, wherein the explicit indication is provided in a dedicated field of the first control information that indicates whether an open loop power control parameter set indication field is applied to the first group of transport blocks, the second group of transport blocks, or to both the first group of transport blocks and the second group of transport blocks.

16. The method of claim 14, wherein the explicit indication is provided in separate open loop power control parameter set indication fields associated with each of the first group of transport blocks and the second group of transport blocks.

17. The method of claim 16, wherein the separate open loop power control parameter set indication fields are configured at the UE via radio resource control signaling.

18. The method of claim 14, wherein the explicit indication is provided in a single open loop power control parameter set indication field, and wherein a first subset of bits of the single open loop power control parameter set indication field is associated with the first group of transport blocks and a second subset of bits of the single open loop power control parameter set indication field is associated with the second group of transport blocks.

19. The method of claim 14, wherein:

two or more repetitions of each transport block of the first group of transport blocks and the second group of transport blocks are transmitted in at least two sets of transmission occasions wherein a first set of transmission occasions is associated with a first sounding reference signal (SRS) resource set, and a second set of transmission occasions is associated with a second SRS resource set, each of the at least two sets of transmission occasions having different transmission parameters, and wherein the first control information further includes a SRS resource set indication field that identifies open loop power control parameters for each of the at least two sets of transmission occasions.

20. An apparatus for wireless communication at a user equipment (UE), comprising:

a processor;

memory coupled with the processor; and instructions stored in the memory and executable by the processor to cause the apparatus to:

receive, from a base station, first control information that schedules one or more physical uplink shared channel (PUSCH) repetitions for two or more transport blocks;

determine, based at least in part on a power control indication provided in the first control information, a first open loop power control parameter for a first group of the two or more transport blocks and a second open loop power control parameter for a second group of the two or more transport blocks;

transmit the first group of transport blocks using a first uplink transmission power that is based at least in part on the first open loop power control parameter; and transmit the second group of transport blocks using a second uplink transmission power that is based at least in part on the second open loop power control parameter.

21. The apparatus of claim 20, wherein the instructions are further executable by the processor to cause the apparatus to:

receive, from the base station, configuration information that indicates a group index for each of the two or more transport blocks; and determine, for each transport block of the two or more transport blocks, whether the respective transport block belongs to the first group of transport blocks or the second group of transport blocks based at least in part on the group index associated with the transport block.

22. The apparatus of claim 20, wherein the instructions are further executable by the processor to cause the apparatus to:

determine whether each transport block of the two or more transport blocks belongs to the first group of transport blocks or the second group of transport blocks based at least in part on an order in which the two or more transport blocks are scheduled in the first control information.

23. The apparatus of claim 20, wherein the instructions are further executable by the processor to cause the apparatus to:

determine that one or more transport blocks of the two or more transport blocks belong to the first group of transport blocks based at least in part on the one or more transport blocks being scheduled for a retransmission; and determine that one or more other transport blocks of the two or more transport blocks belong to the second group of transport blocks based at least in part on the one or more other transport blocks being scheduled for an initial transmission.

24. The apparatus of claim 20, wherein the instructions are further executable by the processor to cause the apparatus to:

determine whether one or more transport blocks of the two or more transport blocks belongs to the first group of transport blocks or the second group of transport blocks based at least in part on the first control information, wherein the first control information includes one of a first priority indication value or a second priority indication value for each of the two or more transport blocks.

25. The apparatus of claim 20, wherein the first control information includes an open loop power control parameter set indication field.

26. The apparatus of claim 20, wherein the instructions are further executable by the processor to cause the apparatus to:

receive, from the base station, configuration information that indicates whether an open loop power control parameter set indication field is applied to the first group of transport blocks, or the second group of transport blocks, or both the first group of transport blocks and the second group of transport blocks.

27. The apparatus of claim 26, wherein the open loop power control parameter set indication field indicates a first set of configured open loop power control parameters or a second set of configured open loop power control parameters are to be applied to one or both of the first group of transport blocks or the second group of transport blocks, and wherein the second set of configured open loop power control parameters provides a higher uplink transmission power than the first set of configured open loop power control parameters.

28. The apparatus of claim 20, wherein two or more repetitions of each transport block among the first group of transport blocks and the second group of transport blocks are transmitted in at least two sets of transmission occasions wherein a first set of transmission occasions is associated with a first sounding reference signal (SRS) resource set and a second set of transmission occasions is associated with a second SRS resource set, each of the at least two sets of transmission occasions having different transmission parameters, and wherein an open loop power control parameter set indication field indicates a first set of configured open loop power control parameters are to be applied to both the first set of transmission occasions and the second set of transmission occasions of the first group of transport blocks, or both the first set of transmission occasions and the second set of transmission occasions of the second group of transport blocks, or both the first set of transmission occasions and the second set of transmission occasions of both the first group of transport blocks and the second group of transport blocks based at least in part on the open loop power control parameter set indication field having a first value.

29. An apparatus for wireless communication at a user equipment (UE), comprising:

means for receiving, from a base station, first control information that schedules one or more physical uplink shared channel (PUSCH) repetitions for two or more transport blocks;

means for determining, based at least in part on a power control indication provided in the first control information, a first open loop power control parameter for a first group of the two or more transport blocks and a second open loop power control parameter for a second group of the two or more transport blocks;

means for transmitting the first group of transport blocks using a first uplink transmission power that is based at least in part on the first open loop power control parameter; and means for transmitting the second group of transport blocks using a second uplink transmission power that is based at least in part on the second open loop power control parameter.

30. A non-transitory computer-readable medium storing code for wireless communication, the code comprising instructions executable by one or more processors to:

receive, from a base station, first control information that schedules one or more physical uplink shared channel (PUSCH) repetitions for two or more transport blocks;

determine, based at least in part on a power control indication provided in the first control information, a first open loop power control parameter for a first group of the two or more transport blocks and a second open loop power control parameter for a second group of the two or more transport blocks;

transmit the first group of transport blocks using a first uplink transmission power that is based at least in part on the first open loop power control parameter; and transmit the second group of transport blocks using a second uplink transmission power that is based at least in part on the second open loop power control parameter.

* * * * *